United States Patent
Finke et al.

(10) Patent No.: US 11,964,922 B2
(45) Date of Patent: Apr. 23, 2024

(54) CEMENTITIOUS MATERIAL PRODUCTION FROM NON-LIMESTONE MATERIAL

(71) Applicant: Brimstone Energy, Inc., Oakland, CA (US)

(72) Inventors: Cody Finke, Oakland, CA (US); Michael J. Dry, Peterborough (CA); Vivek Kashyap, Oakland, CA (US); Evody Tshijik Karumb, San Francisco, CA (US); Nydra Harvey-Costello, Oakland, CA (US); James Alexis Bresson, Nampa, ID (US); Margaret Josephine Keller, Oakland, CA (US); Hugo Francois Leandri, Oakland, CA (US)

(73) Assignee: BRIMSTONE ENERGY, INC., Oakland, CA (US)

( * ) Notice: Subject to any disclaimer, the term of this patent is extended or adjusted under 35 U.S.C. 154(b) by 0 days.

(21) Appl. No.: 17/872,994

(22) Filed: Jul. 25, 2022

(65) Prior Publication Data
US 2023/0036470 A1   Feb. 2, 2023

Related U.S. Application Data

(63) Continuation of application No. PCT/US2022/024496, filed on Apr. 12, 2022.

(60) Provisional application No. 63/279,596, filed on Nov. 15, 2021, provisional application No. 63/240,319, filed on Sep. 2, 2021, provisional application No. 63/173,703, filed on Apr. 12, 2021.

(51) Int. Cl.
C04B 7/02    (2006.01)
C04B 7/42    (2006.01)
C04B 7/51    (2006.01)
C04B 111/10  (2006.01)

(52) U.S. Cl.
CPC ............... *C04B 7/02* (2013.01); *C04B 7/427* (2013.01); *C04B 7/51* (2013.01); *C04B 2111/1031* (2013.01)

(58) Field of Classification Search
CPC .......... C01B 7/012; C01F 11/06; C01F 11/24; C01F 5/22; C01F 5/24; C01F 7/22; C01F 7/441; C01G 49/02; C01G 49/04; C01G 49/06; C01P 2002/70; C01P 2006/80; C04B 2111/1031; C04B 7/02; C04B 7/427; C04B 7/51; Y02P 40/10; Y02P 40/18
See application file for complete search history.

(56) References Cited

U.S. PATENT DOCUMENTS

2021/0070656 A1* 3/2021 Finke ................... C04B 2/10

FOREIGN PATENT DOCUMENTS

WO   2005108293 A1   11/2005
WO   2021030529 A1   2/2021

OTHER PUBLICATIONS

International Search Report and Written Opinion for PCT/US22/24496 dated Jul. 29, 2022, 10 pages.

* cited by examiner

*Primary Examiner* — Shuangyi Abu Ali
(74) *Attorney, Agent, or Firm* — Storella & Witt, LLP

(57) ABSTRACT

Methods and composition are provided for deriving cement and/or supplementary cementitious materials, such as pozzolans, from one or more non-limestone materials, such as one or more non-limestone rocks and/or minerals. The non-limestone materials, e.g., non-limestone rocks and/or minerals, are processed in a manner that a desired product, e.g., cement and/or supplementary cementitious material, is produced.

27 Claims, 15 Drawing Sheets

Figure 1

Obtaining a non-limestone material S110

Enriching the non-limestone material S120

Creating calcium-rich and calcium-depleted fractions from the non-limestone material S130

Separating the calcium-depleted fraction of the non-limestone material from the calcium-rich fraction of the non-limestone material S140

Separating out calcium containing compounds from the calcium-rich fraction S150

Decomposing the calcium compounds S160

Regenerating leaching agents S170

Figure 2

Obtaining a non-limestone material S110

Enriching the non-limestone material S120

Creating calcium-rich and calcium-depleted fractions from the non-limestone material S130

Separating the calcium-depleted fraction of the non-limestone material from the calcium-rich fraction of the non-limestone material S140

Separating out calcium containing compounds from the calcium-rich fraction S150

Decomposing the calcium compounds S160

Regenerating leaching agents S170

Producing cement from the calcium compound product S180

CEMENTITIOUS MATERIAL PRODUCTION FROM NON-LIMESTONE MATERIAL

RELATED APPLICATIONS

This application is Continuation of International Application No. PCT/US22/24496, filing date of Apr. 12, 2022, which claims priority to U.S. Provisional Patent Application No. 63/173,703, filed Apr. 12, 2021; U.S. Provisional Patent Application No. 63/240,319, filed Sep. 2, 2021; and U.S. Provisional Patent Application No. 63/279, 596, filed Nov. 15, 2021, all of which are incorporated by reference herein.

BACKGROUND

Cement, and cement products, are a necessity in modern life that basically build the entirety of human infrastructure. The most common type of cement is ordinary Portland cement, which is used in the production of concrete, mortar, stucco, non-specialty grout, and many other things. As necessary as cement is to us, there are many drawbacks that we need to deal with regularly due to cement production. Portland cement is toxic; requires a high consumption of energy to quarry raw materials, manufacture, and transport. Additionally, production of Portland cement also releases a significant amount of greenhouse gases, wherein Portland cement production contributes to 8% of the world carbon dioxide emissions. Additionally, the Internal Energy Agency (IEA) has estimated that cement production will increase by 12-23% by 2050.

Thus, there is a need in the cement production field to create a new, useful, and more environmentally friendly method for cement production.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE FIGURES

FIG. 1 shows a flowchart representation of a first method.

FIG. 2 shows a flowchart representation of a second method.

DETAILED DESCRIPTION

Figure 3:
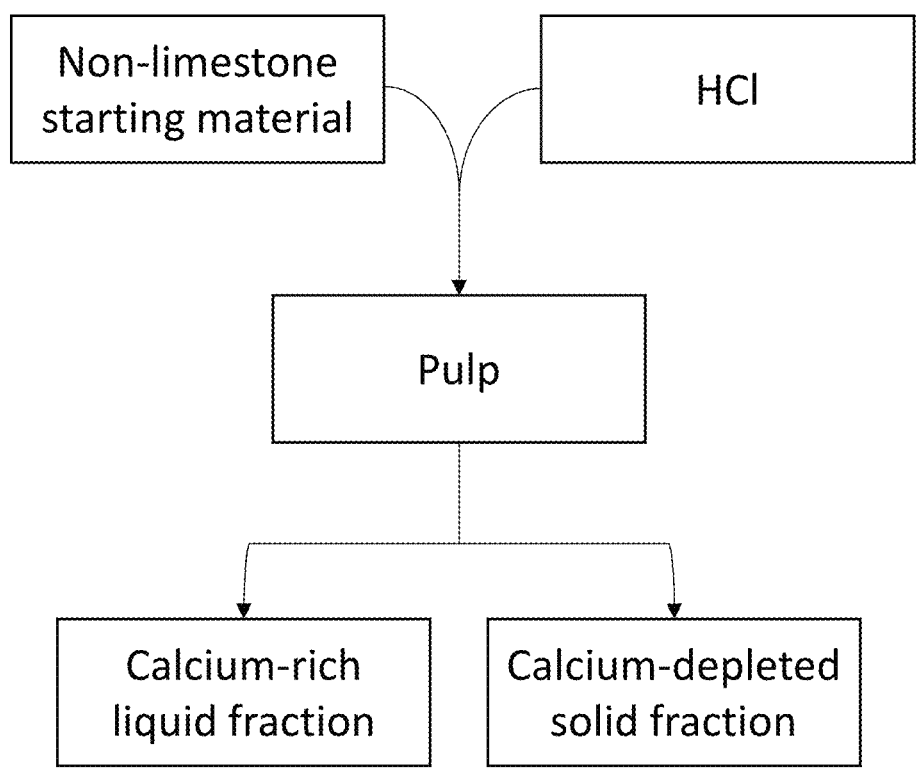
FIG. 3 shows a method to produce calcium-rich liquid fraction and calcium-depleted solid fraction from non-limestone material.

The following description of the embodiments of the invention is not intended to limit the invention to these embodiments but rather to enable a person skilled in the art to make and use this invention.

1. Overview

Methods and apparatus for cement precursor and mineral extraction from a non-limestone material comprising calcium and silicon elements is presented. A method can comprise: dissolving and separating the non-limestone material into a calcium-rich and a calcium-poor fraction (also referred to herein as a calcium-depleted fraction) using leaching agents; converting the calcium-poor fraction into pozzolan and/or other cement precursor compounds; extracting calcium compounds from the calcium-rich fraction; and regenerating the leaching agents. As used herein, "calcium-rich fraction" includes a fraction, generally liquid, that is produced from, e.g., dissolving non-limestone material with a leaching agent such as an acid, e.g., HCl; as will be apparent, the fraction may undergo one or more additional steps to, e.g., remove certain materials; the resulting material, generally with lower amounts of one or more of the certain materials, or otherwise altered, can still be referred to as "the calcium-rich fraction." Typically, the "calcium-rich fraction" continues through the process until it has been dehydrated to produce a solid, such as a solid comprising calcium chloride, e.g., in embodiments in which HCl is the leaching agent. Dependent on the composition of the non-limestone material, the method may include extracting other minerals (e.g., through precipitation and/or thermal decomposition or pyrohydolysis). The method functions as a multipurpose extraction and production process, wherein the method enables extraction of cement precursor material (e.g., SCM, lime, clinker, etc.) in addition to extraction of potentially valuable elements (e.g., aluminum, iron, magnesium, etc.). As used herein, the term "clinker" includes cement clinker, such as Portland cement clinker, unless otherwise indicated. Additionally, the method may be enabled for the production of cement (e.g., ordinary Portland cement). In these variations the method may further include converting the calcium compounds into cement (e.g., through a clinkering or sintering process).

The method may be particularly useful in the field of mineral excavation and concrete production. The method may be implemented during or after mineral excavation to produce/extract additional resources. With this method both cement precursor materials and cement may be extracted and produced. In one mineral excavation implementation, non-limestone rock may have already been excavated and processed such that minerals have been removed from the rock. The method may then be implemented to potentially extract other minerals and produce cement products.

The method may also be particularly useful for the general purpose of cement production. Production of cement from non-limestone rock, may potentially help cement production to become more environmentally friendly.

The method may provide a number of potential benefits. The method is not limited to always providing such benefits, and is presented only as exemplary representations for how the method may be put to use. The list of benefits is not intended to be exhaustive and other benefits may additionally or alternatively exist.

The method potentially provides the benefit of enabling a more environmentally friendly way of producing cement. Currently the most common way of producing cement is to heat limestone to produce lime and carbon dioxide. By producing cement without limestone, carbon dioxide emissions may be drastically decreased.

The method potentially provides new resources for cement production. Without the requirement of limestone, cement production may be broadened to many more regions in the world.

The method may additionally potentially provide the benefit of a simplified concrete production. Production of concrete typically requires ordinary Portland cement (OPC), supplemental cementitious material (SCM), and aggregate. Currently concrete producers need to use different sources to obtain OPC and SCM. The method may enable extraction of SCM and production of OPC from the same source, e.g., starting material. Additionally, the method may enable extraction of SCM and production of OPC and aggregate from the same source. This may significantly simplify the concrete production process, and potentially lower the cost of concrete production. Thus, provided herein is a method for producing concrete from Portland cement and an SCM, e.g., a pozzolan, wherein the Portland cement and the SCM, e.g., pozzolan, are derived from the same source, e.g., the same non-limestone materials, such as non-limestone rocks and/or minerals. In certain embodiments, provided herein is a method for producing concrete from Portland cement, an SCM, e.g., a pozzolan, and aggregate, wherein the Portland cement, the SCM, e.g., pozzolan, and the aggregates are derived from the same source, e.g., the same non-limestone materials, such as non-limestone rocks and/or minerals. In certain embodiments provided is a system for producing concrete, wherein the concrete comprises Portland cement and SCM, e.g., pozzolan, wherein the Portland cement is produced in a cement-producing apparatus, such as an apparatus described herein, from non-limestone materials, such as non-limestone rocks and/or minerals; and the SCM is produced in an SCM-producing apparatus, such as an apparatus described herein, from non-limestone materials, such as non-limestone rocks and/or minerals; wherein the cement-producing apparatus, the SCM-producing apparatus, and the non-limestone materials, e.g., non-limestone rocks and/or minerals, are all at a single location, such as a location where non-limestone rocks and/or minerals are quarried from a source. In certain embodiments, the cement-producing apparatus and the SCM-producing apparatus are the same apparatus. The concrete may further comprise aggregates, and the system may further comprise an aggregate-producing apparatus, such as an apparatus comprising a crusher, miller, and sieves, for producing aggregate from the non-limestone material, e.g., non-limestone rocks and/or minerals, wherein the aggregate-producing apparatus is at the same site as the cement-producing and SCM-producing apparatus. The same location may be such that, e.g., the various apparatus are all within a 10, 5, 1, or 0.5 mile radius, such as within a 1 mile radius or even a 0.5 mile radius; a source of the non-limestone material, e.g., non-limestone rocks and/or minerals to be quarried, may also be within the radius, or may be further away but in any case no more than 10, 5, 4, 3, 2, or 1 mile of the location, e.g., no more than 2 miles away.

The method may additionally provide the potential benefit of added usability from material that is added to be made into concrete. That is, in addition to enabling concrete production, the method may provide the benefit of mineral extraction beyond those for concrete production (e.g., metals, such as aluminum and iron, may also be extracted, for use or sale).

Additionally, for the benefit of mineral extraction beyond the use for concrete production, the method potentially provides the benefit of efficient mineral purification (e.g., purification of metals such as aluminum and iron) concurrent to cement material extraction.

For certain variations, the method may further provide the potential benefit of extraction of high purity SCM (e.g., micro or nano silica or silica fume). That is, in variations where extracted silica is not reused for the production of a calcium base for, e.g., the extraction of metals (e.g., in variations where aluminum and iron are extracted by thermal decomposition), large amounts of extracted silica may be preserved in a purer form.

The method potentially provide the benefit of a more energy efficient method for cement and other mineral extraction. In some variations, the method may incorporate the use of mechanical vapor recompression to recycle latent heat for water evaporation or other electrical heating or reincorporation of heat from other reaction steps to reduce energy (especially non-electric energy) consumption.

As shown in FIG. 1, a method for cement precursor and mineral extraction from non-limestone starting materials comprises: obtaining a non-limestone material S110, wherein the non-limestone material comprises a material that includes the elements, calcium and, optionally, silicon; creating calcium-rich and calcium-depleted fractions from the non-limestone material S130, comprising dissolving at least the calcium compounds, thereby creating a calcium-rich fraction and a calcium-depleted fraction of the non-limestone material, wherein dissolving the non-limestone material includes adding at least one leaching agent S132; separating the calcium-depleted fraction from the calcium-rich fraction S140, wherein the calcium-depleted fraction may comprise a pozzolan; separating the calcium containing compounds (e.g., to produce a solid comprising calcium chloride, in the case of embodiments in which HCl is the leaching agent) from the calcium-rich fraction S150; optionally decomposing the calcium compounds (e.g., dechlorinating a solid comprising calcium chloride to produce a dechlorinated solid comprising calcium, and, optionally, clinkering the dechlorinated solid comprising calcium) S160; and optionally regenerating leaching agents S170.

The method functions to extract pozzolans (also referred to as supplementary cementitious material (SCM)), and/or other cement precursor materials (e.g., clinker, lime, slaked lime, tricalcium silicate, dicalcium silicate, and calcium carbonate), magnesium compounds, and metals from non-limestone material. Dependent on the implementation and the type of non-limestone material, the method may have multiple variations wherein the method may be modified with respect to desired inputs (i.e., the types of non-limestone material) and/or outputs (i.e., cement materials and metals). Thus, in addition to having additional/alternative steps, dependent on implementation, method steps may be skipped, repeated, or varied as required by implementation. The method may be particularly useful for processing calcium-silicate rocks, but may be implemented with any non-limestone material containing silicon and/or calcium.

In a modified embodiment, the method may be used for the production of cement. In this embodiment, as shown in FIG. 2, a method for cement production and cement precursor production, includes: obtaining a non-limestone material S110, wherein the non-limestone material comprises materials that include the elements, calcium and, optionally, silicon; creating calcium-rich and calcium-depleted fractions from the non-limestone material S130, comprising dissolving at least the calcium compounds, thereby creating a calcium-rich fraction and a calcium-depleted fraction of the non-limestone material, wherein dissolving the non-limestone material includes adding at least one leaching agent S132; separating the calcium-depleted fraction from the calcium-rich fraction S140, wherein the calcium-depleted fraction may comprise a pozzolan; separating the calcium containing compounds from the calcium-rich fraction S150 (e.g., to produce a solid comprising calcium chloride, in the case of embodiments in which HCl is the leaching agent); optionally decomposing the calcium compounds (e.g., dechlorinating a solid comprising calcium chloride to produce a dechlorinated solid comprising calcium, and, optionally, clinkering the dechlorinated solid comprising calcium) S160; optionally regenerating leaching agents S170; and wherein the decomposition includes a calcium compound product, producing clinker or cement from the calcium compound product S180.

This method functions to extract supplementary cementitious material (SCM), and/or other cement precursor materials (e.g., clinker, tricalcium silicate, dicalcium silicate, lime, or slaked lime), and metals from non-limestone material, and converting, optionally, cement precursor materials into cement. Dependent on the implementation and the type of non-limestone material, the method may have multiple variations wherein the method may be modified with respect to desired inputs (i.e., the types of non-limestone material) and/or outputs (i.e., types of cement and metals). Thus, in addition to having additional/alternative steps, dependent on implementation, method steps may be skipped, repeated, or varied as required by implementation. The method may be particularly useful for processing calcium-silicate rocks, but may be implemented with any non-limestone material containing silicon and calcium. The method may be particularly useful for the production of clinker or cement, e.g., ordinary Portland cement (OPC) and may be implemented for the production of types of Portland cement (e.g., type 1 Portland cement, type 2 Portland cement, type 3 Portland cement, type 4 Portland cement, or type 5 Portland cement, or equivalent types), or more generally, other types of cement and cementitious material (e.g., lime, slaked lime, mortars, fly ash, slag, tricalcium silicate, dicalcium silicate, and silica fume). The method may additionally, or alternatively, enable production of any compound comprising amorphous silica, calcium oxide (CaO), and/or magnesium oxide (MgO) as starting materials.

In some variations, the method may include additional or alternative steps. Additional steps may relate to processing materials, regenerating compounds, processing waste, and/or improving other reactions. Additional/alternative steps may be incorporated for the desired implementation. Examples of additional/alternative steps include: electrolyzing a reagent/material, thermally decomposing or pyrohydrolysing a reagent/material or the solution, precipitating out a reagent/material, applying a contact process, and synthesizing a reagent/material, using water electrolysis to generate both an acid and a base or just the acid or base for dissolution of the initial rock and/or isolation of calcium species. In many variations, the method may include a calcium enriching step. That is, the method may include: enriching the non-limestone material S120, thereby creating a material that has a greater concentration of calcium as compared to the original material. In many variations, the method may further implement a carbon capture/sequestration step. That is, the method may further include: scrubbing the flue gas.

Starting Materials

Block S110, which includes obtaining non-limestone material functions in obtaining a starting material for the process. Obtaining non-limestone material S110 may comprise any general process for obtaining the non-limestone material, e.g., excavating, purchasing, finding, receiving, etc., the non-limestone material.

In general, any suitable starting material may be used, so long as it comprises calcium in sufficient quantity to provide a desired final product, e.g., clinker or cement, such as final Portland cement. If a process is used that also produces supplementary cementitious material (SCM), the starting material will also contain one or more compounds that can provide a final material that comprises amorphous (non-crystalline) compounds that can serve as SCMs. These may include amorphous silica, in which case the starting material will also comprise silicon. However, other substances can provide amorphous compounds that serve as SCM, such as amorphous iron and alumina compounds, as is known in the art; in these cases, the starting material includes the requisite starting elements. In certain embodiments in which both clinker or cement, e.g., Portland cement and SCM are produced, the starting material comprises non-limestone rock and/or mineral comprising calcium and silicon, such as a rock and/or mineral comprising calcium silicate. Any suitable rock and/or mineral may be used, such as one or more of basalt, gabbro, pyroxenites, anorthosites, skarns, amphibolite, or a combination thereof.

In certain embodiments, a non-limestone material is used. As used herein, "non-limestone material" includes materials that contain low amounts of calcium carbonate (e.g., limestone), such as less than 10% calcium carbonate; generally, lower amounts of calcium carbonate are preferred in order to avoid producing carbon dioxide in various steps; however, many materials, such as non-limestone rocks and/or minerals, can contain some amount of calcium carbonate and be suitable for use in the processes and apparatus described herein. Non-limestone materials can be rocks and/or minerals, or industrial waste, or combinations thereof. The non-limestone material comprises calcium and, generally, silicon. Preferred starting non-limestone starting materials comprise at least 10% calcium, more preferably at least 15% calcium, even more preferably, at least 25% calcium. Preferred starting materials comprise less than 30, 25, 20, 15, 10, 5, 2, or 1% calcium carbonate, such as less than 10% or less than 5%.

In some variations the non-limestone material comprises silicate rock, but may generally comprise any non-limestone material, or materials, wherein the materials together, contain calcium and, optionally, silicon. Non-limestone material may be found/chosen to additionally include any sets of desired compounds (and/or unknown compounds). In addition to calcium and, optionally, silicon, the non-limestone material may include other minerals and/or compounds.

Examples include calcium compounds (e.g., calcium oxide), magnesium compounds (e.g., magnesium oxide), aluminum compounds (e.g., aluminum oxide), iron compounds (e.g., iron(II) oxide, iron(III) oxide), silicates (e.g., silicon dioxide), and carbon compounds (e.g., carbon dioxide). Examples of silicate rocks may include: anorthosites, skarns, gabbros, pyroxenites, mafurites, basalts, copper skarns, tungsten skarns, fly ash, slag, old cement, concrete, quarry rock, and tailings. Examples of other rocks may include: mafic, and ultramafic rocks. More generally, suitable non-limestone rocks and/or minerals include basalt, igneous appetites, wollastonite, anorthosite, montmorillonite, bentonite, calcium-containing feldspar, anorthite, diopside, pyroxene, pyroxenite, mafuhte, kamafuhte, clinopyroxene, colemonite, grossular, augite, pigeonite, margarite, calcium serpentine, garnet, scheilite, skarn, limestone, natural gypsum, appetite, fluorapatite, or any combination of these. Other suitable rocks and/or minerals will be apparent to those of skill in the art. Non-limestone material may also comprise one or more industrial products, e.g., one or more industrial waste products.

In some variations, obtaining non-limestone material S110 may include obtaining processed, partially processed, material. That is, the non-limestone material may have been initially obtained and processed for some other reason and then transferred to this process (e.g., for salt extraction). In variations that include processed, or partially processed, non-limestone material, method steps may be added or skipped dependent on the non-limestone material content. For example, in one example wherein some metals have already been extracted, separation steps (e.g., precipitation) and decomposition (e.g., thermal decomposition) steps may be modified or skipped. In another example, an enrichment step may be added (e.g., enriching the non-limestone material S120) to use a fairly depleted non-limestone material.

In some variations, the method may include block S120, enriching the non-limestone material. Enriching the non-limestone material functions to increase the calcium concentration of the non-limestone material. This may be particularly useful in previously processed rock, wherein minerals or compounds have been extracted. For example, flotation, magnetic separation, and other physical and chemical separation methods may be used to remove calcium-depleted fractions of rocks.

The non-limestone material, e.g., rock and/or mineral can be processed to provide particles in a desired size range. Any suitable process or processes may be used, such as crushing grinding, and/or milling, and sieving or the like. Suitable size ranges include 1-500 u, 5-300 u, 10-200 u, 20-130 u, 45-90 u, or a combination thereof. In a preferred embodiment the size range is 20-130 u. In a more preferred embodiment, the size range is 45-90 u.

Producing Calcium-Rich and Calcium-Depleted Fractions

Block S130, which includes creating calcium-rich and calcium-depleted fractions from the non-limestone material, functions to break down the non-limestone material to separate calcium compounds from non-calcium compound, e.g., SCM. Block S130 may include dissolving the non-limestone material comprising dissolving at least the calcium compounds within the non-limestone material, thereby creating a calcium-rich fraction and a calcium-depleted fraction. In this manner dissolving the non-limestone material S130 may partially dissolve the non-limestone material such that silica, and silica compounds remain solid wherein other compounds (e.g., attached to calcium) are dissolved.

Dissolving the non-limestone material S130 may include adding a leaching agent S132. The leaching agent may comprise a single compound, multiple compounds, and/or a series of compounds. In certain embodiments, the leaching agent comprises a single compound, e.g., HCl. The leaching agent may function in, at least partially, dissolving the non-limestone material. The leaching agent may be water, metal salts, acids, and/or oxidants. Generally, the leaching agent may have the limitation wherein the leaching agent dissolves calcium compounds in the non-limestone material. In some variations, the leaching agent comprises replenishable compound(s).

In one example, the leaching agent is an acid, i.e., a first acid. In certain embodiments, only one acid is used, e.g., only HCl is used The first acid functions to dissolve calcium compounds within the non-limestone material. Additionally, the first acid may dissolve non-silicate compounds in the material (e.g., metals and salts), thereby creating a calcium-depleted solid fraction, e.g., silicate-based solid fraction and a mineral-based liquid fraction (calcium-rich liquid fraction). Alternatively, the first acid may dissolve the silicate material. The first acid is preferably a strong acid, but may alternatively comprise a weak acid or protons generated at an anode including from water splitting. In one variation, the first acid comprises hydrochloric acid (HCl). In one variation, the first acid consists essentially of HCl. In another variation, the first acid comprises hydroiodic acid (HI). Examples of other first acids may include: hydrobromic acid, nitric acid, and hydronium ion produced via water electrolysis. In one variation, HCl may dissolve metals in the non-limestone material, creating a metal rich liquid fraction (calcium-rich liquid fraction).

In certain embodiments, the non-limestone material, e.g., rock and/or mineral material is contacted with a strong acid to form a pulp comprising the acid and rocks and/or minerals. Any suitable strong acid may be used, such as HCl, HBr, HI, $H_2SO_4$, or $HNO_3$. In certain embodiments the strong acid comprises HCl; HCl may be the only strong acid used in the procedure. It will be appreciated that generally in such embodiments, other acids may be used for non-essential functions, such as cleaning equipment and the like, but the acid used to dissolve non-limestone materials is HCl. HCl is particularly useful because it produces chlorides, e.g., calcium chlorides, which are useful starting materials for further steps in the process. HCl also lends itself to relatively simple regeneration at one or more points in the process. For convenience the remainder of the process will be described in terms of HCl; as will be apparent to one of skill in the art, if another acid is used in addition to or as an alternative to HCl, suitable adjustments may be made to accommodate the additional/alternative acid.

The non-limestone material, e.g., rocks and/or minerals such as silicate rock material, is dissolved in the hydrochloric acid (HCl). In certain embodiments, the proportion of strong acid that comprises HCl is at least 20, 30, 40, 50, 60, 70, 80, 90, 95, or 99% of the strong acid. In certain embodiments, 100% of the strong acid is HCl. Any suitable concentration of HCl may be used, such as 5-40%, 10-37%, 10-30%, 15-35%, 17-23%, 20-30%, or about or exactly 15, 16, 17, 18, 19, 20, 21, 22, 23, 24, 25, 26, 27, 28, 29, or 30%, such as about or exactly 20%. In preferred embodiments the HCl is 10-37%. In still more preferred embodiments the HCl is 15-35%. The ratio of starting material, such as solid rock and/or mineral, to leaching agent, such as liquid, for example acid, in the initial pulp may be any suitable ratio; it will be appreciated that some of the solid rock and/or mineral will begin dissolving in the acid immediately and that these ratios will change as solid dissolves into solution. Suitable initial ratios can be in the range of 5% solid/95% liquid to 40% solid/60% liquid, such as 10% solid/90% liquid to 30% solid/70% liquid; in a preferred embodiment 15% solid/85% liquid to 25% solid/75% liquid, such as 20% solid/80% liquid.

The pulp is treated to cause dissolution of at least a sufficient amount of calcium compounds in the non-limestone material, e.g., rocks and/or minerals, to enter solution to provide a satisfactory final product, e.g., to be converted to clinker or cement, e.g., Portland cement. In certain embodiments, at least 50, 60, 70, 80, 90, 95%, or 100% of calcium in the starting material enters solution, preferably at least 70%, more preferably at least 80%, even more preferably at least 90%. The treatment can occur in a process open to the atmosphere, or at least not pressurized. The treatment can include heating and/or maintaining the pulp at a temperature or range of temperatures for a certain duration. In general, duration of treatment and/or temperature may be used, to provide the desired dissolution. Suitable temperature ranges at which the pulp is maintained include 60-115° C., 80-115° C., 90-115° C., 100-115° C., 60-112° C., 80-112° C., 90-112° C., 100-112° C., 60-110° C., 80-110° C., 90-110° C., or 100-110° C.; it will be appreciated that, due to presence of a high concentration of HCL and also as material dissolves in the liquid phase, boiling temperature for the HCl solution can be above 100° C. Thus, in certain embodiments, the temperature is at least 95, 96, 97, 98, 99, or 100° C.; in preferred embodiments the temperature is at least 90° C.; in more preferred embodiments range the temperature is at least 95° C.; in still more preferred embodiments, the temperature is at least 98° C.; and in even more preferred embodiments the temperature is at least 100° C. In certain embodiments the maximum temperature is 105, 106, 107, 108, 109, 110, 111, 112, 113, 114, or 115° C.; in a preferred embodiment the maximum temperature is 105° C.; in a more preferred embodiment the maximum temperature is 108° C.; in a still more preferred embodiment the maximum temperature is 110° C. In certain embodiments, the temperature is brought to and/or maintained at 100-115° C. In certain embodiments the temperature is brought to and/or maintained at 100-110° C. In certain embodiments, the temperature is brought to and/or maintained at 100-115° C. Any suitable duration of treatment may be used. This can depend, to some degree, on the calcium content of the starting material, e.g., non-limestone rock and/or mineral; materials with lower calcium content can require longer treatment to achieve a desired amount of calcium salts in solution. Thus, the duration of treatment may be at least 1, 2, 3, 4, 5, 6, 7, 8, or 10 hours and/or not more than 2, 3, 4, 5, 6, 7, 8, 10, 12, 15, 20, 24, 30, 36, 40, 48, 60, or 72 hours. In certain embodiments, the duration can be 2-24 hours, such as 4-18 hours or even 4-12 hours or less. In certain embodiments, the duration may be 6-72 hours, such as 4-48 hours, or 4-36 hours, or 4-24 hours. The pulp can be agitated during treatment, e.g., stirred, for example stirred at 10-1000 RPM, 20-800 RPM, 50-500 RPM, 50-400 RPM, or 100-300 RPM. In preferred embodiments, the pulp is stirred at 50-400 RPM, more preferably at 100-300 RPM. Other methods of agitation as known in the art may be used. A calcium-depleted fraction (solid) and a calcium-rich fraction (liquid) are produced from the pulp. Some of the acid, e.g., HCl, may move into gas or vapor phase during the process, and can be recaptured and returned for use as leaching agent.

In some variations, adding a first acid may comprise adding an organic or biogenic acid (e.g., oxalic acid). Adding an organic first acid may selectively leach the non-limestone material, thereby enabling selective extraction of metals. Examples of organic acids that may be incorporated include: Propionic acid, Butyric acid, Citric acid, Succinic acid, Malic acid, Tartaric acid, and Oxalic acid. In one example, the first organic acid may selectively leach all minerals from the non-limestone material (e.g., by thermal decomposition). In another example, the organic first acid may selectively leach all minerals except calcium from the non-limestone material.

In some variations, microbes may be implemented to produce the first organic acid. Microbes may be engineered to produce organic acids by utilizing $CO_2$ as a carbon source and therefore $CO_2$ produced by decomposing the organic acid in subsequent steps may be recycled or mitigated by feeding this $CO_2$ to the microbes.

Separating Calcium-Rich Fraction from Calcium-Depleted Fraction

Block S140, which includes separating the calcium-depleted fraction from the calcium-rich fraction, functions to separate the solid and liquid fractions produced from the non-limestone material. In many variations, the calcium-depleted fraction comprises pozzolan. In some variations wherein a first acid leaching agent is added (e.g., an HCl first acid), this would comprise separating out the solid fraction silicate rock (calcium-depleted fraction) from the dissolved liquid fraction (calcium-rich fraction), thus extracting SCM from the metals in the non-limestone material. Any suitable method of separation may be implemented. In some variations, block S130 may further include drying the separated solid fraction (e.g., drying the SCM). Additional or alternative acids to HCl could include HBr, HI, $HNO_3$ or any acid that creates a soluble calcium salt.

In many variations, separating the calcium-depleted fraction from the calcium-rich fraction S140, occurs after some and/or all parts of block S130. In some variations, separating the calcium-depleted fraction from the calcium-rich fraction S140 may occur prior to, or concurrent, to dissolving the non-limestone material. This may occur by mechanically (e.g., separating by physically grinding components, separating by density, etc.), and/or electrostatically separating the calcium-rich content from the calcium-depleted content prior to dissolution of the non-limestone material.

In some variations, separating the calcium-depleted fraction from the calcium-rich fraction S140 is accomplished by filtering the non-limestone material. Filtration may be used to separate solid and liquid fragments. In one implementation, vacuum filtration is used, wherein a pressure difference is used to flow fluid through a filter. In another implementation, hot filtration is used, wherein the solution is heated and then forced through a filter. In another implementation cold filtration is used, wherein the solution is initially cooled down to crystallize additional components (e.g., SCM), and then filtered.

In some variations, a filtration press is implemented for separating the solid fraction. The filter press may enable stacking of multiple filter elements and allow the filter to be easily opened to remove the filtered solids. A filter press may be implemented with any desired filtering process as described above.

Separating the calcium-depleted fraction from the calcium-rich fraction S140 may significantly deplete the volume of the liquid fraction. Therefore, either before this happens or once this occurs, additional solution may be added to the calcium-rich fraction to replenish the volume. This may occur at any separation and/or precipitation step. Additional solution may be added at any step to maintain a desired working volume.

Block S150, which includes separating out the calcium compounds from the calcium-rich fraction, e.g., forming a solid comprising calcium chloride, functions to separate out the calcium compounds from the non-limestone material. Additionally, block S150 may include separating out other metal compounds, wherein these metal compounds may, or may not, be part of a calcium compound. Block S150 may be implementation specific and may change dependent on the desired metal extractions, and/or the mineral content of the non-limestone material. For example, in some variations, separating out the calcium compounds from the calcium-rich fraction S150, includes precipitating out the calcium compounds from a liquid, or liquid-like, mixture. Additionally, block S150 may be dependent on prior method steps. For example, utilization of HI as the first acid leaching agent, as compared to HCl, may alter particular details of block S150. Generally, separating out the calcium compounds from the calcium-rich fraction S150 may comprise: altering the thermodynamic conditions (e.g., increasing or decreasing the temperature, increasing or decreasing the pressure, increasing or decreasing compound concentrations), adding an acid or base, and/or adding an oxidizing or reducing agent. In certain embodiments, e.g., in which HCl is the acid, separating out the calcium compounds comprises dehydrating the calcium-rich liquid fraction (optionally after treatment of the calcium-rich liquid fraction to remove one or more non-calcium compounds) to produce a solid comprising calcium chloride.

Treatment of Calcium-Rich Fraction

Thus, the calcium-rich fraction is further treated; in certain embodiments the ultimate result of the further treatment is to produce clinker or cement, e.g., Portland cement and, generally, to regenerate the acid. In addition, certain non-calcium substances, such as substances containing one or more of iron, aluminum, and/or magnesium, may be generated, depending on treatment of calcium-rich fraction. The further treatment can depend on the likely composition of the calcium-rich fraction, which can, in turn, depend at least partly on starting materials.

In general, the calcium-rich fraction will contain non-calcium salts, also referred to herein as metal compounds, in addition to calcium salts, such as calcium chloride, and next procedures can depend on the proportion of non-calcium salts (metal compounds) to calcium salts, or expected proportion, which can be based, at least in part, on starting materials. If the proportion of one or more non-calcium salts is, or is expected to be, above a certain threshold in the calcium-rich fraction, the calcium-rich fraction may be treated to remove at least a portion of one or more non-calcium salts, e.g., to bring their level in the calcium-rich fraction to below the threshold. The threshold can be determined by, e.g., desired composition of the final product, e.g., clinker or cement such as Portland cement. For example, certain non-calcium substances, such as derivatives of iron, aluminum, and/or magnesium salts, can allowable in a clinker or cement, e.g., Portland cement, but only below certain levels, often depending on the type of cement (e.g., Type 1, 2, 3, 4, or 5) and/or the standard to be met, as standards can vary depending on geographic location. The threshold can be based, at least in part, on the expected levels of non-calcium salt-derived substances, such as aluminum, iron, and/or magnesium substances, in the final clinker or cement, e.g., Portland cement product after further treatment.

In certain embodiments, the calcium-rich fraction is not treated to remove non-calcium salts. This can be the case if the starting material is particularly high in calcium compounds; an exemplary such starting material is wollastonite. In such cases, calcium-rich fraction treatment is generally directed to removing water to produce solid calcium salts, and further treatment to convert the calcium salts to desired final product, e.g., clinker or cement such as Portland cement. Such treatments are described further, below.

In certain embodiments, the calcium-rich fraction is treated to remove one or more non-calcium salts. Any suitable treatment or combination of treatments may be used so long as a sufficient quantity of non-calcium salts are converted to a form that can be separated from the calcium-rich fraction, such as converted to solid form. The treatment or combination of treatments can also result in regeneration of at least a portion of the original strong acid, e.g., HCl. All of the non-calcium salts need not be removed, so long as the proportion left in solution is below the threshold proportion. In certain embodiments, the calcium-rich fraction is elevated to and/or maintained at one or more temperatures or temperature ranges to cause formation of one or more insoluble non-calcium substances from one or more non-calcium salts. Additionally or alternatively, in certain embodiments the calcium-rich fraction is treated with one or more substances, such as one or more bases, which cause formation of one or more insoluble non-calcium substances from one or more non-calcium salts.

Thus, the calcium-rich fraction can contain soluble non-calcium salts, such as salts of Al, Fe, and/or Mg, which can also be referred to as metal containing compounds. Separating out the calcium containing compounds from the calcium-rich fraction S150 includes precipitating metal containing compounds. In certain embodiments, this comprises a one-step thermal decomposition (pyrohydrolysis) process. In certain embodiments, this comprises a multi-step thermal decomposition (pyrohydrolysis) process, such as a two-step thermal decomposition (pyrohydrolysis) process. In certain embodiments, this comprises addition of a base. In certain embodiments, a one-step thermal decomposition (pyrohydrolysis) and addition of base are used. In certain embodiments, a two-step decomposition (pyrohydrolysis) and addition of base are used. In certain embodiments, only addition of base is used. In general, at least some of the strong acid, e.g., HCl is also regenerated during the process(es).

In certain embodiments, the calcium-rich fraction is elevated to and/or maintained at one temperature or range of temperatures (one step thermal decomposition or pyrohydrolysis), causing formation of a set of insoluble non-calcium substances, which can be removed from the calcium-rich fraction. The temperature or range of temperatures may be one at which a one or more non-calcium salts, such as at least iron and aluminum salts, form insoluble substances, e.g., insoluble iron and aluminum substances. Further non-calcium salts that may form insoluble substances include boron, lithium, rubidium, cesium, strontium, barium, and/or radium salts. The temperature can be any suitable temperature or range of temperatures, e.g., at least 140, 145, 150, 155, 160, 165, 170, 175, or 180° C. and/or not more than 145, 150, 155, 160, 165, 170, 175, 180, 185, 190, or 195° C.; in certain embodiments, the calcium-rich fraction is heated to 140-195° C.; in a preferred embodiment the calcium-rich fraction is heated to 140-185° C.; in a more preferred embodiment the calcium-rich fraction is heated to 160-185° C., or even 175-185° C. In certain embodiments the calcium-rich fraction is heated to at least 1600° C., for example, at least 170° C., such as at least 175° C., in certain cases at least 180° C. Any suitable method of bringing the calcium-rich fraction to the desired temperature and/or maintaining it at the desired temperature may be used; methods of heating a solution and/or maintaining it at a temperature or range of temperatures are well-known in the art. The calcium-rich solution may be maintained at or near the desired temperature for a suitable duration, such as at least 0, 1, 2, 5, 10, 20, 30, 40, or 50 min or 1, 1.5, 2, 2.5, 3, 4, 5, 7, or 10 hours, and/or not more than 1, 2, 5, 10, 20, 30, 40, or 50 min or 1, 1.5, 2, 2.5, 3, 4, 5, 7, 10, or 15 hours. In certain embodiments, the calcium-rich fraction is maintained at or near the desired temperature for 10 min to 5 hours, such as 30 min to 4 hours, in some cases 1 to 3 hours. As the calcium-rich fraction is heated and/or maintained at an elevated temperature, HCl gas is driven off. Some or all of this gas can be captured and dissolved in aqueous medium to regenerate HCl; in certain embodiments the HCl gas is captured and returned to an aqueous medium, such as an HCl solution that is, or will be, used as a leach agent for treatment of subsequent materials comprising calcium. The insoluble substances generated by elevating temperature can be separated from the remaining calcium-rich fraction by any suitable method, such as centrifugation, filtration, or the like. Insoluble substances can include one or more compounds of aluminum, and/or iron, such as oxides, hydroxides, oxyhydroxide, silicates, silicate hydrates, or complex phases that contain any of Mg, Al, Fe, Ca, and Si, O, and H, for example, $Al(OH)_3$, $Al_2O_3$, $AlO(OH)$, $Fe(OH)_2$, $Fe(OH)_3$, $FeO(OH)$, $FeO$, $FeO_2$, $Fe_2O_3$, etc.

In certain embodiments, a two-step thermal decomposition (pyrohydrolysis) process is used. This occurs by first incorporating a two-step thermal decomposition; first heating the mixture to a temperature or range of temperatures such that aluminum salts, e.g., $AlCl_3$, form insoluble aluminum substances, such as $Al(OH)_3$, $Al_2O_3$, $AlO(OH)$, etc., but iron salts, e.g., $FeCl_2$ and/or $FeCl_3$, do not form insoluble substances, such as $Fe(OH)_2$, $Fe(OH)_3$, $FeO(OH)$, $FeO$, $FeO_2$, $Fe_2O_3$, etc., or do not substantially form insoluble substances. In certain embodiments, the first temperature is below 150, preferably below 145, even more preferably below 140° C. In certain embodiments, the first temperature is 130-145° C., 131-144° C., 132-141° C., 133-139° C., or 135-137° C., such as about or exactly 136° C., or such as approximately 140° C. Any suitable method of bringing the calcium-rich fraction to the desired temperature and/or maintaining it at the desired temperature may be used. The calcium-rich solution may be maintained at or near the desired temperature for a suitable duration, such as at least 0, 1, 2, 5, 10, 20, 30, 40, or 50 min or 1, 1.5, 2, 2.5, 3, 4, 5, 7, or 10 hours, and/or not more than 1, 2, 5, 10, 20, 30, 40, or 50 min or 1, 1.5, 2, 2.5, 3, 4, 5, 7, 10, or 15 hours. In certain embodiments, the calcium-rich fraction is maintained at or near the desired temperature for 10 min to 5 hours, such as 30 min to 4 hours, in some cases 1 to 3 hours. The process produces insoluble, e.g., oxidized, Aluminum species, such as oxides, hydroxides, oxyhydroxide, silicates, silicate hydrates, or complex phases that contain any of Al, Ca, and Si, O, and H (e.g., forming $Al(OH)_3$, $Al_2O_3$, $AlO(OH)$, etc.). HCl is also regenerated, as described for the one-step thermal decomposition process. The insoluble, e.g., oxidized Aluminum may then separated from the calcium-rich fraction solution; they may be further processed, e.g., dried. The remaining solution is then brought to a second temperature or range of temperatures at which one or more non-calcium salts, such as at least iron salts, form insoluble substances, such as oxides, hydroxides, oxyhydroxide, silicates, silicate hydrates, or complex phases that contain any of Fe, Ca, and Si, O, and H, e.g., $Fe(OH)_2$, $Fe(OH)_3$, $FeO(OH)$, $FeO$, $FeO_2$, $Fe_2O_3$, etc. The temperature can be any suitable temperature or range of temperatures, e.g., at least 140, 145, 150, 155, 160, 165, 170, 175, or 180° C. and/or not more than 145, 150, 155, 160, 165, 170, 175, 180, 185, 190, or 195° C.; in certain embodiments, the remaining solution is heated to 140-195° C.; in a preferred embodiment the remaining solution is heated to 145-190° C.; in a more preferred embodiment the remaining solution is heated to 145-185° C., in a preferred embodiment, to 165-185° C., in a more preferred embodiment, to 175-185° C. In certain embodiments the remaining solution is heated to at least 145° C., such as at least 150° C., in certain cases at least 155° C., for example a second heating step to approximately 180° C. Any suitable method of bringing the calcium-rich fraction to the desired temperature and/or maintaining it at the desired temperature may be used. The calcium-rich solution may be maintained at or near the desired temperature for a suitable duration, such as at least 0, 1, 2, 5, 10, 20, 30, 40, or 50 min or 1, 1.5, 2, 2.5, 3, 4, 5, 7, or 10 hours, and/or not more than 1, 2, 5, 10, 20, 30, 40, or 50 min or 1, 1.5, 2, 2.5, 3, 4, 5, 7, 10, or 15 hours. In certain embodiments, the calcium-rich fraction is maintained at or near the desired temperature for 10 min to 5 hours, such as 30 min to 4 hours, in some cases 1 to 3 hours. This temperature serves to form isoluble, e.g., oxidized, iron species (e.g., forming $Fe(OH)_2$, $Fe(OH)_3$, $FeO(OH)$, $FeO$, $FeO_2$, $Fe_2O_3$, etc.) and simultaneously regenerate the HCl first acid as in the first heating step. The insoluble Fe may then be separated from the calcium-rich fraction solution; it may then be further processed, e.g., dried.

In certain embodiments, the calcium-rich fraction is treated with one or more bases, causing formation of a set of insoluble non-calcium substances, which can be removed from the calcium-rich fraction. HCl can also be regenerated during the base addition. In certain embodiments, this is the only process used to cause formation of insoluble non-calcium substances (precipitating metal compounds). In certain embodiments, a one-step thermal decomposition process and addition of base is used. In certain embodiments, a two-step thermal decomposition process and addition of base is used. The base or bases may be any suitable base or bases, so long as the strength and amount of the base or bases is sufficient to precipitate a desired amount of metal compounds. In certain embodiments, the base or bases comprises a calcium base, such as one or more calcium bases produced as a product in the process, such as a CaO, $Ca(OH)_2$, or CaSi such as dicalcium and/or tricalcium silicate. In certain embodiments, at least 10, 20, 30, 40, 50, 60, 70, 80, 90, or 95% of the base or bases comprises one or more products produced in the process, such as a calcium base, e.g., CaO, $Ca(OH)_2$, or CaSi such as dicalcium or tricalcium silicate; in a preferred embodiment, at least 30%; in a more preferred embodiment, at least 80%; in a yet more preferred embodiment, at least 90%. In certain embodiments, 100% of the base or bases comprises one or more products produced in the process, such as a calcium base, e.g., CaO, $Ca(OH)_2$, or CaSi such as dicalcium or tricalcium silicate. Some or all of the added base can be regenerated in further steps of the process, e.g., calcium salt decomposition that produces, e.g., CaO, dicalcium silicates and/or tricalcium silicates. In certain embodiments, base is added to calcium-rich fraction in a one-step process to precipitate all desired compounds, e.g., to precipitate Al, Fe, and Mg compounds. In certain processes, base is added after some of the non-calcium salts (metal compounds) have been precipitated, e.g., through a one-step or two-step thermal decomposition process; in such cases enough base is added to precipitate remaining metal compounds or a portion thereof (e.g., remaining Fe and Mg compounds, or remaining Mg compounds).

In certain embodiments, base is added to precipitate Mg compounds. The precipitate can include one or more magnesium compounds, such as $Mg(OH)_2$, magnesium silicate hydrate, magnesium alumina silicate, and/or other magnesium compounds. The precipitate can be separated from the remaining calcium-rich fraction by any suitable method, such as methods described herein. The precipitate can be further treated, e.g., by drying. The magnesium precipitate can be used to react with carbon dioxide, e.g., carbon dioxide in a flue gas, such as a flue gas produced as part of a process to provide energy for the overall process (e.g., a flue gas from combustion of natural gas or coal); and/or to react with atmospheric carbon dioxide, and/or other carbon dioxide source, such as a body of water, e.g., ocean, to produce magnesium-carbon dioxide products such as $MgCO_3$, in some cases $Mg(HCO_3)_2$ thus sequestering the carbon dioxide. The amount of carbon dioxide thus sequestered can reduce the total amount of carbon dioxide produced by the total process, in some cases sufficiently to make the total process carbon neutral or even carbon negative. In addition, other substances in a flue gas, e.g., substances that are required to be removed from the flue gas, such as SOx and/or NOx, may be reacted with the Mg precipitate, in some cases reducing the level of one or more of the substances to below levels required for flue gas released to the atmosphere. In addition or alternatively, magnesium precipitate can sequester carbon dioxide from the atmosphere; any suitable arrangement can be used for this. In certain embodiments, the magnesium precipitate, optionally processed to increase surface area, can simply be placed in a pile, spread on the ground in a layer, or distributed in other suitable manner, and allowed to sequester atmospheric carbon dioxide over an appropriate time period, which can be days, weeks, months, a year, or more than a year. In certain embodiments, the magnesium precipitate may be placed in aqueous slurry/solution, where it is contacted with, e.g., flue gas or atmospheric air. In addition or alternatively, magnesium precipitate can sequester carbon dioxide from a body of water, such as ocean water; any suitable arrangement can be used for this. In this case, soluble bicarbonate species can form, effectively doubling the amount of carbon dioxide sequestered.

Decomposing Calcium Compounds

Block S160 which includes decomposing the calcium compounds functions to break down the calcium compounds, e.g., calcium chloride, into different calcium compounds, e.g., dechlorinated solid comprising calcium, di- and/or tricalcium silicates, preferably into a usable form. Block S160 may additionally include decomposing other metal compounds. Examples include: magnesium compounds, aluminum compounds, and iron compounds. In some variations, decomposing comprises implementing a thermal decomposition. For example, thermally decomposing calcium carbonate into calcium oxide and carbon dioxide.

Additionally or alternatively, other types of decomposition may be implemented (e.g., chemical decomposition, electrochemical decomposition). In some variations block S160 includes electrochemically decomposing the calcium, and other metal, compounds through electrolysis. For example, this may occur using sodium chloride electrolysis using the chloroalkali process.

In many variations, decomposing the calcium compounds S160, function in conjunction with block S150. For example in many variations, thermally decomposing is part of separating the calcium compounds, and/or other metal compounds. In these variations, block S160 may occur directly prior to, concurrent to, or directly after block S150.

For example in some variations, block S160 may be incorporated to decompose and/or separate out metal compounds (non-calcium compounds) from the calcium-rich fraction prior to separating out the calcium compounds from the calcium-rich fraction S150. In certain embodiments, one or more of the separated metals is used in the process, e.g., as a flux for clinkering. This may function to improve and/or simplify separating out the calcium compounds. Additionally, this may enable a "purer" extraction of the extracted metals for repurposing. In one example, a thermal decomposition or pyrohydrolysis may be implemented on the calcium-rich fraction to extract metals (e.g., aluminum and iron). Thermal decomposition or pyrohydrolysis may be implemented in any desired form, potentially dependent on the implemented system (e.g., mechanical vapor recompression may be used to reincorporate heat generated from other parts of the reaction for thermal decomposition or water evaporation). In this example the calcium-rich fraction may be heated to 160-190° C., such as 175-180° C., for example, approximately 180° C., thereby hydrolyzing Al and Fe (e.g., forming $Al(OH)_3$, $Al_2O_3$, $AlO(OH)$, $Fe(OH)_2$, $Fe(OH)_3$, $FeO(OH)$, $FeO$, $FeO_2$, $Fe_2O_3$, etc.). Additionally, the thermal decomposition may help regenerate the leaching agent (e.g., regenerating HCl) as described below for block S170. Hydrolyzation of the metals may effectively precipitate them out of the solution. They may then be separated as another solid fraction from the calcium-rich fraction solution. The separated metals may also be sold as an SCM either with or without the addition of silica. In certain embodiments, one or more of the separated metals is used in the process, e.g., as a flux for clinkering.

In another example implementation, block S160 may incorporate a two-step thermal decomposition prior to block S150. That is the calcium-rich fraction may be initially heated to 125-145° C., such as 130-140° C., for example, 135-140° C., in some cases approximately 136° C., thereby hydrolyzing aluminum (e.g., forming $Al(OH)_3$, $Al_2O_3$, $AlO(OH)$, etc.). The hydrolyzed aluminum solid may then be separated from the calcium-rich fraction. Once the aluminum is removed the calcium-rich fraction, the calcium may then be heated a second time to 160-190° C., such as 175-185° C., for example approximately 180° C., thereby hydrolyzing iron (e.g., forming $Fe(OH)_2$, $Fe(OH)_3$, $FeO(OH)$, $FeO$, $FeO_2$, $Fe_2O_3$, etc.). In the same manner, the hydrolyzed iron solid may then then be separated from the calcium-rich fraction. This two-step thermal decomposition may enable a more "pure" separation of aluminum and iron for potential reuse. In certain embodiments, one or more of the separated metals is used in the process, e.g., as a flux for clinkering.

In the same manner as the single step and the two-step thermal decomposition multi-step decompositions (e.g., thermal decomposition) may be incorporated, dependent on the composition of the calcium-rich fraction and desired output(s). For example a multi-step thermal decomposition may be incorporated to hydrolyze other metal compounds from the calcium-rich fraction.

In general, the calcium-rich fraction after removal of metal compounds will be very high in calcium chloride ($CaCl_2$), e.g., at least 70%, at least 80%, at least 90%, in some cases at least 95%, or even at least 99% calcium chloride. The calcium-rich fraction will typically also be highly concentrated, e.g., 40% $CaCl_2$/60% water to 70% $CaCl_2$/30% water, or 50%/50% to 60%/40%, or even 55%/45% to 60%/40%.

Whether produced by an acid dissolution step, a one-step thermal decomposition, a two-step thermal decomposition, base addition, or any suitable combination thereof, the resulting calcium compounds, e.g., including calcium chloride, that remain in the calcium-rich fraction can then be subjected to treatment that produces one or more further products, e.g., clinker, e.g., clinker for Portland cement. This can involve removing water from the remaining calcium-rich fraction containing the calcium compounds (dehydration) to provide a high calcium solid comprising the one or more calcium compounds, e.g., one or more calcium salts, e.g., $CaCl_2$, and treating the solid, e.g., to convert it to dechlorinated calcium compounds, which may or may not include lime (CaO), and/or, after further treatment, to clinker, e.g., clinker for Portland cement, comprising dicalcium silicate and tricalcium silicate.

Dehydration

Water can be removed from the calcium-rich fraction by any suitable method, e.g., heating to evaporate water as steam; some or all of the resulting steam may be used in further processes requiring steam, as described below. The resulting calcium compound solid comprises one or more calcium salts, e.g., $CaCl_2$ (solid comprising calcium chloride) and may further comprise non-calcium salts, e.g., iron, aluminum, and/or magnesium salts, and/or other salts, so long as they are not present in quantities that render the final product unsuitable for its intended use, e.g., as clinker or cement, e.g. Portland cement and/or interfere with a process for producing the clinker or cement, e.g. Portland cement.

The calcium compound solid, e.g., solid comprising calcium chloride may be treated to produce particles of desired size for further treatment, e.g., by flaking, grinding, or other suitable method. It can then be treated to decompose the calcium containing compounds, e.g., to dechlorinate the solid comprising calcium chloride to produce a dechlorinated solid comprising calcium, that may or may not include CaO, and regenerate HCl; in order to produce clinker or cement, e.g., Portland cement, this can be further heated in the presence of flux, e.g., a flux providing Si, Fe, and Al (sintering) to produce clinker, which can be further treated to produce cement, e.g., Portland cement. It will be appreciated that one or more materials or processes of the overall method can be set, adjusted or chosen so that a desired final product is produced. For example, starting materials, Ca:Si ratios for dichlorination/clinkering, flux composition and/or amounts for clinkering, and/or clinkering conditions can be adjusted to produce a clinker or cement, e.g., Portland cement, that comprise a desired range of amounts of dicalcium silicates, tricalcium silicates, and, in some cases, other species which it is desired to have present (or not have present) in the product. Thus, one or more materials or processes can be set, adjusted, or chosen to produce a clinker comprising tricalcium silicate (C3S) at 40-70% w/w, in preferred embodiment 50-65%, in more preferred embodiments 52-63%; and/or comprising dicalcium silicate (C2S) at 10-35% w/w, in preferred embodiments 15-25%; in some embodiment less than 15%. In certain embodiments, MgO is less than a certain threshold, e.g., less than 1.0%, or less than 0.6%. In certain embodiments, no more than 15, 12, 10, or 8% tricalcium aluminate (C3A) is present, e.g., no more than 8%. It will be appreciated that functional characteristics, alternatively or in addition to compositional characteristics, may be desired and manipulated, e.g., compressive strength of a cement or mortar at one or more timepoints.

Dechlorination

In certain embodiments, the calcium compound solid, e.g., solid comprising calcium chloride, is heated in the presence of steam, silica, and, optionally, flux. Generally a flux is not needed at this step, but may be added to the mix, e.g., for convenience, such as flux containing aluminum, e.g., $Al(OH)_3$ and/or iron, e.g., $Fe(OH)_x$. In certain embodiments, some or all of the silica, e.g., at least 10, 20, 30, 40, 50, 60, 70, 80, 90, 95, 98, 99% of the silica, or 100% of the silica, is silica produced from non-limestone rocks and/or minerals, such as in an earlier step in the process, e.g., production of SCM (pozzolan) as described herein. In certain embodiments, some or all of the flux, e.g., at least 10, 20, 30, 40, 50, 60, 70, 80, 90, 95, 98, 99% of the flux, or 100% of the flux, is iron and aluminum oxides, hydroxides, and potentially other suitable compounds, produced from non-limestone rocks and/or minerals, such as in an earlier step in the process, e.g., precipitated as insoluble salts from a calcium-rich fraction, as described herein. It will be appreciated that the calcium compound solid, e.g., solid comprising calcium chloride, can comprise one or more substances that can act as a flux, but, generally, it is preferable to add exogenous flux. Heating may be performed in a single step, at a sufficiently high temperature to both decompose the calcium-bearing solid, e.g., solid comprising calcium chloride, and clinker/sinter resulting compounds with flux. In a simplest case, the calcium compound solid, e.g., solid comprising calcium chloride, is heated in the presence of steam and silica to sufficiently high temperature to decompose the calcium compounds, produce HCl, and clinker/sinter with flux. In preferred embodiments, heating may be performed in two or more steps at successively higher heats, and flux, if used, present at all or only in a portion of the steps (clinkering/sintering).

As mentioned previously, the calcium compound solid may comprise calcium chloride; in certain embodiments it comprises at least 20, 30, 40, 50, 60, 70, 80, 90, or 95% calcium chloride, such as at least 90%; in some cases at least 95%. The decomposition process results in dechlorination of calcium chloride in the solid, e.g., dechlorination of at least 90, 95, 97, 98, 99, 99.1, 99.5, 99.9, 99.91, 99.95, or 99.99% of calcium chloride in the solid. Surprisingly, it has been found that at least 99%, 99.5%, 99.9%, or even 99.95% of the calcium chloride can be dechlorinated, and these levels of dichlorination render the chloride content of the final product low enough to meet standards for Portland cement, e.g., less than 1%, or less than 0.1% chloride, without further treatment. In a preferred embodiment, at least 99% of calcium chloride in the solid is dechlorinated; in a more preferred embodiment, at least 99.9% of calcium chloride in the solid is dechlorinated; in a still more preferred embodiment, at least 99.95% of calcium chloride in the solid is dechlorinated.

In certain embodiments, the calcium compound solid, e.g., solid comprising calcium chloride, is heated to one or more temperatures or ranges of temperatures in the presence of steam and silica, where the one or more temperatures or ranges of temperatures are sufficient to drive chlorine gas off from the solid; the chlorine gas combines with protons from the steam to regenerate HCl, which can be recycled as described previously. At the same time calcium chloride is converted to dechlorinated calcium compounds, which may or may not include calcium oxide; generally the dechlorinated compounds comprise one or more silicates, such as dicalcium silicate. Temperatures may not be high enough to produce tricalcium silicate, or only minor amounts.

One overall reaction may be $$CaCl_2 + H_2O \rightarrow CaO + 2HCl$$

However, more generally, reactions can be represented as:

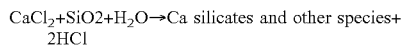

Although it is possible to perform decomposition and clinkering/sintering at one temperature, it is preferable to perform decomposition and clinkering (e.g., sintering) in a multi-step process at successively higher temperatures, where the material can be held at a given temperature for a certain duration, e.g., 0.5-5 hours, or 0.75-4 hours, or 1-3 hours, for example 1, 2, or 3 hours, and/or temperature can be increased continuously at a suitable rate or rates. This improves the efficiency and yield of dechlorination, and the process achieves surprisingly high levels of dechlorination, as discussed elsewhere. In particular, in certain embodiments silica is present e.g., a molar ratio of Ca:Si of 2.5-3.25, during the heating; heating can also be kept at a controlled rate of, e.g., not more than 80, 70, 60, 50, 40, 30, 25, 20, 15, 10, 5, 2, or 1° C./min, such as not more than 20° C./min, or not more than 10° C./min after a threshold temperature is reached, e.g., a threshold of 700-750° C., such as 700, 710, 720, 730, 740, or 750° C., and kept at the rate until a second threshold is reached, e.g., 800-1000° C., such as 800, 810, 820, 830, 840, 850, 860, 870, 880, 890, 900, 910, 920, 930, 940, 950, 960, 970, 980, 990, or 1000° C. In some cases, materials may be held at one or more temperatures or ranges of temperatures for one or more durations before proceeding. Exact rates and thresholds can depend on materials and other conditions. Additionally or alternatively, temperature can be increased gradually from one temperature to the next. Heating can be performed in any suitable system, such as a fluidized bed or a kiln; in a preferred embodiment heating is performed in a kiln, such as a rotary kiln.

Thus, provided herein is a method for dechlorinating calcium chloride comprising heating the calcium chloride in the presence of steam, silica, and, optionally, a flux comprising iron and/or aluminum compounds, such as one or more of those iron and/or aluminum compounds disclosed herein, to a first temperature, then 1) holding the calcium chloride and other components at the first temperature for a first duration to produce a first set of one or more products comprising at least HCl, and, optionally, removing the HCl; heating the remaining first set of one or more products to a second temperature, in the presence of steam, to a second, higher temperature and holding the one or more products and steam at a second temperature to produce a second set of one or more products comprising HCl, and, optionally, removing the HCl; optionally, additional steps of heating to, e.g., a third temperature, then, in certain embodiments, even a fourth temperature, and holding for a certain duration at each temperature to produce a set of products, one of which is HCl; temperatures, aluminum and/or iron compounds (if used; as noted, generally not necessary at this stage), silica, and durations can be as described; or 2) gradually heating the calcium chloride and other components from a first temperature to a second, higher temperature, wherein the rate of heating is sufficiently slow to allow a desired level of, e.g., maximal HCl, production and dechlorination; whereby the calcium chloride is at least 95% dechlorinated, in a preferred embodiment, at least 99.9% dechlorinated, in a more preferred embodiment, at least 99.95% dechlorinated.

In certain embodiments, provided is a method for dechlorinating a solid comprising calcium chloride, comprising (i) combining the solid comprising calcium chloride with a solid comprising silica; (ii) heating the combined calcium chloride and silica in the presence of steam to a temperature of 750-1250° C. to produce HCl gas and a dechlorinated calcium product. In certain embodiments, the temperature is 900-1250° C. In certain embodiments, the temperature is 1000-1250° C. In certain embodiments, the temperature is 1100-1250° C. In certain embodiments, when the temperature reaches 700-750° C., such as 700, in some cases 720, in some cases 750, heating proceeds at a rate of not more than 60, 50, 40, 30, 10, or 5° C. per minute until a temperature of 800-850° C. is reached. Without being bound by theory, it is though that the threshold temperature to keep the rate at or below a certain level, and the rate, are based on avoiding or decreasing melting of calcium chloride and ensuring that dichlorination and/or reactions with silica can occur. In certain embodiments, the solid comprising calcium chloride and the solid comprising silica are combined so that a Ca—Si molar ratio of between 1 to 4, preferably 2.5 to 3.5, more preferably 2.5-3.25 is achieved. In certain embodiments, the solid comprising calcium chloride is present at 50-90 wt % and silica is present at 10-40 wt %. In certain embodiments, the solid comprising calcium chloride comprises at least 80, 90, 92, 93, 94, 95, 96, 97, 98, or 99% calcium chloride. In certain embodiments, the solid comprising silica comprises at least 50, 60, 65, 70, 75, 80, 85, 90, or 95% silica, such as at least 60%, preferably at least 75%, more preferably at least 80%. In certain embodiments, the solid comprising calcium chloride comprises at least 90% calcium chloride and the solid comprising silica comprises at least 80% silica. In certain embodiments, the steam is present at 5-100 vol %. In certain embodiments, the chloride content is reduced at least 80, 90, 95, 96, 97, 98, or 99%; this may be accomplished by use of a ramp for heating, holding the materials at one or more temperatures for one or more durations, and/or other manipulations, as described herein. In certain embodiments, the dechlorinated calcium product comprises at least 5, 10, 15, 20, 25, 30, 35, 40, 45, 50, 55, 60, 65, 70, 75, or 80 wt % dicalcium silicate, in some cases at least 30%, such as at least 50%, of dicalcium silicate and less than 30, 20, 15, 12, 10, 9, 8, 7, 6, 5, 4, 3, 2, or 1 wt % CaO, in some cases less than 10%, such as less than 5% CaO. In certain embodiments the dechlorinated calcium product comprises at least 30% dicalcium silicate and less than 10% CaO. The dechlorinated calcium product may also contain less than 5% Cl, in some cases less than 1% Cl.

In certain embodiments provided is a solid composition comprising 1) a solid comprising at least 50, 60, 70, 80, 90, or 95% calcium chloride, such as at least 90%, in preferred embodiments at least 95% calcium chloride; 2) silica; and, optionally, 3) a flux comprising one or more iron compounds, such as one or more of $Fe(OH)_2$, $Fe(OH)_3$, $FeO(OH)$, $FeO$, $FeO_2$, $Fe_2O_3$, and/or one or more aluminum compounds, such as one or more of $Al(OH)_3$, $Al_2O_3$, $AlO(OH)$. The composition can have the components in proportions (wt %) as 50-90% calcium chloride solid; 10-40% silica; 0-4% iron compounds serving as flux; 0-4% aluminum compounds serving as flux. In a preferred embodiment, the proportions are 60-85% calcium chloride solid; 15-30% silica; 1-3% iron compounds serving as flux; 1-3% aluminum compounds serving as flux. In a more preferred embodiment, the proportions are 70-80% calcium chloride solid; 15-25% silica; 1-2% iron compounds serving as flux; 1-2% aluminum compounds serving as flux. In certain embodiments, all the components are derived from a single source, e.g., a single source comprising non-limestone rocks and/or minerals.

It is preferable heat and hold calcium compound solid in the presence of steam and, generally, silica and, optionally, flux, to a first temperature, such as a first temperature that is temperature where HCl can be handled according to methodology known in the art. In certain embodiments, the solid is heated to not more than 1250° C., e.g., 800-1250° C., in certain cases 850-1000° C. in the presence of steam, silica, and, optionally, aluminum and iron-containing compounds, to produce HCl and a dechlorinated calcium compound (e.g., in some cases including CaO)-containing product. The solid may be heated in any suitable manner and system; e.g., fluidized bed or kiln. In this and other steps, silica may be present in any suitable ratio to calcium compound, e.g., $CaCl_2$; for example, a 100-105 g sample might contain ~80 gm $CaCl_2$, ~20 gm silica, and, optionally ~1-3 gm each of aluminum and iron compounds. This is merely exemplary and it will be appreciated that the ratios of the various components may vary according to the standards for the type of clinker or cement, e.g., Portland cement to be produced, as apparent to one of ordinary skill in the art.

The dechlorinated calcium compound (e.g., in some cases including CaO)-containing product can then be heated to a second temperature, and optionally, then to a third temperature, in some cases also then to a fourth temperature, generally also in the presence steam, silica (at this point some or all of the silica may have formed silicates), and flux, such as aluminum and/or iron compounds that serve as a flux; at one or more of the highest temperatures steam may not be present. Thus, the dechlorinated calcium compound (e.g., in some cases including CaO)-containing product is clinkered in a process that can include sintering, e.g., in the presence of flux, such as aluminum- and/or iron-containing flux, to produce clinker, such as Portland cement clinker. "Clinkering" as that term is used herein, includes a process whereby solid materials are treated at elevated temperatures to produce a cement clinker; "clinkering" and "sintering" are generally used synonymously herein; the process as described herein may include various amounts of sintering, in some cases, no sintering, so long as desired products are produced. The flux can include materials produced at an earlier step of the process, e.g., aluminum and/or iron compounds removed from the calcium-rich fraction, as described above. In certain embodiments, at least 10, 20, 30, 40, 50, 60, 70, 80, 90, or 95% of aluminum- and/or iron-containing exogenous flux comprises one or more compounds removed from the calcium-rich fraction, such as at least 50%, in some cases at least 70%, and in certain embodiments, at least 90%. In certain embodiments 100% of aluminum- and/or iron-containing exogenous flux comprises one or more compounds removed from the calcium-rich fraction. In certain embodiments, exogenous flux is used that is not produced at an earlier stage of the process, e.g., clay, etc., as known in the art. Whether or not exogenous flux is present, and if so, in what amount, can be determined, at least in part, by the desired final composition, e.g., the type of Portland cement being produced. In certain embodiments a flux comprising both iron- and aluminum-containing compounds is used.

If only a second temperature is used, the process involves heating the dechlorinated calcium compound (e.g., in some cases including CaO)-containing product to 1200-1550° C., preferably no higher than 1450° C., in the presence of a flux, thus forming a clinker, e.g., Portland cement clinker comprising dicalcium silicate and tricalcium silicate; in some cases the clinker, or an intermediate, also comprises tricalcium aluminate and/or tetracalcium aluminoferrite. If intermediate temperatures are used, a temperature may be, e.g., 900-1100° C., such as 950-1050° C.; a temperature may be, e.g., 1100-1300° C., such as 1150-1250° C.; a temperature may be, e.g., 1400-1600° C., such as 1450-1550° C. In an exemplary embodiment, temperatures are, successively, 850, 1000, 1200, and 1500° C., held for 1 hour each. These are merely exemplary, and one of skill in the art can determine optimal or desired temperatures and.

During the heating processes, base, e.g., one or more calcium bases, that may have been used in a base precipitation step can regenerated, e.g., at least 10, 20, 30, 40, 50, 60, 70, 80, 85, 90, 95, 98, or 99% of the amount of base used in a base precipitation step may be regenerated.

At the end of the process, clinker can remain, where the clinker can have a diameter of millimeters, e.g., 0.5-50 mm, or 1-40 mm, or 1-30 mm; however, other sizes are acceptable for further processing.

Thus, provided herein is a clinker, e.g., Portland cement clinker comprising dicalcium silicate and tricalcium silicate, wherein the dicalcium silicate and tricalcium silicate are derived from non-limestone materials, e.g., non-limestone rocks and minerals, for example, in a process as described herein. In certain embodiments the calcium and silicates are derived from the same starting materials, e.g., the same non-limestone materials, such as non-limestone rocks and/or minerals. As used herein, "dicalcium silicate" (also referred to herein as belite, C2S) and "tricalcium silicate" (also referred to herein as alite, C3S) include the meanings known in the art of cement and concrete production, e.g., tricalcium silicate can comprise small amounts of other constituents, e.g., 3-4% substituent oxides; dicalcium silicate can comprise small amounts of other oxides besides CaO and SiO2.

Also provided herein is a concrete comprising cement, e.g., Portland cement such as OPC, produced by one or more of the processes described herein, that is, produced in a process that does not require calcining of limestone. In certain embodiments, the concrete can also comprise cement, e.g., Portland cement such as OPC, produced by conventional process, that is, a process that requires calcining of limestone.

Also provided is a method for producing a clinker from a calcium compound solid comprising calcium chloride ($CaCl_2$) comprising: (a) dechlorinating the calcium compound solid comprising $CaCl_2$ to produce a dechlorinated composition comprising Ca and having less than 10% w/w Cl; and (b) heating the dechlorinated composition in the presence of a flux to produce a clinker. The clinker can comprise dicalcium silicate and tricalcium silicate, e.g., a Portland cement clinker such as an OPC clinker. The composition comprising CaCl2 can also comprise silica; for example, the molar ratio of Ca:Si can be 1.0 to 5.0, preferably 2.0 to 4.0, more preferably 2.5 to 3.25.

Regeneration of Leaching Agents

Block S170, which includes regenerating the leaching agents, functions to replenish the leaching agents implemented in breakdown of the non-limestone material. In some variations, regenerating the leaching agents S170 may simply comprise adding new leaching agents to replace the previously consumed leaching agents. Additionally or alternatively, a process (e.g., thermal, chemical, or electric stimulation) may be implemented in regenerating the leaching agents S170.

In embodiments in which the leaching agent comprises a strong acid, e.g., HCl, at the end of all acid regeneration steps, e.g., HCl regeneration, at least 10, 20, 30, 40, 50, 60, 70, 80, 85, 90, 95, 98, or 99% of initial acid, e.g., initial HCl, may be regenerated. In a preferred embodiment, at least 80% of initial HCl is regenerated. In another preferred embodiment, at least 90% of initial HCl is regenerated. In order to provide sufficient acid, e.g., sufficient HCl, for subsequent treatment of non-limestone material, an amount of strong acid, e.g., HCl, not regenerated may be added back, i.e., topping off the strong acid, e.g., HCl.

In many variations, regenerating the leaching agents S170 may occur in conjunction with block S160, as part of a decomposition process. For example in one example or may be a distinct thermal decomposition. For example, in one implementation Calcium sulfite is thermally decomposed to make calcium oxide and calcium silicate while simultaneously regenerating a sulfur dioxide.

Additionally or alternatively, regenerating the leaching agents may be a distinct process. For example calcium sulfate make be thermally decomposed to make calcium oxide or calcium silicate and sulfur dioxide. The sulfur dioxide must then be turned into sulfuric acid to regenerate the leaching agent.

Production of Clinker or Cement

In some variations, the method may include a cement production step. That is, in variations wherein the decomposition includes a calcium compound product (e.g., calcium oxide, dicalcium silicate, and/or or tricalcium silicate), the method may include block S180, which includes producing cement from the calcium compound product. As described before, the type of cement produced may be implementation specific (e.g., ordinary Portland cement). In many variations, producing cement may include clinkering/sintering the calcium compound product and functions to produce cement. In other variations, producing cement from the calcium compound product S180 may include directly producing calcium silicates via thermal decomposition or electrochemical insertion of silica into the calcium containing compound product. Alternatively other processes may be implemented to produce cement, wherein the processes may be dependent on the types of the calcium compound product and the desired cement output.

Figure 4:
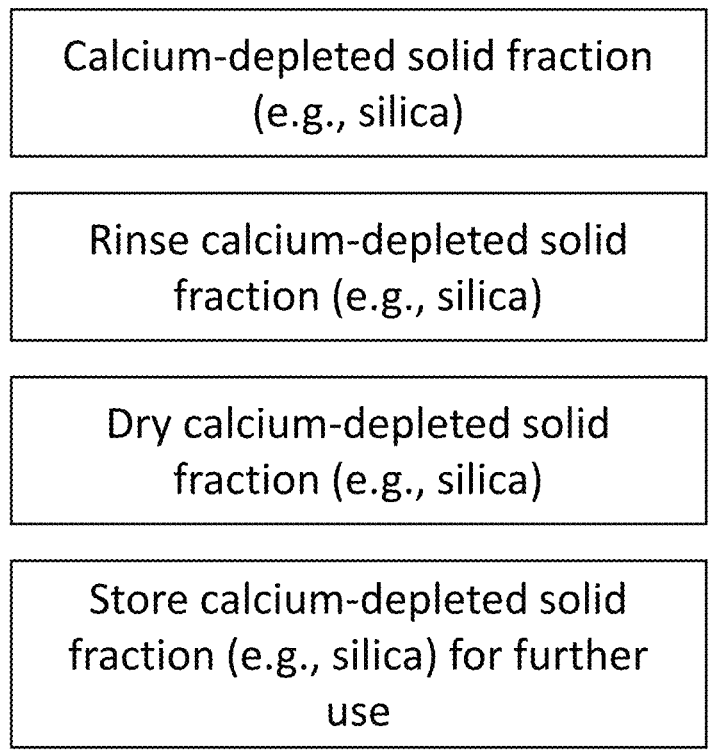
FIG. 4 shows a method to produce SCM from a calcium-depleted solid fraction.
Figure 5:
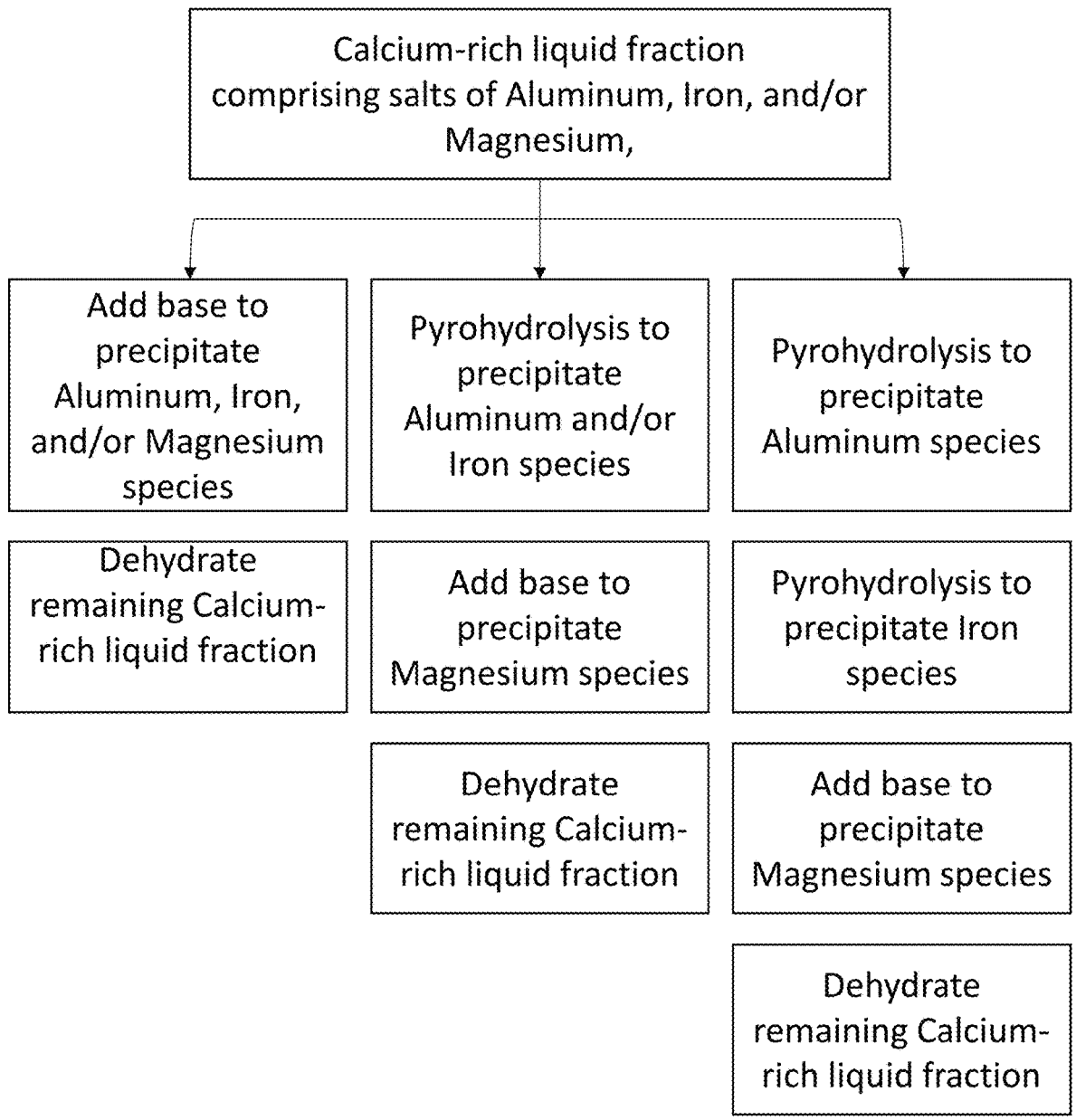
FIG. 5 shows three different methods for precipitating aluminum, iron, and/or magnesium from a calcium-rich liquid fraction.
Figure 6:
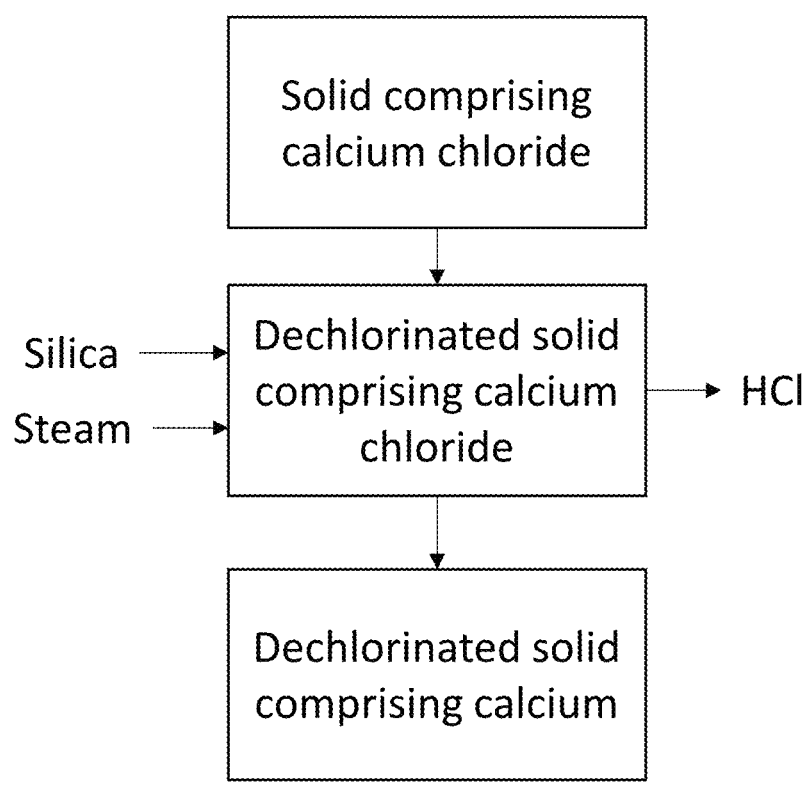
FIG. 6 shows a method for producing a dechlorinated solid comprising calcium from a solid comprising calcium chloride.
Figure 7:
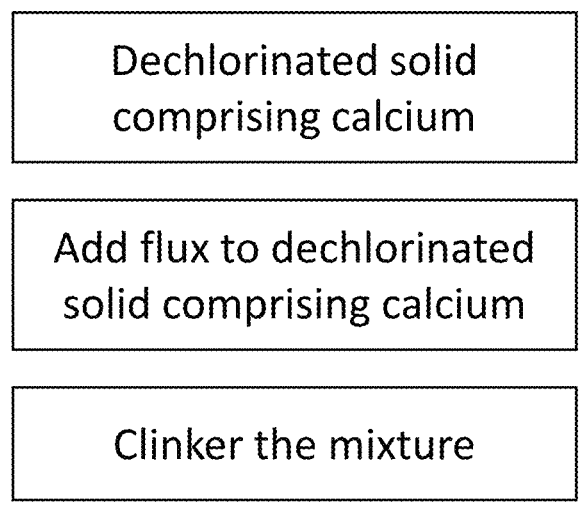
FIG. 7 shows a method for producing a clinker from a dehchlorinated solid comprising calcium

In one embodiment, provided is a method comprising contacting non-limestone material with a leaching agent to create a pulp, and deriving a calcium-rich liquid fraction and a calcium-depleted solid fraction from the pulp. See, e.g., FIG. 3. In a preferred embodiment, the non-limestone material comprises calcium, and the acid is hydrochloric acid, producing a calcium-rich liquid fraction comprising calcium chloride, In certain embodiments the non-limestone material comprises rocks and/or minerals, such as one or more rocks and minerals described herein. In certain embodiments, the method comprises treating the calcium-rich liquid fraction comprising calcium chloride to produce a solid comprising calcium chloride and dechlorinating the solid comprising calcium chloride to produce a dechlorinated solid comprising calcium compounds. In certain embodiments, the dechlorinated solid comprising calcium compounds is treated to produce clinker, which, in some cases, can be further treated to produce a cement, such as an ordinary Portland cement. Various parameters of materials and/or conditions can be set, adjusted, and/or chosen to produce a clinker that is processed to cement that has desired properties, e.g., compositional properties such as di- and/or tricalcium silicates and/or other components in a desired range of concentrations, etc., as described elsewhere herein. The calcium-depleted solid fraction can be separated from the calcium-rich liquid fraction. In certain embodiments, the non-limestone starting materials comprise both calcium and silicon, and the calcium-depleted solid fraction comprises silica, e.g., amorphous silica; the calcium-depleted solid fraction can be further treated to be used as supplementary cementitious material (SCM), e.g. by operations such as rinsing, drying, and storing for further use. See, e.g., FIG. 4. The solid can also undergo processing such as to produce particles of a desired size or range or ranges of sizes. In certain embodiments, the calcium-rich liquid fraction comprising calcium chloride comprises non-calcium salts, such as salts of aluminum, iron, and/or magnesium, and treating the calcium-rich fraction comprises treating the liquid to precipitate one or more insoluble aluminum, iron, or magnesium compounds. See, e.g., FIG. 5. The process of precipitation generally comprises at least contacting the calcium-rich liquid fraction with a base, such as a calcium base, e.g., a calcium base comprising calcium silicates, such as di- and/or tri-calcium silicate; in certain embodiments, at least some of the calcium base is provided from subsequent operations, such as dichlorination and/or clinkering. In certain embodiments, the only precipitation step is a base precipitation step. Alternatively, precipitation can also include one or more pyrohydrolysis steps, generally preceding base precipitation, to precipitate aluminum and/or iron compounds. A one-step pryhydrolysis step can be used, where both aluminum and iron compounds can be precipitated, or a two-step pyrohydrolysis process can be used, wherein aluminum compounds are precipitated in the first step and iron compounds are precipitated in the second step; if pyrohydrolysis is used, generally base precipitation produces mainly magnesium species. One- and two-step pyrohydrolysis can be performed as described elsewhere. Depending on whether pyrohydrolysis is used and on content of magnesium in starting materials, e.g., Ca/Mg ratio, more or less base can be used, so that, if materials from end processes are used as a source of base, the quantity can be, e.g., 1/20 of clinker (if starting material is Ca:Mg 20:1) or even 1/2 of clinker (e.g., if starting material 1:1), however, material consumed early in the process is replaced later in the process. Some of the HCl can be regenerated during precipitation steps. After the one or more precipitation steps, insoluble solids can be separated from the calcium-rich liquid comprising calcium chloride, and the calcium-rich liquid fraction is dehydrated to produce a solid comprising calcium chloride. The solid comprising calcium chloride can then be dechlorinated (see, e.g., FIG. 6), e.g., by combining with silica, e.g., in a ratio that provides a molar ratio of Ca:Si of 1-4, such as 2-4, in preferred embodiments 2.45-3.25, and in more preferred embodiments 2.5-3.25, and heating in the presence of steam, e.g., steam at 5-100 vol %. Some or all of the silica may be provided from the calcium-depleted solid fraction, such as at least 10, 20, 30, 40, 50, 60, 70, 80, 90, 95, or 99%, or 100%. Some or all of the steam may be provided from the dehydration step, such as at least 10, 20, 30, 40, 50, 60, 70, 80, 90, 95, or 99%, or 100%. Dechlorination can proceed under conditions as described herein, to produce a dechlorinated solid comprising calcium compounds; the dechlorinated solid can contain less than 10, 8, 7, 6, 5, 4, 3, 2, 1, or 0.1% Cl, preferably less than 5%, in some cases more preferably less than 1% w/w. Dechlorination also produces HCl, which can be routed back to the step of contacting the non-limestone material with acid. The dechlorinated solid can comprise one or more calcium silicates, such as dicalcium silicate and others; dicalcium silicate can be present at, e.g. at least 1, 5, 10, 20, 30, or 40%, such as at least 5% w/w. Little or no CaO may be present in the dechlorinated solid, such as less than 10, 5, 3, 2, or 1% w/w. The dechlorinated solid comprising calcium can be treated to produce clinker, e.g., by heating in the presence of flux (see, e.g., FIG. 7), e.g., flux comprising aluminum and iron compounds, such as aluminum and iron oxides (which as used herein include hydroxides). Conditions for producing clinker can be as described herein. In certain embodiments, some or all of the flux is provided from the one or more precipitations, such as at least 10, 20, 30, 40, 50, 60, 70, 80, 90, 95, or 99%, or 100%. In certain embodiments, some or all of the flux is provided from one or more exogenous substances, such as clay and the like, such as at least 10, 20, 30, 40, 50, 60, 70, 80, 90, 95, or 99%, or 100%. The clinker thus produced comprises hydraulic calcium silicates, such as at least di- and tricalcium silicates; conditions of the various steps (e.g., Ca:Si ratio for dechlorinating and producing clinker, flux makeup to produce clinker, etc.) can be adjusted to produce clinker with di- and tricalcium silicates in desired proportions, such as 40-70% tricalcium silicate (C3S), preferably 50-65%, such as 52-63%; and 10-35% dicalcium silicate (C2S), such as 15-25%. The clinker can also comprise tricalcium aluminate, e.g., at 5-12%, and/or tetracalcium aluminoferrite (C4AF), e.g., at 6-12%. The process can further comprise processing the clinker to produce cement, e.g., Portland cement, such as OPC. The cement thus produced can be used in producing concrete, e.g., by mixing with aggregates and water, and, in some cases, mixing with SCM. The aggregates and/or SCM may also be produced from the non-limestone material. Setting and hardening are generally similar or identical to what is found for conventionally-produced cements of the same makeup, e.g., cements produced by calcining limestone then sintering the product. The processing can include sizing, e.g., by crushing, grinding, or milling and the like and screening, and can also include addition of one or more additional substances, e.g., gypsum.

Figure 11:
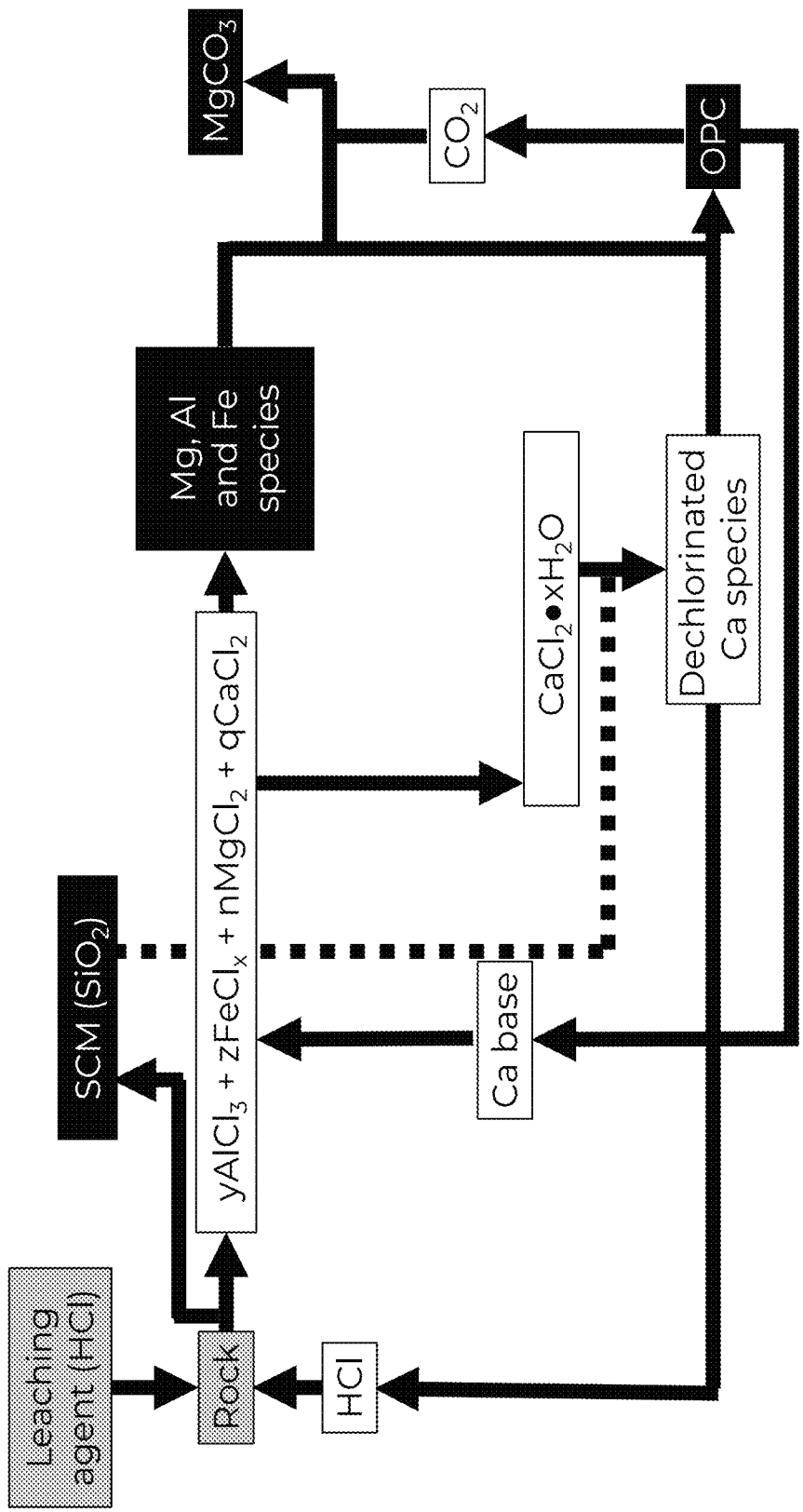
FIG. 11 shows a system and method for producing supplementary cementitious material (SCM) and clinker, e.g., clinker for OPC, from non-limestone materials, e.g., rock, using just a base precipitation unit/step
Figure 12:
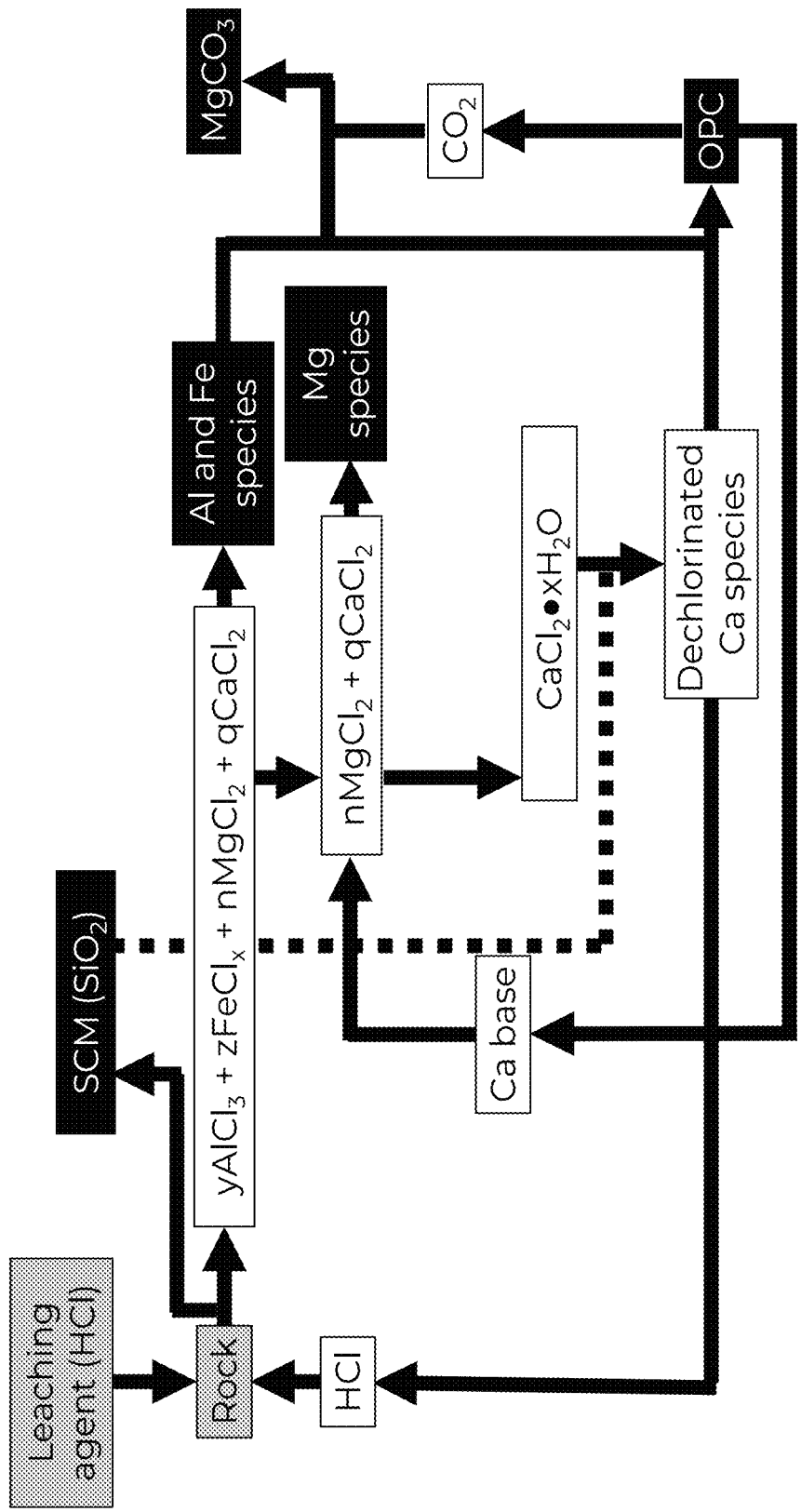
FIG. 12 shows a system and method for producing supplementary cementitious material (SCM) and clinker, e.g., clinker for OPC, from non-limestone materials, e.g., rock, using at least one pyrohydrolysis precipitation unit/step and a base precipitation unit/step

An exemplary process utilizing a single precipitation step (calcium base precipitation, where some or all of the calcium base is produced in the process) is shown in FIG. 11. An exemplary process utilizing one or more pyrohydrolysis precipitations followed by base precipitation is shown in FIG. 12.

In certain embodiments, insoluble magnesium species, such as magnesium silicates, magnesium hydroxides, and the like, produced during the precipitation steps of the above process or others described herein can be used to sequester carbon dioxide, such as atmospheric carbon dioxide and/or carbon dioxide that is a component of flue gas produced in one or more combustion steps to produce energy for the process (and, in some cases, also sequester other components, such as SOx, NOx, and/or other components); the carbon dioxide reacts with the magnesium species to produce magnesium carbonate. In certain embodiments the magnesium species can be placed in a body of water, such as an ocean, where they can form magnesium bicarbonates, thus sequestering twice the carbon dioxide of magnesium carbonate production; they may also produce a buffering effect.

It will be appreciated that the processes provided herein can produce less carbon dioxide than conventional methods of producing cement which typically require calcining of limestone and sintering; the calcining produces carbon dioxide from the limestone and both the calcining and the sintering produce carbon dioxide from combustion of fuel to heat materials. Processes such as those provided herein do not utilize starting materials that comprise large amounts of calcium carbonate and, indeed, do not require any calcium carbonate, though some may be present in non-limestone materials. Depending on starting materials (e.g., materials with higher magnesium content can produce more magnesium species to sequester carbon dioxide) and, in particular, fuel used to provide energy for various steps (heating, etc), as well as other factors such as transportation, etc., the carbon dioxide produced can be less than 80, 70, 60, 50, 40, or 30% the amount produced in a conventional process to produce the same amount of equivalent cement from limestone. In certain embodiments, a process such as those provided herein can produce less than 500 kg carbon dioxide/1000 kg cement produced, e.g., if coal is used as a fuel. In certain embodiments, a process such as those provided herein can produce less than 300 kg carbon dioxide/1000 kg cement produced, e.g., if natural gas is used as a fuel. If one or more magnesium species produced in the process is used to sequester carbon dioxide, e.g., from flue gas, the atmosphere, and/or when placed in a body of water, e.g., an ocean, carbon dioxide produced can be less than 250, 200, 150, 100, or 50 kg carbon dioxide/1000 kg cement produced. In certain embodiments, the process is carbon neutral or even carbon negative, e.g, at least 50, 75, 100, 125, 150, 200, 250, 300, 400, or 500 kg carbon dioxide sequestered/1000 kg cement produced; generally a smaller carbon positive or larger carbon negative value will be produced if magnesium species are placed in a body of water, such as an ocean, because bicarbonate can be produced, sequestering two CO2 per Mg. It will be appreciated that the decreased amount of carbon dioxide compared to conventional processes, or even negative carbon dioxide, can be converted into carbon credits. Such credits can be based on carbon dioxide avoided (e.g., compared to a conventional process for producing the same amount of equivalent cement) and, in some cases, also carbon dioxide sequestered (e.g., by magnesium species produced in the process). Appropriate monitoring/calculation of carbon dioxide produced vs. carbon dioxide avoided and/or sequestered can be performed, with safeguards to ensure compliance with existing standards and regulations.

Herein, example implementations of the method as described above are given. These examples demonstrate different potential implementations of the method without any additional limitations on the method. Although not explicitly included in all the examples, dependent on the obtained non-limestone material, any example may include additional enriching steps (e.g., block S120) as desired or necessary.

In a first example, obtaining a non-limestone material S110 comprises obtaining silicate rock material. Dissolving the non-limestone material S130 comprises adding a hydroiodidic (HI) first acid as a leaching agent. Thus the silicate rock material is dissolved in HI. Separating the calcium-depleted fraction from the calcium-rich fraction S140 comprises separating the solid fraction, primarily $SiO_2$, from the liquid fraction; and then drying and packaging the $SiO_2$ as an SCM. The SCM may then be stored and packed, sold, or utilized in any desired manner. Separating out the calcium containing compounds from the calcium-rich fraction S140 includes precipitating the metal containing compounds. This occurs by: slowly adding $CaSiO_3$ and then adding $Ca(OH)$, $Ca_2SiO_4$, $Ca_3SiO_5$, electrochemically produced hydroxides or NaOH, or a similarly sufficiently strong base thereby neutralizing the HI first acid; precipitating out $Al(OH)_3$, $Fe(OH)_x$, and $Mg(OH)_2$; forming $CaI_2$; and then lowering the temperature to precipitate out $CaI_2$ and $H_2O$. Decomposing the calcium compounds S160 and regenerating leaching agents S170 occur concurrently by thermally decomposing the calcium containing compounds. Thermally decomposing $CaI_2$ may thus form CaO, $CaSiO_3$, $Ca_2SiO_4$, or $Ca_3SiO_5$ and regenerate the HI first acid. In a cement production implementation, the first example may further include sintering the calcium oxide, comprising: in a kiln, sintering CaO with $SiO_2$, $Al(OH)_3$ and $Fe(OH)_x$, thus forming ordinary Portland cement. Additionally, the example may include scrubbing the flue gas with $Mg(OH)_2$ to make $MgCO_3$. Additionally or alternatively, the $Mg(OH)_2$ may be put in a waste pile where it can contact the air and slowly turn into $MgCO_3$.

In a second example, obtaining a non-limestone material S110 comprises obtaining silicate rock material. Dissolving the non-limestone material S130 comprises adding a hydrochloric acid (HCl) first acid. The silicate rock material is thus dissolved in a hydrochloric acid (HCl). Separating the calcium-depleted fraction from the calcium-rich fraction S140 comprises separating the solid fraction, primarily $SiO_2$, from the liquid fraction; and then drying and packaging the $SiO_2$ as an SCM, wherein the SCM may be used as desired (e.g., for cement production, for storage, for sale). Separating out the calcium containing compounds from the calcium-rich fraction S140, includes precipitating the metal containing compounds. This occurs by: slowly adding $CaSiO_3$; adding $Ca(OH)$ $Ca_2SiO_4$, $Ca_3SiO_5$, or a similarly strong base, thereby neutralizing the HCl first acid; precipitating out $Al(OH)_3$, $Fe(OH)_x$, and $Mg(OH)_2$; forming $CaCl_2$. A leaching agent, $SO_2$, is then added, thereby precipitating out $CaSO_3$ and regenerating HCl. Decomposing the calcium compounds S160 and regenerating leaching agents S170 occur concurrently by thermally decomposing the calcium containing compounds. Thermally decomposing $CaSO_3$ may thus form $CaO$, $CaSiO_3$, $Ca_2SiO_4$ or $Ca_3SiO_5$ and regenerate $SO_2$. In a cement production implementation, the second example may further include sintering the calcium oxide, comprising: In a kiln, sintering $CaO$ with $SiO_2$, $Al(OH)^3$ and $Fe(OH)_x$, thus forming ordinary Portland cement. Additionally the example may include scrubbing the flue gas with $Mg(OH)_2$ to make $MgCO_3$. Additionally, or alternatively, the $Mg(OH)_2$ may be put in a waste pile where it can contact the air and slowly turn into $MgCO_3$. Example two may be particularly applicable in implementations having high concentrations of $Ca(OH)_2$.

In a third example, obtaining a non-limestone material S110 comprises obtaining silicate rock material. Dissolving the non-limestone material S130 comprises adding a hydrochloric acid (HCl) first acid). Thus, the silicate rock material is dissolved in the hydrochloric acid (HCl) first acid. Separating the calcium-depleted fraction from the calcium-rich fraction S140 comprises separating the solid fraction, primarily $SiO_2$, from the liquid fraction; and then drying and packaging the $SiO_2$ as an SCM. Separating out the calcium containing compounds from the calcium-rich fraction S150 includes precipitating the metal containing compounds. This occurs by: slowly adding $H_2SO_4$, thus forming $CaSO_4$ and HCl; and adding additional HCl, thus precipitating out the metal chlorides (e.g., $AlCl_3$, $FeCl_x$, $MgCl_2$). Decomposing the calcium compounds S160 may occur by thermally decomposing the calcium compounds. That is $CaO$, $CaSO_4$ are thermally decomposed and $SO_2$ is regenerated.

Regenerating leaching agents S170 occur by thermally decomposing the metal containing compounds in the presence of water. That is, $AlCl_3$, $FeCl_x$, $MgCl_2$, and HCl first acid is regenerated. In a cement production variation, the third example may further include thermally decomposing $CaSO_4$ with $Al_2O_3$, $Fe_2O_3$, and $SiO_2$, thus producing ordinary Portland cement and $SO_2$. Additionally the example may include scrubbing the flue gas with $Mg(OH)_2$ to make $MgCO_3$. Additionally or alternatively, the $Mg(OH)_2$ may be put in a waste pile where it can contact the air and slowly turn into $MgCO_3$.

In a fourth example, obtaining a non-limestone material S110 comprises obtaining silicate rock material. Dissolving the non-limestone material S130, comprises adding a hydrochloric acid (HCl) first acid. Thus, the silicate rock material is dissolved in the hydrochloric acid (HCl) first acid. Separating the calcium-depleted fraction from the calcium-rich fraction S140, comprises separating the solid fraction, primarily $SiO_2$, from the liquid fraction; and then drying and packaging the $SiO_2$ as an SCM. Separating out the calcium containing compounds from the calcium-rich fraction S140, includes precipitating the metal containing compounds. This occurs by: slowly adding NaOH, thereby neutralizing the first acid and precipitating out $Al(OH)_3$, $Fe(OH)_x$, and $Mg(OH)_2$, and forming NaCl; electrolyzing NaCl, thereby regenerating NaOH, and forming $H_2$ and $Cl_2$; and using a synthesis unit to make HCl from $H_2$ and $Cl_2$. The synthesis unit comprises a typical synthesis unit for the chloroalkali process. For example the synthesis unit may comprise burning chlorine with $H_2$ for a HCl synthesis unit. In a cement production variation, the fourth example may further include sintering the calcium product, comprising: In a kiln, sintering $CaOH_2$ with $SiO_2$, $Al(OH)_3$ and $Fe(OH)_x$, thus forming ordinary Portland cement. Additionally the example may include scrubbing the flue gas with $Mg(OH)_2$ to make $MgCO_3$. Additionally or alternatively, the $Mg(OH)_2$ in a waste pile where it can contact the air and slowly turn into $MgCO_3$.

In a fifth example, an organic or biogenic acid is utilized as a leaching agent. In this example, obtaining a non-limestone material S110 comprises obtaining silicate rock material. Dissolving the non-limestone material S130 comprises adding a leaching agent that is an organic acid first acid (e.g., oxaclic acid). Any organic acid (e.g., oxalic acid) may either selectively leach other metals (e.g., Al, Fe, and Mg) leaving behind most of the calcium compounds or (unlike oxalic acid) selectively leach calcium leaving behind the other metals. Separating the leached metal-organic acid complex (e.g., metal-oxalates) may be separated from the spent source non-limestone material using flotation. The organic-acid metal complex may then be oxidized (e.g., burned) to make carbon dioxide and metal oxides. Alternatively, if the calcium was leached, the calcium oxide may be oxidized and sintered to make cement. Regenerating the organic acid leaching agents may comprise using an engineered microbe, carbon dioxide, and sunlight. In implementations wherein calcium is left in the spent rock, method steps may be repeated to better leach calcium and precipitate it.

In a sixth example, obtaining a non-limestone material S110 comprises obtaining silicate rock material. Dissolving the non-limestone material S130, comprises using an electrolyzer to split water or salt thus generating an acid at the anode and a base at the cathode and reacting the acid with the non-limestone material. Thus, the silicate rock material is dissolved in the electrolytically produced first acid which may be hydronium ions, HCl, HBr, and any sufficiently strong acid. Separating the calcium-depleted fraction from the calcium-rich fraction S140, comprises separating the solid fraction, primarily $SiO_2$, from the liquid fraction; and then drying and packaging the $SiO_2$ as an SCM. Separating out the calcium containing compounds from the calcium-rich fraction S140, includes precipitating the metal containing compounds. This occurs by: slowly adding base which is created at the cathode via water splitting or salt splitting and may be hydroxide ions, NaOH, $Ca(OH)_2$ or any other sufficiently strong base thereby neutralizing the first acid and precipitating out $Al(OH)_3$, $Fe(OH)_x$, $Mg(OH)_2$ and finally $Ca(OH)_2$. In a cement production variation, the sixth example may further include sintering the calcium product, comprising: In a kiln, sintering $CaOH_2$ with $SiO_2$, $Al(OH)_3$ and $Fe(OH)_x$, thus forming ordinary Portland cement. Additionally the example may include scrubbing the flue gas with Mg(OH)$_2$ and/or other magnesium compounds, to make MgCO$_3$. Additionally or alternatively, the Mg(OH)$_2$ and/or other magnesium compounds is placed in a waste pile where it can contact the air and slowly turn into MgCO$_3$.

In a seventh example, obtaining a non-limestone material S110 comprises, e.g., obtaining non-limestone rocks and/or minerals, e.g., silicate rock material. Any suitable starting material may be used, so long as it comprises calcium in sufficient quantity to provide a desired final product, e.g., final clinker or cement, such as Portland cement. If a process is used that also produces supplementary cementitious material (SCM), the starting material will also contain one or more compounds that can provide a final material that comprises amorphous (non-crystalline) compounds that can serve as SCMs. These may include amorphous silica, in which case the starting material will also comprise silicon. However, other substances can provide amorphous compounds that serve as SCM, such as amorphous iron and alumina compounds, as is known in the art; in these cases, the starting material includes the requisite starting elements. In certain embodiments in which both clinker or cement, such as Portland cement and SCM are produced, the starting material comprises non-limestone material, e.g., non-limestone rock and/or mineral comprising calcium and silicon, such as a rock and/or mineral comprising calcium silicate. When rock and/or mineral is used, any suitable rock and/or mineral may be used, such as one or more of basalt, gabbro, pyroxenites, anorthosites, skarns, amphibolite, or a combination thereof. Other suitable rocks and/or minerals are as described herein or apparent to one of skill in the art.

In general, the non-limestone material, e.g., rock and/or mineral is treated to provide a calcium-rich fraction comprising one or more calcium salts and calcium-depleted fraction, generally a solid. The calcium-depleted fraction, e.g., solid, may be removed. In certain embodiments, the solid comprises amorphous compounds, such as amorphous silica, and can be used as a SCM. The calcium-rich fraction can be a solution comprising calcium salts and can also comprises non-calcium salts, such as Fe, Al, Mg (e.g., chlorides thereof), and/or other salts.

In certain cases, the nature and concentration of the non-calcium salts is such that no further processing of the calcium-rich fraction is required, as its contents can be converted to an acceptable final product, e.g., clinker or cement, e.g., Portland cement. This can be the case, e.g., if starting material comprises or consists of wollastonite. In other cases, the nature and concentration of the non-calcium salts require that one or more of them be removed from solution. In this case the calcium-rich fraction is treated to reduce the concentration of non-calcium salts, e.g., to an acceptable level for production of a final product, such as a final clinker or cement, e.g., Portland cement product. Then the solution is treated to render the one or more calcium salts in solid form, and the one or more calcium salts can be treated, to produce further products; e.g., by decomposing to provide at least dicalcium and tricalcium silicates, e.g., in proportions suitable for a clinker or cement, e.g., Portland cement. One or more of the above treatments may serve to regenerate one or more of starting materials; e.g., if a starting material comprises an acid, such as a strong acid, at least a portion of the acid may be regenerated. The material may be further treated, e.g., to render it to a suitable size or size range, e.g., for use as Portland cement. The process may be any suitable type of process, such as a batch process, a continuous process (e.g., comprising one or more countercurrent processes), semi-continuous process, or the like, as known in the art.

The non-limestone material, e.g., rock and/or mineral can be processed to provide particles in a desired size range. Any suitable process or processes may be used, such as crushing, grinding, and/or milling, and sieving or the like. Suitable size ranges include 1-500 u, 5-300 u, 10-200 u, 20-130 u, 45-90 u, or a combination thereof. In a preferred embodiment the size range is 20-130 u. In a more preferred embodiment, the size range is 45-90 u.

The non-limestone material, e.g., rock and/or mineral material is contacted with a strong acid to form a pulp comprising the acid and non-limestone material, e.g., rocks and/or minerals. Any suitable strong acid may be used, such as HCl, HBr, HI, H$_2$SO$_4$, or HNO$_3$. In certain embodiments the strong acid comprises HCl. For convenience the remainder of the process will be described in terms of HCl; as will be apparent to one of skill in the art, if another acid is used in addition to or as an alternative to HCl, suitable adjustments may be made to accommodate the additional/alternative acid.

Dissolving the non-limestone material S130 comprises adding a hydrochloric acid (HCl) acid). Thus, the non-limestone material, e.g., rocks and/or minerals such as silicate rock material, is dissolved in the hydrochloric acid (HCl) acid. In certain embodiments, the proportion of strong acid that comprises HCl is at least 20, 30, 40, 50, 60, 70, 80, 90, 95, or 99% of the strong acid. In a preferred embodiment, at least 90% of the strong acid is HCl. In a more preferred embodiment, at least 95% of the strong acid is HCl. In a still more preferred embodiment, at least 98% of the strong acid is HCl. In an even more preferred embodiment, 99-100% of the strong acid is HCl, such as 100% of the strong acid is HCl. Any suitable concentration of strong acid, e.g., HCl may be used, such as 5-40%, 10-37%, 10-30%, 15-35%, 17-23%, 20-30% wt/wt, or about or exactly 15, 16, 17, 18, 19, 20, 21, 22, 23, 24, 25, 26, 27, 28, 29, or 30%, such as about or exactly 20%. In preferred embodiments the HCl is 10-37%. In still more preferred embodiments the HCl is 15-35%. The ratio of solid non-limestone material, e.g., rock and/or mineral, to liquid (acid) in the initial pulp may be any suitable ratio; it will be appreciated that some of the solid rock and/or mineral will begin dissolving in the acid immediately and that these ratios will change as solid dissolves into solution. Suitable initial ratios can be in the range of 5% solid/95% liquid to 40% solid/60% liquid, such as 10% solid/90% liquid to 30% solid/70% liquid; in a preferred embodiment 15% solid/85% liquid to 25% solid/75% liquid, such as 20% solid/80% liquid.

The pulp is treated to cause dissolution of at least a sufficient amount of calcium compounds in the non-limestone material, e.g., rocks and/or minerals, to enter solution to provide a satisfactory final product, e.g., to be converted to clinker or cement, e.g., Portland cement. In certain embodiments, at least 50, 60, 70, 80, 90, or 95% of calcium in the starting material enters solution, preferably at least 70%, more preferably at least 80%, even more preferably at least 90%. The treatment can occur in a process open to the atmosphere, or at least not pressurized. The treatment can include heating and/or maintaining the pulp at a temperature or range of temperatures for a certain duration. In general, duration of treatment and/or temperature may be used, to provide the desired dissolution. Suitable temperature ranges at which the pulp is maintained include 60-115° C., 70-115° C., 80-115° C., 90-115° C., 100-115° C., 60-112° C., 70-112° C., 80-112° C., 90-112° C., 100-112° C., 60-110° C., 80-110° C., 90-110° C., or 100-110° C.; it will be appreciated that, due to presence of a high concentration of HCl and also as material dissolves in the liquid phase, boiling temperature for the HCl solution can be above 100° C. Thus, in certain embodiments, the temperature is at least 95, 96, 97, 98, 99, or 100° C.; in preferred embodiments the temperature is at least 90° C.; in more preferred embodiments range the temperature is at least 95° C.; in still more preferred embodiments, the temperature is at least 98° C.; and in even more preferred embodiments the temperature is at least 100° C. In certain embodiments the maximum temperature is 105, 106, 107, 108, 109, 110, 111, 112, 113, 114, or 115° C.; in a preferred embodiment the maximum temperature is 105° C.; in a more preferred embodiment the maximum temperature is 108° C.; in a still more preferred embodiment the maximum temperature is 110° C. In certain embodiments, the temperature is brought to and/or maintained at 100-115%. In certain embodiments the temperature is brought to and/or maintained at 100-110° C. Any suitable duration of treatment may be used. This can depend, to some degree, on the calcium content of the starting material, e.g., non-limestone rock and/or mineral; materials with lower calcium content can require longer treatment to achieve a desired amount of calcium salts in solution. Thus, the duration of treatment may be at least 1, 2, 3, 4, 5, 6, 7, 8, or 10 hours and/or not more than 2, 3, 4, 5, 6, 7, 8, 10, 12, 15, 20, 24, 30, 36, 40, 48, 60, or 72 hours. In certain embodiments, the duration can be 2-24 hours, such as 4-18 hours or even 4-12 hours or less. In certain embodiments, the duration may be 6-72 hours, such as 4-48 hours, or 4-36 hours, or 4-24 hours. The pulp can be agitated during treatment, e.g., stirred, for example stirred at 10-1000 RPM, 20-800 RPM, 50-500 RPM, 50-400 RPM, or 100-300 RPM. In preferred embodiments, the pulp is stirred at 50-400 RPM, more preferably at 100-300 RPM. Other methods of agitation as known in the art may be used.

A calcium-depleted fraction (solid) and a calcium-rich fraction (liquid) are produced from the pulp. See, e.g., FIG. 3.

Separating the calcium-depleted fraction from the calcium-rich fraction S140 comprises separating the solid fraction, which can be primarily $SiO_2$, such as amorphous silica, and/or other amorphous substances suitable for use as SCMs, e.g., pozzolans, from the liquid fraction; and then optionally rinsing, then drying and in certain cases packaging the solid fraction, e.g., $SiO_2$, as an SCM. Further details of processes directed at producing SCM, e.g., pozzolan, are given below. When the solid fraction comprises silica, a portion of the solid fraction may be directed to dechlorination and/or clinkering processes, as described below.

The calcium-rich fraction is further treated; in certain embodiments the ultimate result of the further treatment is to produce diner or cement, e.g., hydraulic cement such as Portland cement, for example, ordinary Portland cement (OPC) and, generally, to regenerate the acid. In addition, certain non-calcium substances, such as substances containing one or more of iron, aluminum, and/or magnesium, may be generated, depending on treatment of calcium-rich fraction. The further treatment can depend on the likely composition of the calcium-rich fraction, which can, in turn, depend at least partly on starting materials.

In general, the calcium-rich fraction will contain non-calcium salts, also referred to herein as metal compounds, in addition to calcium salts, and next procedures can depend on the proportion of non-calcium salts (metal compounds) to calcium salts, or expected proportion, which can be based, at least in part, on starting materials. If the proportion of one or more non-calcium salts is, or is expected to be, above a certain threshold in the calcium-rich fraction, the calcium-rich fraction may be treated to remove at least a portion of one or more non-calcium salts, e.g., to bring their level in the calcium-rich fraction to below the threshold. The threshold can be determined by, e.g., desired composition of the final product, e.g., cement, such as hydraulic cement such as Portland cement, for example OPC. For example, certain non-calcium substances, such as derivatives of iron, aluminum, and/or magnesium salts, can allowable in a hydraulic cement such as Portland cement, e.g., OPC, but only below certain levels, often depending on the type of cement (e.g., ASTM Type 1, 2, 3, 4, or 5, or similar standard) and/or the standard to be met, as standards can vary depending on geographic location. The threshold can be based, at least in part, on the expected levels of non-calcium salt-derived substances, such as aluminum, iron, and/or magnesium substances, in the final clinker or cement such as Portland cement, e.g. OPC, product after further treatment.

In certain embodiments, the calcium-rich fraction is not treated to remove non-calcium salts. This can be the case if the starting material is particularly high in calcium compounds; an exemplary such starting material is wollastonite. In such cases, calcium-rich fraction treatment is generally directed to removing water to produce solid calcium salts, and further treatment to convert the calcium salts to desired final product, e.g., clinker or cement such as Portland cement. Such treatments are described further, below.

In certain embodiments, the calcium-rich fraction is treated to remove one or more non-calcium salts. Any suitable treatment or combination of treatments may be used so long as a sufficient quantity of non-calcium salts are converted to a form that can be separated from the calcium-rich fraction, such as converted to solid form. The treatment or combination of treatments can also result in regeneration of at least a portion of the original strong acid, e.g., HCl. All of the non-calcium salts need not be removed, so long as the proportion left in solution is below the threshold proportion. In certain embodiments, the calcium-rich fraction is elevated to and/or maintained at one or more temperatures or temperature ranges to cause formation of one or more insoluble non-calcium substances from one or more non-calcium salts. Additionally or alternatively, in certain embodiments the calcium-rich fraction is treated with one or more substances, such as one or more bases, which cause formation of one or more insoluble non-calcium substances from one or more non-calcium salts.

Thus, the calcium-rich fraction can contain soluble non-calcium salts, such as salts of Al, Fe, and/or Mg, which can also be referred to as metal containing compounds. Separating out the calcium containing compounds from the calcium-rich fraction S150 includes precipitating soluble non-calcium salts (metal containing compounds). In certain embodiments, this comprises a one-step thermal decomposition (pyrohydrolysis) process. In certain embodiments, this comprises a multi-step thermal decomposition (pyrohydrolysis) process, such as a two-step thermal decomposition process. In certain embodiments, this comprises addition of a base. In certain embodiments, a one-step thermal decomposition (pyrohydorlysis) and addition of base are used. In certain embodiments, a two-step decomposition (pyrohydrolysis) and addition of base are used. In certain embodiments, only addition of base is used. In general, at least some of the strong acid, e.g., HCl is also regenerated during the process (es).

In certain embodiments, the calcium-rich fraction is elevated to and/or maintained at one temperature or range of temperatures (one step thermal decomposition or pyrohydrolysis), causing formation of a set of insoluble non-calcium substances, which can be removed from the calcium-rich fraction. The temperature or range of temperatures may be one at which a one or more non-calcium salts, such as at least iron and aluminum salts, form insoluble substances, e.g., insoluble iron and aluminum substances. Further non-calcium salts that may form insoluble substances include boron, lithium, rubidium, cesium, strontium, barium, and/or radium salts. The temperature can be any suitable temperature or range of temperatures, e.g., at least 140, 145, 150, 155, 160, 165, 170, 175, or 180° C. and/or not more than 145, 150, 155, 160, 165, 170, 175, 180, 185, 190, or 195° C.; in certain embodiments, the calcium-rich fraction is heated to 140-195° C.; in a preferred embodiment the calcium-rich fraction is heated to 140-185° C.; in a more preferred embodiment the calcium-rich fraction is heated to 150-185° C., or even 175-185° C. In certain embodiments the calcium-rich fraction is heated to at least 140° C., for example, at least 150° C., such as at least 160° C., in certain cases at least 170° C. Any suitable method of bringing the calcium-rich fraction to the desired temperature and/or maintaining it at the desired temperature may be used; methods of heating a solution and/or maintaining it at a temperature or range of temperatures are well-known in the art. The calcium-rich solution may be maintained at or near the desired temperature for a suitable duration, such as at least 0, 1, 2, 5, 10, 20, 30, 40, or 50 min or 1, 1.5, 2, 2.5, 3, 4, 5, 7, or 10 hours, and/or not more than 1, 2, 5, 10, 20, 30, 40, or 50 min or 1, 1.5, 2, 2.5, 3, 4, 5, 7, 10, or 15 hours. In certain embodiments, the calcium-rich fraction is maintained at or near the desired temperature for 10 min to 5 hours, such as 30 min to 4 hours, in some cases 1 to 3 hours. As the calcium-rich fraction is heated and/or maintained at an elevated temperature, HCl gas is driven off. Some or all of this gas can be captured and dissolved in aqueous medium to regenerate HCl; in certain embodiments the HCl gas is captured and returned to an aqueous medium, such as an HCl solution that is, or will be, used as a leach agent for treatment of subsequent materials comprising calcium. The insoluble substances generated by elevating temperature can be separated from the remaining calcium-rich fraction by any suitable method, such as centrifugation, filtration, or the like. Insoluble substances can include one or more compounds of aluminum and/or iron, such as $Al(OH)_3$, $Al_2O_3$, $AlO(OH)$, $Fe(OH)_2$, $Fe(OH)_3$, $FeO(OH)$, $FeO$, $FeO_2$, $Fe_2O_3$, etc.

In certain embodiments, a two-step thermal decomposition process is used. This occurs by first incorporating a two-step thermal decomposition (two-step pyrohydrolysis); first heating the mixture to a temperature or range of temperatures such that aluminum salts, e.g., $AlCl_3$, form insoluble aluminum substances, such as $Al(OH)_3$, $Al_2O_3$, $AlO(OH)$, etc., but iron salts, e.g., $FeCl_2$ and/or $FeCl_3$, do not form insoluble substances, such as $Fe(OH)_2$, $Fe(OH)_3$, $FeO(OH)$, $FeO$, $FeO_2$, $Fe_2O_3$, etc., or do not substantially form insoluble substances. In certain embodiments, the first temperature is below 150, or below 145, or below 140° C. In certain embodiments, the first temperature is 130-145° C., 131-144° C., 132-141° C., 133-139° C., or 135-137° C., such as about or exactly 136° C., or such as approximately 140° C. Any suitable method of bringing the calcium-rich fraction to the desired temperature and/or maintaining it at the desired temperature may be used. The calcium-rich solution may be maintained at or near the desired temperature for a suitable duration, such as at least 0, 1, 2, 5, 10, 20, 30, 40, or 50 min or 1, 1.5, 2, 2.5, 3, 4, 5, 7, or 10 hours, and/or not more than 1, 2, 5, 10, 20, 30, 40, or 50 min or 1, 1.5, 2, 2.5, 3, 4, 5, 7, 10, or 15 hours. In certain embodiments, the calcium-rich fraction is maintained at or near the desired temperature for 10 min to 5 hours, such as 30 min to 4 hours, in some cases 1 to 3 hours. The process causes aluminum to form insoluble compounds, e.g., oxidizes Aluminum (e.g., forming $Al(OH)_3$, $Al_2O_3$, $AlO(OH)$, etc.). HCl is also regenerated, as described for the one-step thermal decomposition process. The insoluble, e.g., oxidized, Aluminum compounds may then separated from the calcium-rich fraction solution; they may be further processed, e.g., dried. The remaining solution is then brought to a second temperature or range of temperatures at which one or more non-calcium salts, such as at least iron salts, form insoluble substances, e.g., $Fe(OH)_2$, $Fe(OH)_3$, $FeO(OH)$, $FeO$, $FeO_2$, $Fe_2O_3$, etc. The temperature can be any suitable temperature or range of temperatures, e.g., at least 140, 145, 150, 155, 160, 165, 170, 175, or 180° C. and/or not more than 145, 150, 155, 160, 165, 170, 175, 180, 185, 190, or 195° C.; in certain embodiments, the remaining solution is heated to 140-195° C.; in a preferred embodiment the remaining solution is heated to 150-190° C.; in a more preferred embodiment the remaining solution is heated to 175-185° C. In certain embodiments the remaining solution is heated to at least 145° C., such as at least 170° C., in certain cases at least 175° C., for example a second heating step to approximately 180° C. Any suitable method of bringing the calcium-rich fraction to the desired temperature and/or maintaining it at the desired temperature may be used. The calcium-rich solution may be maintained at or near the desired temperature for a suitable duration, such as at least 0, 1, 2, 5, 10, 20, 30, 40, or 50 min or 1, 1.5, 2, 2.5, 3, 4, 5, 7, or 10 hours, and/or not more than 1, 2, 5, 10, 20, 30, 40, or 50 min or 1, 1.5, 2, 2.5, 3, 4, 5, 7, 10, or 15 hours. In certain embodiments, the calcium-rich fraction is maintained at or near the desired temperature for 10 min to 5 hours, such as 30 min to 4 hours, in some cases 1 to 3 hours. This temperature serves to cause formation of insoluble iron compounds, e.g., oxidize iron (e.g., forming $Fe(OH)_2$, $Fe(OH)_3$, $FeO(OH)$, $FeO$, $FeO_2$, $Fe_2O_3$, etc.) and simultaneously regenerate the HCl first acid as in the first heating step. The insoluble, e.g., oxidized Fe may then be separated from the calcium-rich fraction solution; it may then be further processed, e.g., dried.

In certain embodiments, the calcium-rich fraction is treated with one or more bases, causing formation of a set of insoluble non-calcium substances, which can be removed from the calcium-rich fraction. HCl can also be regenerated during the base addition. In certain embodiments, this is the only process used to cause formation of insoluble non-calcium substances (precipitating metal compounds). In certain embodiments, a one-step thermal decomposition process and addition of base is used. In certain embodiments, a two-step thermal decomposition process and addition of base is used. The base or bases may be any suitable base or bases, so long as the strength and amount of the base or bases is sufficient to precipitate a desired amount of metal compounds. In certain embodiments, the base comprises calcium base. In certain embodiments, the base or bases comprises a substance or substances produced as a product in the process, such as a calcium base, e.g., $CaO$, $Ca(OH)_2$, or $CaSi$ such as dicalcium or tricalcium silicate. In certain embodiments, at least 10, 20, 30, 40, 50, 60, 70, 80, 90, or 95% of the base or bases comprises one or more products produced in the process, such as a calcium base, e.g., $CaO$, Ca(OH)$_2$, or CaSi such as dicalcium or tricalcium silicate. In certain embodiments, 100% of the base or bases comprises one or more products produced in the process, such as a calcium base, e.g., CaO, Ca(OH)$_2$, or CaSi such as dicalcium or tricalcium silicate. Some or all of the added base can be regenerated in further steps of the process, e.g., calcium salt decomposition that produces, e.g., CaO, dicalcium silicates and/or tricalcium silicates. In certain embodiments, base is added to calcium-rich fraction in a one-step process to precipitate all desired compounds, e.g., to precipitate Al, Fe, and Mg compounds. In certain processes, base is added after some of the non-calcium salts (metal compounds) have been precipitated, e.g., through a one-step or two-step thermal decomposition process; in such cases enough base is added to precipitate remaining metal compounds or a portion thereof (e.g., remaining Fe and Mg compounds, or remaining Mg compounds, or portions thereof). In certain embodiments, base is added to precipitate Mg compounds. The precipitate can include one or more magnesium compounds, such as Mg(OH)$_2$, magnesium silicate hydrate, magnesium alumina silicate, and/or other magnesium compounds. The precipitate can be separated from the remaining calcium-rich fraction by any suitable method, such as methods described herein. The precipitate can be further treated, e.g., by drying. The magnesium precipitate can be used to react with carbon dioxide, e.g., carbon dioxide in a flue gas, such as a flue gas produced as part of a process to provide energy for the overall process (e.g., a flue gas from combustion of natural gas or coal); and/or to react with atmospheric carbon dioxide, and/or other carbon dioxide source, such as carbon dioxide in a body of water, e.g., an ocean, to produce magnesium-carbon dioxide products such as MgCO$_3$ (and/or, in the case of a body of water, bicarbonates), thus sequestering the carbon dioxide. The amount of carbon dioxide thus sequestered can reduce the total amount of carbon dioxide produced by the total process, in some cases sufficiently to make the total process carbon neutral or even carbon negative. In addition, other substances in a flue gas, e.g., substances that are required to be removed from the flue gas, such as SOx and/or NOx, may be reacted with the Mg precipitate, in some cases reducing the level of one or more of the substances to below levels required for flue gas released to the atmosphere. In addition or alternatively, magnesium precipitate can sequester carbon dioxide from the atmosphere; any suitable arrangement can be used for this. In certain embodiments, the magnesium precipitate, optionally processed to increase surface area, can simply be placed in a pile, spread on the ground in a layer, or distributed in other suitable manner, and allowed to sequester atmospheric carbon dioxide over any appropriate time period, which can be days, weeks, months, a year, or more than a year.

Reduced Carbon Dioxide Production

Thus, the process of producing clinker or cement, e.g., Portland cement and/or SCM as described herein does not result in as much carbon dioxide production as standard processes; in fact, in certain embodiments, a process as described herein can be carbon negative. The clinker or cement, e.g., Portland cement and/or SCM produced by a process disclosed herein can be used as clinker or cement, e.g., Portland cement and/or SCM is normally used, e.g., in concrete, mortar, stucco, grout, and the like. Because the processes described herein produce less carbon dioxide than traditional processes of producing Portland cement, and in some cases can even be carbon negative, replacement of some or all of standard clinker or cement, e.g., Portland cement with clinker or cement, e.g., Portland cement produced by a process as described herein can result in reduction in the carbon footprint of the concrete or other product; indeed, in certain cases the concrete may even be carbon negative. The same can be true for SCM. In embodiments where clinker or cement, e.g., Portland cement, SCM, and, in some cases, aggregates, are produced at one location and blended into concrete at that location, a further carbon savings is realized due to reduced (or no) transport of the various components. Because the amount of carbon dioxide avoided and/or sequestered by using clinker or cement, e.g., Portland cement and/or SCM produced in a process described herein instead of standard clinker or cement, e.g., Portland cement and/or SCM can be calculated, based on inputs and outputs and the like, as known in the art, a carbon credit may be obtained based on the avoided/sequestered carbon dioxide. Thus, provided herein is a method of obtaining carbon credit comprising performing one or more of the processes described herein for producing clinker or cement, e.g., Portland cement and, in some cases, SCM and using the clinker or cement, e.g., Portland cement and, in some cases, SCM as replacement for clinker or cement, e.g., Portland cement and, in some cases, SCM, produced by standard methods, evaluating carbon dioxide produced and consumed in the process(es) as described herein, determining an amount of carbon dioxide avoided and/or sequestered compared to concrete produced with clinker or cement, e.g., Portland cement and, in some cases, SCM by standard methods, and obtaining carbon credit based on the amount.

In certain embodiments in which a one-step or two-step thermal decomposition process is used, precipitating the metal compounds may then comprise adding a base, e.g., as described above, such as a calcium base (e.g., CaO, Ca(OH)$_2$, or CaSi) thereby precipitating out the Magnesium from the calcium-rich fraction, effectively leaving behind only calcium compounds, or calcium compounds with metal compounds at a level low enough to be acceptable in a final product or products of the process. Further HCl can be regenerated during the base precipitation step.

In general, the calcium-rich fraction after removal of metal compounds will be very high in calcium chloride, e.g., at least 90%, in some cases at least 95%, or even at least 99% calcium chloride. The calcium-rich fraction will typically also be highly concentrated, e.g., 40% CaCl$_2$/60% water to 70% CaCl$_2$/30% water, or 50%/50% to 60%/40%, or even 55%/45% to 60%/40%.

Whether produced by an acid dissolution step, a one-step thermal decomposition, a two-step thermal decomposition, base addition, or any suitable combination thereof, the resulting calcium compounds that remain in the calcium-rich fraction can then be subjected to treatment that produces one or more further products, e.g., clinker or cement, e.g., Portland cement. This can involve removing water from the remaining calcium-rich fraction containing the calcium compounds to provide a high calcium solid comprising the one or more calcium compounds, e.g., one or more calcium salts, e.g., CaCl$_2$, and treating the solid, e.g., to convert it to dechlorinated calcium products, and thence to clinker, e.g., clinker for production of Portland cement, comprising dicalcium silicate and tricalcium silicate.

Water can be removed from the calcium-rich fraction by any suitable method, e.g., heating to evaporate water as steam; some or all of the resulting steam may be used in further processes requiring steam, as described below. The resulting calcium compound solid comprises one or more calcium salts, e.g., CaCl$_2$, and is also referred to herein as a "solid comprising calcium chloride" and may further comprise non-calcium salts, e.g., iron, aluminum, and/or magnesium salts, and/or other salts, so long as they are not present in quantities that render the final product unsuitable for its intended use, e.g., as clinker or cement, e.g., Portland cement and/or interfere with a process for producing the clinker or cement, e.g., Portland cement.

The calcium compound solid (solid comprising calcium chloride) may be treated to produce particles of desired size for further treatment, e.g., by flaking, grinding, or other suitable method. It can then be treated to decompose the calcium containing compounds, e.g., to CaO and/or other calcium containing dechlorinated products and regenerate HCl; in order to produce clinker, e.g., clinker for Portland cement, this can be further heated in the presence of flux, e.g., a flux providing Si, Fe, and Al (sintering) to produce clinker, which can be further treated to produce cement, e.g., Portland cement.

In certain embodiments, calcium compound solid (solid comprising calcium chloride) is heated in the presence of steam, silica, and, optionally, exogenous flux, such as exogenous flux containing aluminum, e.g., $Al(OH)_3$ and/or iron, e.g., $Fe(OH)_x$. Generally, the flux is not necessary but may be added at this step for convenience. In certain embodiments, some or all of the silica, e.g., at least 10, 20, 30, 40, 50, 60, 70, 80, 90, 95, 98, 99% of the silica, or 100% of the silica, is silica produced from non-limestone materials, e.g., non-limestone rocks and/or minerals, such as in an earlier step in the process, e.g., production of SCM (pozzolan) as described herein. In certain embodiments, some or all of the exogenous flux, e.g., at least 10, 20, 30, 40, 50, 60, 70, 80, 90, 95, 98, 99% of the flux, or 100% of the flux, is iron and aluminum oxides, hydroxides, and potentially other suitable compounds, produced from non-limestone rocks and/or minerals, such as in an earlier step in the process, e.g., precipitated as insoluble salts from a calcium-rich fraction, as described herein. It will be appreciated that the calcium compound solid (solid comprising calcium chloride) can comprise one or more substances that can act as a flux, but, generally, it is preferable to add exogenous flux. Heating may be performed in a single step, at a sufficiently high temperature to both decompose the calcium-bearing solid and clinker, e.g., sinter, resulting compounds with flux. In a simplest case, the calcium compound solid is heated in the presence of steam to sufficiently high temperature to decompose the calcium compounds, produce HCl, and heat, e.g., sinter, with endogenous flux to a sufficiently high temperature to produce clinker. In preferred embodiments, heating may be performed in two or more steps at successively higher heats, and exogenous flux, if used, present at all or only in a portion of the steps (e.g., heating, for example clinkering, such as sintering).

As mentioned previously, the calcium compound solid (solid comprising calcium chloride) comprises calcium chloride; in certain embodiments it comprises at least 20, 30, 40, 50, 60, 70, 80, 90, 92, 95, 96, 97, 98, or 99% calcium chloride, such as at least 90%; in some cases at least 95%. The decomposition process results in dechlorination of calcium chloride in the solid, e.g., dechlorination of at least 80, 90, 95, 96, 97, 98, 99, 99.1, 99.5, 99.9, 99.91, 99.95, or 99.99% of calcium chloride in the solid, that is, that amount of chloride in the starting material is driven off, preferably at least 90%, more preferably at least 95%, even more preferably at least 99%. Surprisingly, it has been found that at least 99%, 99.5%, 99.9%, or even 99.95% of the calcium chloride can be dechlorinated, and these levels of dechlorination render the chloride content of the final product low enough to meet standards for Portland cement, e.g., less than 1%, or less than 0.1% chloride, without further treatment. In a preferred embodiment, at least 99% of calcium chloride in the solid is dechlorinated; in a more preferred embodiment, at least 99.9% of calcium chloride in the solid is dechlorinated; in a still more preferred embodiment, at least 99.95% of calcium chloride in the solid is dechlorinated.

In certain embodiments, the calcium compound solid (solid comprising calcium chloride) is heated to one or more temperatures or ranges of temperatures in the presence of steam, where the one or more temperatures or ranges of temperatures are sufficient to drive chlorine gas off from the solid; the chlorine gas combines with protons from the steam to regenerate HCl, which can be recycled as described previously. At the same time calcium chloride is converted to dechlorinated calcium compounds, that may or may not include calcium oxide. One overall reaction may be $$CaCl_2 + H_2O \rightarrow CaO + 2HCl$$

More generally, reactions can be represented as:

$$CaCl_2 + SiO2 + H_2O \rightarrow Ca\text{ silicates and other species} + 2HCl$$

Intermediate compounds, such as calcium silicate chloride, calcium aluminum silicate chlorides compounds, and others may be formed, and when the process reaches higher temperatures, mono- and dicalcium silicate can be formed. CaO can be present but is not necessarily present. Thus, in certain embodiments, the process produces a product that comprises dicalcium silicate in an amount of at least 5, 10, 15, 20, 25, 30, 35, 40, 45, 50, 55, 60, 65, 70, 75, or 80 wt %, in some cases at least 30%, such as at least 50%, while comprising less than 30, 20, 15, 12, 10, 9, 8, 7, 6, 5, 4, 3, 2, or 1 wt % CaO, in some cases less than 10%, such as less than 5%. Generally, the product of dichlorination will contain little or no tricalcium silicate, such as less than 20, 15, 10, 5, 3, 2, 1, 0.5, or 0.1%, for example, less than 5%. In certain embodiments, a product is formed that comprises at least 30% dicalcium silicate and less than 10% CaO, in some cases comprising less than 0.5% tricalcium silicate. This product can then be treated further to produce clinker.

Thus in certain embodiments, provided is a process for producing clinker, such as clinker that can be converted to cement such as Portland cement, wherein the process comprises 1) providing a composition that comprises dicalcium silicate, for example in an amount of at least 5, 10, 15, 20, 25, 30, 35, 40, 45, 50, 55, 60, 65, 70, 75, or 80 wt %, in some cases at least 30%, such as at least 50%, while comprising less than 30, 20, 15, 12, 10, 9, 8, 7, 6, 5, 4, 3, 2, or 1 wt % CaO, in some cases less than 10%, such as less than 5%, for example, a composition that comprises at least 30% dicalcium silicate and less than 10% CaO; in preferred embodiments the composition comprises little or no tricalcium silicate, such as less than 5% or less than 1%, even less than 0.5%; and 2) treating the composition under conditions that produce a clinker (clinkering), e.g., a clinker that can be processed to Portland cement, e.g., OPC. In certain embodiments, the process of step 2) comprises heating the composition, e.g., to a temperature of 1200-1600° C., in the presence of flux comprising aluminum and/or iron compounds, such as aluminum and/or iron oxides, as described more fully below. Part or all of the flux can be produced in the process that produces the composition of step 1). The resultant clinker comprises tricalcium silicate, e.g., at least 10, 20, 25, 30, 35, 40, 45, 50, 55, or 60% w/w, in preferred embodiments at least 50%.

Although it is possible to perform decomposition and clinkering at one temperature, it is preferable to perform decomposition and clinkering in a multi-step process at successively higher temperatures, where the material can be held at a given temperature for a certain duration, e.g., 0.5-5 hours, or 0.75-4 hours, or 1-3 hours, for example 1, 2, or 3 hours. This improves the efficiency and yield of dichlorination, and the process achieves surprisingly high levels of dechlorination, as discussed elsewhere. Additionally or alternatively, temperature can be increased gradually from one temperature to the next. Heating can be performed in any suitable system, such as a fluidized bed or a kiln; in a preferred embodiment heating is performed in a kiln, such as a rotary kiln.

Thus, provided herein is a method for dechlorinating calcium chloride comprising heating the calcium chloride in the presence of steam, silica, and, optionally, a flux comprising iron and/or aluminum compounds, such as one or more of those iron and/or aluminum compounds disclosed herein, to a first temperature, then 1) holding the calcium chloride and other components at the first temperature for a first duration to produce a first set of one or more products comprising at least HCl, and removing the HCl; heating the remaining first set of one or more products to a second temperature, in the presence of steam, to a second, higher temperature and holding the one or more products and steam at a second temperature to produce a second set of one or more products comprising HCl, and removing the HCl; optionally, additional steps of heating to, e.g., a third temperature, then, in certain embodiments, even a fourth temperature, and holding for a certain duration at each temperature to produce a set of products, one of which is HCl; temperatures, aluminum and/or iron compounds, silica, and durations can be as described; or 2) gradually heating the calcium chloride and other components from a first temperature to a second, higher temperature, wherein the rate of heating is sufficiently slow to allow a desired degree, e.g., maximal, HCl production; whereby the calcium chloride is at least 95% dechlorinated, in a preferred embodiment, at least 99.9% dechlorinated, in a more preferred embodiment, at least 99.95% dechlorinated, to produce a dechlorinated calcium product.

In certain embodiments provided is a solid composition comprising 1) a solid comprising calcium chloride, e.g., at least 50, 60, 70, 80, 90, or 95% calcium chloride, such as at least 90%, in preferred embodiments at least 95% calcium chloride; 2) a solid comprising silica, e.g., at least 50, 60, 65, 70, 75, 80, 85, 90, or 95% silica, such as at least 60%, preferably at least 75%, more preferably at least 80%; and, optionally, 3) a flux comprising one or more iron compounds, such as one or more of $Fe(OH)_2$, $Fe(OH)_3$, $FeO(OH)$, $FeO$, $FeO_2$, $Fe_2O_3$, and/or one or more aluminum compounds, such as one or more of $Al(OH)_3$, $Al_2O_3$, $AlO(OH)$. In certain embodiments, the solid comprising calcium chloride comprises at least 80% calcium chloride and the solid comprising silica comprises at least 60% silica. In certain embodiments, the solid comprising calcium chloride comprises at least 90% calcium chloride and the solid comprising silica comprises at least 80% silica. In general, the solids are combined so that a Ca—Si molar ratio is between 2.5 to 3.25. The composition can have the components in proportions (wt %) as 50-90% calcium chloride solid; 10-40% silica solid; 0-4% iron compounds serving as flux, if used; 0-4% aluminum compounds serving as flux, if used. In a preferred embodiment, the proportions are 60-85% calcium chloride solid; 15-30% silica solid; 1-3% iron compounds serving as flux, if used; 1-3% aluminum compounds serving as flux, if used. In a more preferred embodiment, the proportions are 70-80% calcium chloride solid; 15-25% silica solid; 1-2% iron compounds serving as flux, if used; 1-2% aluminum compounds serving as flux, if used. In certain embodiments, all the components are derived from a single source, e.g., a single source comprising non-limestone rocks and/or minerals. In certain embodiments, the composition comprising a solid comprising calcium chloride and a solid comprising silica is produced by a process described herein, e.g., treatment of non-limestone starting materials by acid dissolution and further processing to produce the solid comprising calcium chloride, and adding to the solid comprising calcium chloride a solid comprising silica, in a desired ratio, such as a Ca—Si molar ratio between 2.5 to 3.25. The solid comprising silica can be any suitable solid; in certain embodiments, some or all of the solid is produced in the process that produces the solid comprising calcium chloride, e.g., as a calcium-depleted solid from the acid dissolution step.

It is preferable heat and hold calcium compound solid, or to heat in a ramped fashion, or both, in the presence of steam and, generally, silica and, optionally, flux, to a first temperature, such as a first temperature that is temperature where HCl can be handled according to methodology known in the art. In certain embodiments, the solid is heated to not more than 1250° C., e.g., 750-1250° C., 800-1250° C., in certain cases 850-1000° C., in some cases 900-1250° C., preferably 1000-1250° C., even more preferably 1100-1250° C. in the presence of steam, silica, and, optionally, aluminum and iron-containing compounds, to produce HCl and a dechlorinated calcium product. The solid mixture can be rapidly heated to 700-750° C. When the temperature reaches 700, 705, 710, 715, 720, 730, 740, or 750° C., preferably 700° C., or 720° C., heating generally should proceed at a rate of not more than 2, 5, 10, 15, 20, 25, 30, 40, 50, 60, 70, or 100° C. per minute, preferably not more than 30, even more preferably not more than 20, and still more preferably not more than 10° C./min, until the temperature reaches 800, 850, 900, 950, or 1000° C., preferably 1000° C. Without being bound by theory, it is thought that in the range of ~700-~1000° C., calcium chloride can melt, which is undesirable and can reduce the amount of chlorine driven off, and keeping the heating at a controlled rate can instead favor reactions between calcium and silica and producing HCl to produce products that will allow more chlorine to be driven off. The process can be held at one or more temperatures ("soak") for a duration of 1-180 min, such as 5-120 min, e.g., 10-120 min. Example 4 gives exemplary soak temperatures and times, however, these are merely exemplary. Additionally or alternatively, temperature can be ramped in a continuous fashion, with constant or varying rate. Such refinements can be determined through routine experimentation. Steam can be present in any suitable concentration, such as 5-100 vol %. Steam flow can be started when T>300° C.

The solid may be heated in any suitable manner and system; e.g., fluidized bed or kiln. In this and other steps, silica may be present in any suitable ratio to calcium compound, e.g., $CaCl_2$; for example, a 100-105 g sample might contain ~80 gm $CaCl_2$, ~20 gm silica, and, optionally ~1-3 gm each of aluminum and iron compounds. This is merely exemplary and it will be appreciated that the ratios of the various components may vary according to the standards for the type of Portland cement to be produced, as apparent to one of ordinary skill in the art, e.g., a higher proportion of calcium to silica can produce a final product with greater proportion of C3S compared to C2S.

The dechlorinated calcium product (in some cases, CaO-containing product, but in other cases comprising little or no CaO) can then be heated to a second temperature, and optionally, then to a third temperature, in some cases also then to a fourth temperature, generally also in the presence steam at one or more lower temperatures, silica or compounds formed from silica and calcium, and, optionally, aluminum and/or iron compounds that serve as a flux; at one or more of the temperatures, e.g., higher temperatures, steam may not be present. Thus, the dechlorinated calcium product (e.g., CaO-containing or non-CaO-containing product) is clinkered, that is, produces clinker (in some cases sintered), e.g., in the presence of silica and, optionally, flux, such as aluminum- and/or iron-containing flux, to produce clinker, such as Portland cement clinker. The flux can include materials produced at an earlier step of the process, e.g., aluminum and/or iron compounds removed from the calcium-rich fraction, as described above. In certain embodiments, at least 10, 20, 30, 40, 50, 60, 70, 80, 90, or 95% of aluminum- and/or iron-containing exogenous flux comprises one or more compounds removed from the calcium-rich fraction, such as at least 50%, in some cases at least 70%, and in certain embodiments, at least 90%. In certain embodiments, In certain embodiments 100% of aluminum- and/or iron-containing exogenous flux comprises one or more compounds removed from the calcium-rich fraction. Whether or not exogenous flux is present, and if so, in what amount, can be determined, at least in part, by the desired final composition, e.g., the type of clinker or cement, e.g., Portland cement being produced. In certain embodiments a flux comprising both iron- and aluminum-containing compounds is used.

If only a second temperature is used, the process involves heating the dechlorinated calcium product (in some cases, CaO-containing product, but in other cases comprising little or no CaO) to 1200-1550° C., preferably no higher than 1450° C., in the presence of silica and, optionally a flux, thus forming Portland cement clinker comprising dicalcium silicate and tricalcium silicate; in some cases the clinker also comprises tricalcium aluminate and/or tetracalcium aluminoferrite. If intermediate temperatures are used, a temperature may be, e.g., 900-1100° C., such as 950-1050° C.; a temperature may be, e.g., 1100-1300° C., such as 1150-1250° C.; a temperature may be, e.g., 1400-1600° C., such as 1450-1550° C. In an exemplary embodiment, temperatures are, successively, 850, 1000, 1200, and 1500° C., held for 1 hour each. These are merely exemplary, and one of skill in the art can select optimal temperatures and durations through routine experimentation.

During the heating processes, base, e.g., one or more calcium bases, that may have been used in a base precipitation step can regenerated, e.g., at least 10, 20, 30, 40, 50, 60, 70, 80, 85, 90, 95, 98, or 99% of the amount of base used in a base precipitation step may be regenerated.

At the end of the process, clinker can remain, where the clinker can have a diameter of millimeters, e.g., 0.5-50 mm, or 1-40 mm, or 1-30 mm; however, other sizes are acceptable for further processing.

In certain embodiments, provided is a method of producing a clinker from a solid comprising calcium chloride where the method comprises dechlorinating the solid comprising $CaCl_2$ to produce a dechlorinated composition comprising Ca and having less than 10% w/w Cl; and heating the dechlorinated composition in the presence of a flux to produce a clinker, such as a clinker for producing Portland cement, e.g., a clinker comprising di- and tricalcium silicate.

In certain embodiments, provided herein is a method for producing clinker comprising heating a composition comprising dicalcium silicate and not more than 20, 15, 10, 5, 2, or 1% CaO, such as not more than 10% CaO, in the presence of flux to produce clinker. The composition may contain less than 5, 4, 3, 2, 1, 0.5, or 0.1% tricalcium silicate and the clinker comprises at least 5, 10, 15, 20, 25, 30, 35, 40, 45, 50, 55, or 60% tricalcium silicate. The flux can comprise aluminum and/or iron oxides.

A method to produce both clinker and supplementary cementitious material (SCM) from a starting material comprising a non-limestone material that comprises calcium and silicon comprising (i) dissolving the non-limestone material in HCl to produce a calcium-rich liquid fraction comprising calcium chloride and a calcium-depleted solid fraction comprising silica; (ii) producing the SCM from the calcium-depleted solid fraction comprising silica; and (iii) producing clinker from the calcium-rich liquid fraction comprising calcium chloride.

The clinker, e.g., Portland cement clinker may be further processed, e.g., treated to create particles in a desired size range, combined with calcium sulfate, and the like.

At the end of all acid regeneration steps, e.g., HCl regeneration, at least 10, 20, 30, 40, 50, 60, 70, 80, 85, 90, 95, 98, or 99% of initial acid, e.g., initial HCl, may be regenerated. In a preferred embodiment, at least 80% of initial HCl is regenerated. In another preferred embodiment, at least 90% of initial HCl is regenerated. In order to provide sufficient acid, e.g., sufficient HCl, for subsequent treatment of non-limestone material, an amount of strong acid, e.g., HCl, not regenerated may be added back, i.e., topping off the strong acid, e.g., HCl.

In the seventh example, as previously mentioned, decomposing the calcium compounds S160 and regenerating leaching agents S170 can occur concurrent to thermal decomposition for precipitating iron and aluminum. In a cement production variation, the seventh example may further include treating the calcium product clinkering, e.g., sintering the calcium product, comprising: In a kiln, clinkering, e.g., sintering dechlorinated calcium compounds (e.g., CaO, $CaOH_2$, etc.), with $SiO_2$, $Al(OH)_3$ and $Fe(OH)_x$, thus forming clinker, e.g., clinker for ordinary Portland cement. Additionally the example may include scrubbing the flue gas with insoluble Mg compounds produced in the process, e.g., $Mg(OH)_2$, to make $MgCO_3$. Additionally or alternatively, the insoluble Mg compounds produced in the process, e.g., $Mg(OH)_2$ can be placed in a waste pile where it can contact the air and slowly turn into $MgCO_3$. Additionally or alternatively, the insoluble Mg compounds produced in the process can be placed in a body of water, e.g, an ocean; in this process, bicarbonates may also be formed.

Methods for Producing Supplementary Cementitious Materials (SCM)

In a certain embodiments, provided is a method for producing SCM, e.g., pozzolan, from a non-limestone material, such as rocks and/or minerals. In general, the method involves exposing a non-limestone material, such as non-limestone rocks and/or minerals, to a leaching agent, e.g., a strong acid, that, e.g., dissolves certain components of the non-limestone material to produce a liquid leachate, while leaving a solid leachate residue that comprises one or more amorphous substances that can serve as SCM, e.g., pozzolans, and separating the solid leachate residue from the liquid leachate; optional further steps can include treating the SCM to remove liquid leachate, e.g., by rinsing, treating the SCM to dry it, and/or treating the SCM to produce SCM in a desired size range.

The non-limestone material may be any suitable material, so long as it contains one or more compounds that can provide a final material that comprises amorphous (non-crystalline) substances that can serve as SCMs. These may include amorphous silica, in which case the starting material will also comprise silicon-based substances, such as silica, silicates, silica compounds, and/or silicate compounds. However, other substances can provide amorphous compounds that serve as SCM, such as amorphous iron and aluminum substances, as is known in the art; in these cases, the starting material includes the requisite starting elements. In general, an "amorphous substance," as that term is used herein, includes a substance that can exist as one or more crystalline polymorphs or non-crystalline polymorphs, where the non-crystalline polymorph can be referred to as an amorphous polymorph, or amorphous substance, or non-crystalline substance. In certain embodiments the non-limestone material comprises silicon. In certain embodiments the non-limestone material comprises rocks and/or minerals comprising silicon. In certain embodiments the non-limestone material comprises rocks and/or minerals comprising non-silicon substances that serve as materials to produce amorphous substances, such as iron- and/or aluminum-containing substances; these may be present in addition to silicon, or, in some cases, serve as the primary or only source of amorphous substances in the final SCM. In certain embodiments, the non-limestone material, e.g., rocks and/or minerals, comprises calcium silicate. Exemplary suitable non-limestone rocks and/or minerals include basalt, gabbro, pyroxenites, anorthosites, skarns, amphibolite, or a combination thereof. Other suitable non-limestone materials can be as described elsewhere herein.

The non-limestone material, e.g., rock and/or mineral can be processed to provide particles in a desired size range. Any suitable process or processes may be used, such as crushing and sieving. Suitable size ranges include 1-500 u, 5-300 u, 10-200 u, 20-130 u, 45-90 u, or a combination thereof. In a preferred embodiment the size range is 20-130 u. In a more preferred embodiment, the size range is 45-90 u.

The non-limestone material, e.g., rock and/or mineral is contacted with a leaching agent, which can be any suitable leaching agent, such as those described herein. In certain embodiments, the leaching agent comprises a strong acid, and the process of contacting produces a pulp comprising the acid and rocks and/or minerals. Any suitable leaching agent, e.g., strong acid may be used, such as HCl, HBr, HI, H2SO4, or HNO3. In certain embodiments the strong acid comprises HCl. In certain embodiments, the only acid used is HCl. For convenience the remainder of the process will be described in terms of HCl; as will be apparent to one of skill in the art, if another acid is used in addition to or as an alternative to HCl, suitable adjustments may be made to accommodate the additional/alternative acid.

Any suitable concentration of HCl may be used, such as 5-40%, 10-37%, 10-30%, 15-35%, 17-23%, 20-30%, or about or exactly 15, 16, 17, 18, 19, 20, 21, 22, 23, 24, 25, 26, 27, 28, 29, or 30%, such as about or exactly 20%. In preferred embodiments the HCl is 10-37%. In still more preferred embodiments the HCl is 15-35%.

The ratio of non-limestone material, which is solid, e.g., solid rock and/or mineral, to liquid (acid) in the initial pulp may be any suitable ratio; it will be appreciated that some of the solid rock and/or mineral will begin dissolving in the acid immediately and that these ratios will change as solid dissolves into solution. Suitable initial ratios can be in the range of 5% solid/95% liquid to 40% solid/60% liquid, such as 10% solid/90% liquid to 30% solid/70% liquid; in a preferred embodiment 15% solid/85% liquid to 25% solid/75%, such as 20% solid/80% liquid. In certain embodiments, provided herein is a pulp composition comprising solid non-limestone rocks and/or minerals and a liquid leach agent, such as a strong acid, e.g., HCl, wherein the pulp comprises solid and liquid in a ratio of 5% solid/95% liquid to 40% solid/60% liquid, such as 10% solid/90% liquid to 30% solid/70% liquid; in a preferred embodiment 15% solid/85% liquid to 25% solid/75%, such as 20% solid/80% liquid. In certain embodiments, the solid non-limestone rocks and/or minerals are comprise at least 60, 70, 80, 90, or 95% of particles in a size range of 1-500 u, 5-300 u, 10-200 u, 20-130 u, 45-90 u, or a combination thereof. In a preferred embodiment the size range is 20-130 u. In a more preferred embodiment, the size range is 45-90 u. In certain embodiments, the leaching agent is a strong acid, e.g., HCl, and is present at a concentration of 10-40%, such as 10-35%, in some cases 15-35%, or even 20-30%.

The pulp is treated to cause at least some, preferably most, of the non-amorphous materials, e.g., non-silica materials and the like, to dissolve into a solution, leaving behind a solid that is rich in amorphous substances, e.g., amorphous silica. The treatment can occur in a process open to the atmosphere, or at least not pressurized. In general, duration of treatment and/or temperature may be used, and may be adjusted, e.g., according to starting material. Suitable temperature ranges at which the pulp is maintained include 60-115° C., 80-115° C., 90-115° C., 100-115° C., 60-112° C., 80-112° C., 90-112° C., 100-112° C., 60-110° C., 80-110° C., 90-110° C., or 100-110° C.; it will be appreciated that as more material dissolves in the liquid phase, boiling temperature for the HCl solution will increase. Thus, in certain embodiments, the temperature is at least 95, 96, 97, 98, 99, or 100° C.; in preferred embodiments the temperature is at least 90° C.; in more preferred embodiments range the temperature is at least 95° C.; in still more preferred embodiments, the temperature is at least 98° C.; and in even more preferred embodiments the temperature is at least 100° C. In certain embodiments the maximum temperature is 105, 106, 107, 108, 109, 110, 111, 112, 113, 114, or 115° C.; in a preferred embodiment the maximum temperature is 105° C.; in a more preferred embodiment the maximum temperature is 108° C.; in a still more preferred embodiment the maximum temperature is 110° C. Thus, in certain embodiments the temperature is maintained at 100-110° C.

Any suitable duration of treatment may be used. This can depend, to some degree, on the starting material, e.g., non-limestone rock and/or mineral. Thus, the duration of treatment may be at least 1, 2, 3, 4, 5, 6, 7, 8, or 10 hours and/or not more than 2, 3, 4, 5, 6, 7, 8, 10, 12, 15, 20, 24, 30, 36, 40, 48, 60, or 72 hours. In certain embodiments, the duration can be 2-24 hours, such as 4-18 hours or even 4-12 hours or less. In certain embodiments, the duration may be 6-72 hours, such as 4-48 hours, or 4-36 hours, or 4-24 hours.

The pulp can be agitated during treatment, e.g., stirred, for example stirred at 10-1000 RPM, 20-800 RPM, 50-500 RPM, 50-400 RPM, or 100-300 RPM. In preferred embodiments, the pulp is stirred at 50-400 RPM, more preferably at 100-300 RPM. Other suitable forms of agitation may be used.

After a suitable duration of treatment has been reached, a solution comprising salts of dissolved materials from the non-limestone material (also referred to herein as a leach solution or pregnant leach solution, or PLS) and a solid, undissolved portion (also referred to herein as a leachate residue) has been produced. The leachate residue is separated from the leach solution. Any suitable method may be used, e.g., simply draining PLS, centrifuging, filtration, and the like, such as methods described herein.

Leachate residue will generally contain one or more amorphous substances, e.g., one or more amorphous substances which can serve as SCM, e.g., pozzolans. In certain embodiments in which the starting materials comprise silicon, the leachate residue contains amorphous silica. Additionally or alternatively, the leachate residue can contain other amorphous compounds, such as amorphous Fe and/or Al, e.g., amorphous alumina, amorphous iron oxides and the like, that also can serve as SCM, e.g., pozzolans. In certain embodiments, the leachate residue comprises amorphous silica at least 10, 20, 30, 40, 50, 60, 70, or 80 wt %. The leachate residue may be treated to remove some or all of the leach solution, e.g., by rinsing, e.g., with water. It can then be dried. The dried leachate residue can be an SCM and can be used as is, or after further processing, e.g., further processing to reduce the size of particles to a desired range, e.g., by crushing and sieving.

In certain embodiments in which the starting materials comprise silicon, the leachate residue contains amorphous silica. Additionally or alternatively, the leachate residue can contain other amorphous compounds, such as amorphous Fe, Al, and/or Mg compounds, e.g., amorphous alumina, amorphous iron oxides, amorphous magnesium oxides, and the like, that also can serve as SCM, e.g., pozzolans.

Apparatus

In one aspect, provided herein are apparatus, e.g., apparatus suitable for performing one or more of the processes described herein. In certain embodiments, provided is an apparatus for producing SCM (pozzolans) from non-limestone material, e.g., non-limestone rock and/or minerals comprising one or more leach containers, a separation system for separating solids produced in the leach container from liquid, and a processing system for processing the separated solid to provide SCM. Further components can include one or more sources of energy for the processes performed by the apparatus, one or more systems to process non-limestone material, such as non-limestone rocks and/or minerals to render them suitable for leaching (can be the same as or, typically, different from processing system for processing separated solid). The exact composition of components can, in some cases, depend on the type of process performed. For example, in a batch process, the leach container may be a container, such as a tank, comprising material that can withstand the temperature and acidity of the leach process and sufficiently watertight to contain the acid during leach, e.g., completely watertight. In a continuous process, such as a countercurrent leach process, the leach container may comprise a first conveyor for conveying non-limestone material, e.g., non-limestone rocks and/or minerals, in a first direction and a second conveyor for conveying a leaching agent, such as a strong acid, e.g., HCl, in the opposite direction so that the two contact each other in countercurrent fashion, where components that come in contact with the leaching agent comprise material that can withstand the leaching agent and temperatures used. Other arrangements for other types of leaching processes will be readily apparent to one of ordinary skill in the art. The separation system can comprise, e.g., one or more centrifuges, filters, filter presses, or the like, as described elsewhere herein. The processing system can include a drier, which can be any suitable drier, even, in some cases, a drier that simply allows SCM to dry open to the atmosphere, or any other suitable drier, such as one that supplies heat to the SCM to accelerate drying; such apparatus are well-known in the art. The processing system can comprise an optional rinser for rinsing leach agent and leach solution from the SCM before drying. The processing system can also include one or more components for processing the SCM to produce particles in a desired size range or set of size ranges, such as crushers, ball mills, sieves, and/or other components as known in the art. The one or more sources of energy can be a suitable arrangement of one or more of a connection to an energy grid, e.g., electrical grid, a renewable energy source (such as solar, wind, geothermal, and the like), energy storage devices such as batteries, a fossil fuel-powered generator such as a natural gas-powered generator or a coal-powered generator, other suitable power generators, or any suitable combination thereof. In embodiments where a fossil fuel-powered generator is used, the source of energy may further comprise a system to scrub the flue gas produced by the fossil-fuel generator to decrease SOx, NOx, and/or other regulated pollutants to acceptable levels, and/or to decrease carbon dioxide content of the flue gas. In certain embodiments, such a system comprises an apparatus for contacting the flue gas with magnesium compounds produced in further processing of the calcium-rich fraction (as detailed below), where the system removes carbon dioxide and, in some cases, SOx and/or NOx from the flue gas.

In certain embodiments, provided is an apparatus for producing clinker or cement, e.g., Portland cement from non-limestone material, e.g., non-limestone rock and/or mineral, comprising one or more leach containers, a separation system for separating calcium-depleted solid fraction produced in the leach container from a calcium-rich liquid fraction, a processing system for removing non-calcium compounds and substances from the calcium-rich fraction, a system to precipitate solid calcium compound from calcium-rich fraction, a system to decompose the solid calcium compound to dechlorinated product containing product and treat to produce to Portland cement clinker, and a system to process the Portland cement clinker to Portland cement. Further components can include one or more sources of energy for the processes performed by the apparatus, one or more systems to process non-limestone material, such as non-limestone rocks and/or minerals to render them suitable for leaching (can be the same as or, typically, different from processing system for processing separated solid). If SCM is also produced, additional components as described above are included. Leach containers, separation systems, sources of energy, systems to process non-limestone materials such as non-limestone rocks and/or minerals are as described previously. The processing system for removing non-calcium compounds and substances from the calcium-rich fraction can include one or more systems for heating the calcium-rich fraction and maintaining it at a desired temperature or range of temperatures and/or a system for adding base to the calcium-rich fraction, and separation systems for removing insoluble non-calcium compounds and substances from the calcium-rich fractions. Systems for heating solutions and maintaining at a temperature are known in the art and can include any suitable arrangement, e.g., a heat source applied to outside the leach container, or inside, one or more temperature sensors, a control system, and the like. Systems for adding base can include a transport mechanism for transporting base (e.g., base produced later in the process, such as CaO, dicalcium silicate, and/or tricalcium silicate) to the calcium-rich fraction, measuring amount of base, introducing base, timing reaction time, and the like. All components for these systems can be those well-known in the art. In certain embodiments, both a system for heating calcium-rich fraction and for addition of base to calcium-rich fraction are incorporated in the apparatus. Systems for separating insoluble compounds and/or substances are as described. If a strong acid is used as a leaching agent, e.g., HCl, and the strong acid, e.g., HCl, is regenerated, the apparatus may further comprise one or more components for, e.g., capturing HCl gas and contacting it with an aqueous liquid for production of liquid HCl, such as systems well-known in the art. The system to precipitate calcium containing solid from the calcium-rich fraction may be as simple as a heat source to heat the calcium-rich solution to produce steam; optionally, a transport system such as one or more conduits or the like may be included to transport steam to the system to decompose the calcium containing solid to Portland cement clinker. The system to decompose the calcium containing solid to dechlorinated product and sinter to Portland cement clinker can include one or more sources of heat, one or more apparatus for introducing steam, silica and, generally, one or more aluminum- and/or iron-containing fluxes, to the calcium-containing solid, and an apparatus for containing the sintering calcium containing solid, such as a fluidized bed or a kiln, preferably a rotary kiln. Optional systems for processing Portland cement clinker to Portland cement are well-known in the art and can include crushers, ball mills, sieves, and the like. The system for decomposing solid calcium compound can further comprise an apparatus for capturing and transporting regenerated acid, e.g., regenerated HCl, back to a source of HCl.

Figure 8:
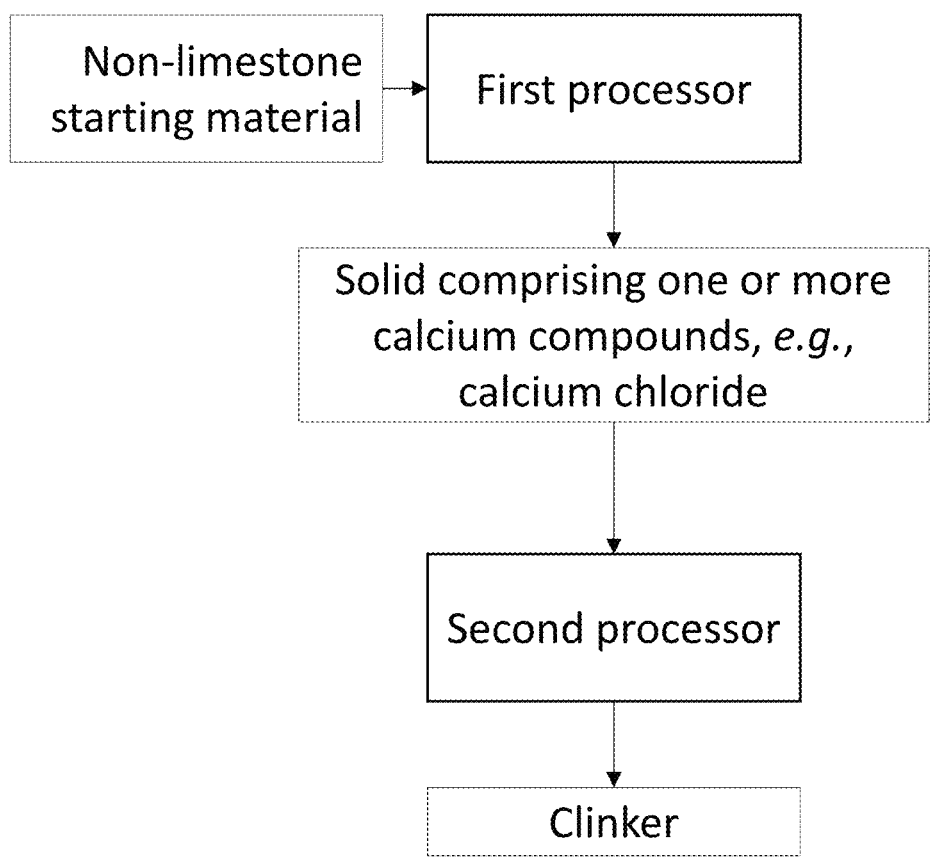
FIG. 8 shows an apparatus for producing clinker from non-limestone starting material, comprising a first processor and a second processor.

In certain embodiments, provided is an apparatus for producing clinker, e.g., clinker suitable to produce cement, e.g., Portland cement from non-limestone materials, e.g., rock and/or minerals, and/or other suitable starting materials as described herein. In general, such an apparatus comprises at least a first processor configured to treat non-limestone starting materials to produce a solid comprising one or more calcium compounds, e.g., $CaCl_2$, operably connected to a second processor configured to form a clinker from the solid composition comprising one or more calcium compounds, e.g., calcium chloride, e.g., clinker, such as OPC clinker, and, optionally, to produce cement, e.g., OPC, from the clinker. See, e.g., FIG. 8.

Figure 9:
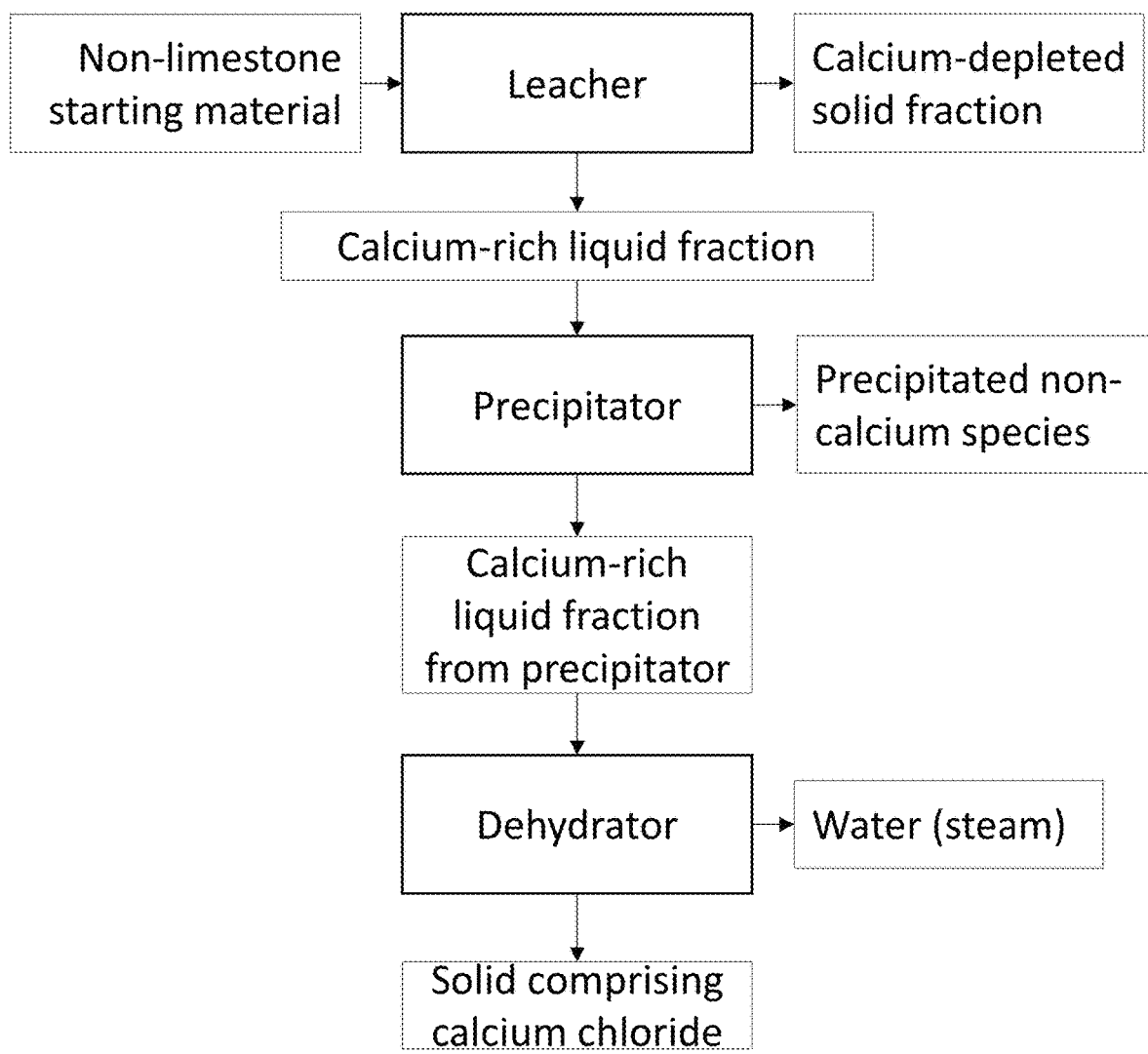
FIG. 9 shows one embodiment of the first processor of FIG. 8.

The first processor can comprises a leacher, operably connected to one or precipitators, operably connected to a dehydrator. See, e.g., FIG. 9. In certain embodiments in which a starting material is used that can be used without precipitating non-calcium salts, the first system may comprise a leacher and a dehydrator without one or more precipitators.

The leacher can be configured to contact the non-limestone material with an acid to produce a first calcium-rich liquid fraction and a calcium-depleted solid fraction. It can be operably connected to a material processor configured to process non-limestone starting material, e.g., configured to reduce size of the non-limestone material and/or sort the material into one or more size ranges, e.g., a material processing system comprising a crusher and/or a mill, and one or more sizing screens, or other suitable arrangement. The leacher generally comprises a leach container to hold and treat pulp created from the acid and non-limestone materials. Any suitable material may be used so long as it can withstand leach conditions. The leacher can comprise a heating element and/or an agitator. It can be operably connected to an acid reservoir. It can be operably connected to a first separator, which can also be operably connected to the precipitator, where the first separator can be configured to separate the calcium-rich liquid fraction and the calcium-depleted solid fraction, and direct the calcium-rich liquid fraction to the precipitator. The first separator can also be operably connected to a solid processing system, e.g., for processing calcium-depleted solid, e.g., silica (for convenience, the solid will be described as silica but it will be understood that in certain cases it can comprise other material), which comprises, e.g., a rinser and a dryer. Some of the silica may be used in dechlorination and/or clinkering, see below, in which case the solid processing system is operably connected to the dechlorinator and/or clinkerer, to supply silica. Some of the silica may be used as SCM, and the apparatus may further comprise one or more additional processors for further processing as necessary or desired to produce a desired characteristic or characteristics, e.g., particle size, storage, and the like.

The precipitator can be configured to remove one or more non-calcium salts from the calcium-rich fraction through conversion of the one or more non-calcium salts to solid form that are removed from the calcium-rich fraction. Generally, the precipitator is operably connected to the separation system for the leach container, so that the calcium-rich liquid fraction is moved from the separation system to the precipitator or, if multiple precipitation units are used, to the first precipitation unit in the series. The precipitator, or each precipitation unit if a plurality of precipitation units are used, is operably connected to a second (and possibly third and/or fourth) separator for separating solid produced in the precipitator or precipitation unit from the calcium-rich liquid fraction.

The precipitator comprises a first precipitation unit that is a base precipitation unit configured to precipitate a first set of non-calcium compounds. The base precipitation unit can be operably connected one or more sources of base.; the source of base can comprise a source of calcium base. Base precipitation is as described in more detail elsewhere herein. In certain embodiments, at least a portion of the source of calcium base comprises a source operably connected to the dechlorinator and/or clinkerer, to receive one or more products from these. In certain embodiments, the precipitator comprises only a base precipitation unit; in these cases, base precipitation generally results in precipitation of aluminum, iron, and magnesium species, also as described in more detail elsewhere herein.

In certain embodiments the precipitator further comprises a second precipitation unit that is a pyrohydrolysis precipitation unit configured to precipitate a second set of non-calcium compounds from the calcium-rich liquid fraction; as noted above this may be operably connected to a third separator for separating the second set of precipitated non-calcium compounds from the calcium-rich liquid fraction. In certain embodiments the precipitator comprises a third precipitation unit that is a pyrohydrolysis unit for precipitating a third set of non-calcium compounds from the calcium-rich liquid fraction, which can be operably connected to a fourth separator for separating the third set of precipitated non-calcium compounds from the calcium-rich liquid fraction. In certain embodiments, the second and third precipitation units are the same and the second and third sets of precipitated non-calcium compounds are the same. For example, the second/third precipitation unit can be configured to perform a one-step pyrohydrolysis, as described in more detail elsewhere herein, and the second/third set of precipitated non-calcium products can comprise Al- and Fe-species, also as described in more detail elsewhere herein. In certain embodiments the second and third precipitation units are different, and the second precipitation unit is configured to precipitate aluminum compounds by heating the calcium-rich liquid to a first temperature or range of temperatures, e.g., as described in more detail elsewhere herein, and the third precipitation unit is configured to precipitate iron compounds by heating the calcium-rich liquid to a second temperature or range of temperatures, higher than the first, e.g., as described in more detail elsewhere herein. The apparatus can further include one or more units to transport one or more of the non-calcium precipitation products to the clinkerer and/or the dechlorinator. These generally include aluminum compounds and iron compounds that can serve as flux in the clinkerer.

The precipitator is operably connected to the dehydrator to send calcium-rich liquid that has had non-calcium compounds removed to the dehydrator.

The dehydrator is configured to remove water from the calcium-rich liquid fraction from the precipitator, to produce a solid comprising one or more calcium compounds, e.g., calcium chloride, e.g., by heating the calcium-rich liquid to evaporate water until a desired level of driness is achieved. The dehydrator can comprise a heating element. In certain embodiments, the dehydrator can comprise an apparatus, such as an apparatus comprising a conduit, that is configured to transport steam produced in the dehydrator to the dechlorinator and, optionally, to the clinkerer. The solid product produced by the dehydrator is a solid comprising one or more calcium compounds, including calcium chloride, which can be present in one or more hydration states, e.g., anyhydrous, monohydrate, etc. Depending on starting materials and processing, the solid can be greater than 80, 90, 95, or 98% CaCl2. It is desirable to configure the dehydrator to produce lower hydration states of calcium chloride, e.g., anhydrous, as further steps will then require less energy to drive off the remaining water. Further processing equipment may be connected to the dehydrator, e.g., to reduce the size of the solid by producing particles, flakes, or the like from the solid.

Figure 10:
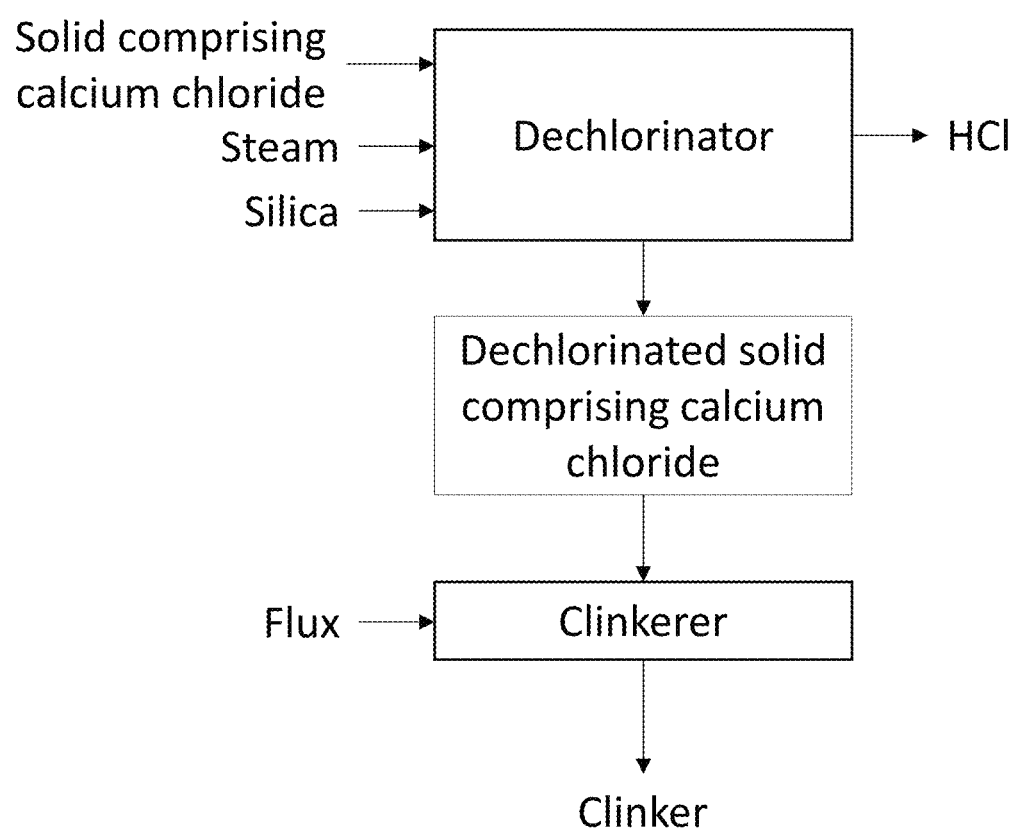
FIG. 10 shows one embodiment of the second processor of FIG. 8.

The second processor comprises a dechlorinator and a clinkerer (cement kiln). See, e.g., FIG. 10. The dechlorinator, which is operably connected to the dehydrator and receives the solid comprising calcium chloride (which can be further processed on the way to the dechlorinator), is configured to dechlorinate the solid comprising CaCl2 to produce a dechlorinated solid comprising calcium compounds. The dechlorinator is operably connected to the clinkerer, which is configured to heat the dechlorinated solid in the presence of flux to produce a clinker. The dechlorinator and clinkerer can be a single unit. In preferred embodiments, the dechlorinator and the clinkerer are separate units. In preferred embodiments, one or both of the dechlorinator and/or the clinkerer comprises a rotary kiln; in more preferred embodiments, both of the dechlorinator the clinkerer comprises a rotary kiln.

The dechlorinator can be configured to produce a dechlorinated solid comprising calcium compounds and less than 20, 15, 10, 8, 7, 6, 5, 4, 3, 2, or 1 wt % Cl. Methods and systems for dechlorinating a solid comprising calcium chloride to low levels of chloride can be as described herein; for example, the dechlorinator can be configured to keep heating at a rate low enough to be below 1, 2, 3, 5, 7, 10, 15, 20, 30, 40, 50, 60, or 80° C. when materials reach a threshold temperature, e.g., 700-750° C., up to another temperature, e.g., 800-1000° C. Additionally or alternatively, the dechlorinator can be configured to hold the materials at one or more temperatures for one or more durations, and/or to adjust and/or maintain heating at one or more desirable ramp rates. The dechlorinator is operably connected to one or more sources of steam, and one or more sources of silica. One of the sources of steam can be the dehydrator. The one or more sources of silica can comprise the first processor or portion thereof, e.g., calcium-depleted solid separated from the calcium-rich fraction at the first separator, which can be further treated, e.g., by rinsing and drying, then transported to the dechlorinator. The silica is mixed with the solid comprising calcium chloride from the dehydrator; this may occur prior to the dechlorinator. The silica can be mixed in a desired ratio, e.g., molar ratio Ca:Si of 1-4, preferably 2-4, more preferably 2.5-3.5, even more preferably 2.5-3.25. HCl is produced by the dechlorinator, and the dechlorinator may be operably connected to the leacher in order to replenish HCl in the leacher, the acid reservoir, or both.

The clinkerer is configured to receive dechlorinated solid comprising calcium compounds from the dechlorinator and to further treat the solid in the presence of flux and, optionally, steam (at least in earlier stages) to produce clinker, The clinkerer heats the dechlorinated solid comprising calcium compounds, mixed with flux, e.g., to one or more temperatures and/or for one or more durations, as described herein. One or more sources of flux are operably connected to the clinkerer. Any suitable flux may be used. In certain embodiments, some or all of the flux comprises one or more species produced in the first processor, e.g., at one or more precipitation units of the precipitator, and the clinkerer is operably connected to the first processor, e.g., the one or more precipitation units, e.g., one or more precipitation units producing aluminum and/or iron species, including aluminum and or iron oxides, which can include, e.g., $Al_2O_3$ and/or $Fe_2O_3$. In certain embodiments flux comprises material not produced in the process, such as material such as clay and other materials, as known in the art, and the one or more sources of flux comprise the one or more other materials. In certain embodiments, the clinkerer also serves as a source of calcium base, where one or more products of the clinkerer, e.g., comprising di- and/or tricalcium silicates, are used as calcium base in the precipitator, and the clinkerer is operably connected to the precipitator, e.g., to the base precipitation unit.

In certain embodiments, the system further comprises a clinker processor configured to receive clinker from the clinkerer and further process it, e.g., to produce cement, such as Portland cement, e.g., OPC. The clinker processor can be configured to modulate the size/size distribution of the clinker, e.g., through grinding, milling, screening, and the like, and/or to introduce additional materials, e.g., gypsum. The clinker processor can also be configured to prepare processed materials, e.g., cement such as OPC, for transport and/or sale.

In certain embodiments, the clinker processor is operably connected to a concrete production facility, generally in close proximity to the source of starting materials, e.g., non-limestone materials, where the concrete production facility produces concrete using cement from the clinker processor and, in certain embodiments, also using aggregates that are produced from the same non-limestone materials used to produce the cement and/or SCM.

Figure 13:
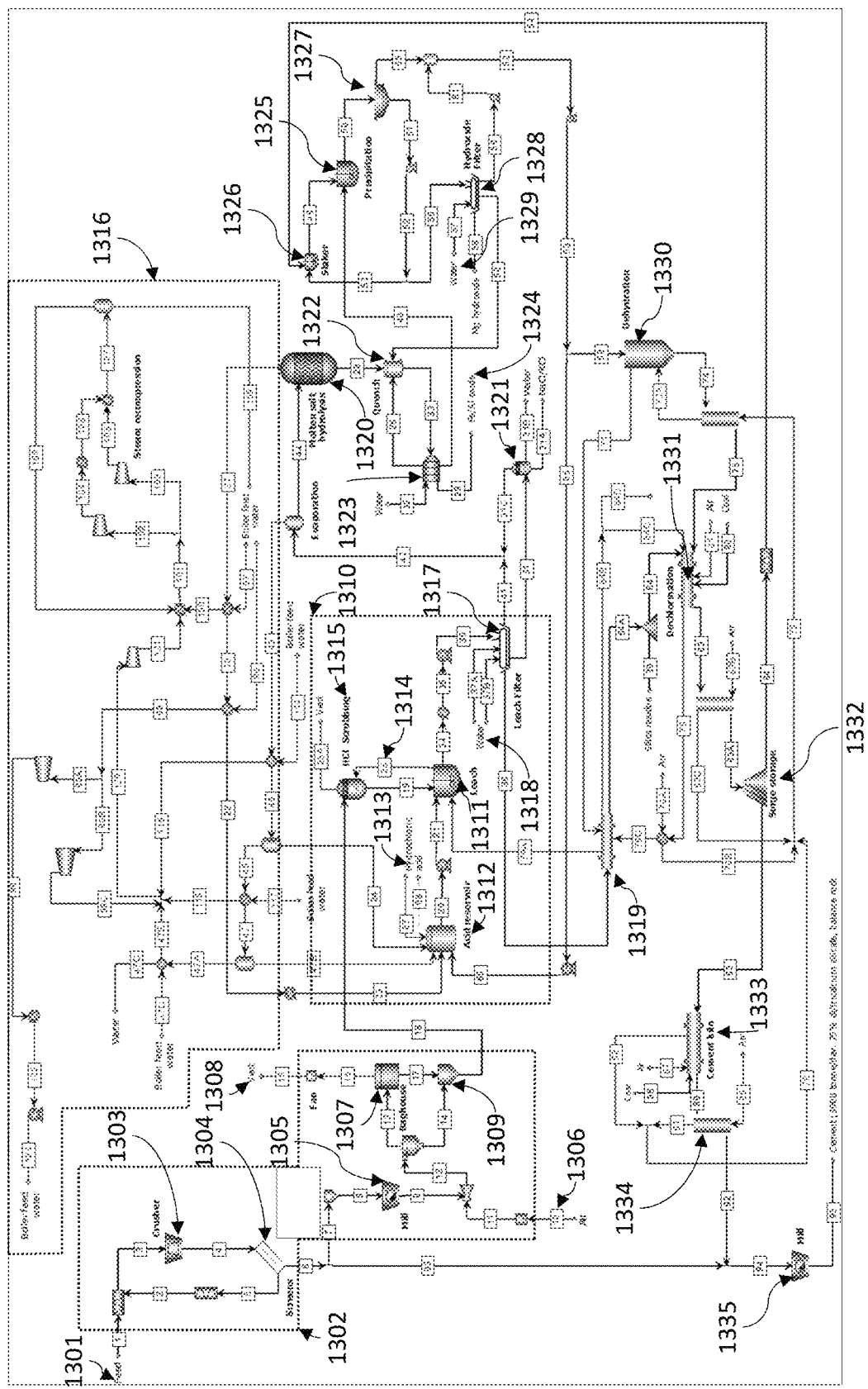
FIG. 13 shows an exemplary embodiment of a system for producing clinker, e.g., clinker for OPC

FIG. 13 shows one embodiment of a system and method to produce clinker from non-limestone materials. A starting material, e.g., a non-limestone material as described herein, for example, non-limestone rocks and/or minerals, is provided via a feed (1301) to a material processor (1302) comprising a crusher (1303) that processes the starting material into crushed particles comprising a plurality of sizes. The crushed particles are then transferred through one or more sieves (1304) that separate crushed particles of a desired size range from crushed particles of a larger-than-desired size range. Larger-than-desired crushed particles are returned to the crusher (1303), optionally mixed with new starting material, for further processing. Crushed particles of the desired size range are then fed to a mill (1305), wherein the crushed particles are milled to finer size. The milled particles are combined with an air stream (1306) and fed to a bag house (1307), wherein the milled particles are separated from the air and fed to a hopper (1309), and the clean air is vented (1308).

The milled particles are then transferred from the hopper to a leacher (1310), where the milled particles are contacted with a leaching agent in a leach tank (1311), such as an acid, for example HCl, to form a pulp. The leaching agents is provided from a acid storage tank (1312). Additional leaching agent can be added or removed (1313) from the acid storage tank (1312) as necessary. The leach tank (1311) can comprise an agitator/stirring element. The leach tank can comprise one or more heating elements (not shown) to heat the pulp. The leaching system can comprise an acid recovery element (1314), that recovers evaporated acid and returns it to the leach tank (1311), and/or or vents it (1315). Water can be added to the acid storage tank from any suitable source of water, for example a boiler/steam recompression system (1316) to prepare the desired concentration of acid. After suitable treatment the treated pulp, generally comprising a calcium-rich liquid fraction and a calcium-depleted solid fraction, can be transferred through a first separator, in this example comprising a leach filter (1317) to separate the calcium-depleted solid fraction from the calcium-rich liquid fraction. Water (1318), and/or any other suitable fluid, can be added at any time to the leach filter, for example, for rinsing the calcium-depleted solid fraction. The calcium-depleted solid-fraction can be transferred to a kiln (1319) for drying. Generally the solid calcium-depleted fraction comprises silica, and some or all of solid fraction can be used in later stages of the process, e.g., during dechlorination, as a source of silica. Additionally or alternatively, some or all of the solid fraction can be further treated, e.g., treated to obtain a desired size range, to provide supplementary cementitious material (SCM), which can be sold and/or used in combination with cement produced in the process to make, e.g., concrete.

The calcium-rich liquid fraction from the first separator, e.g., leach filter (1317) is then passed to a precipitation unit that is a pyrohydrolysis precipitation unit, in this embodiment a molten salt hydrolysis chamber (1320) for heating with or without pretreatment to remove water, NaCl, and/or KCl from the leachate (1321). The molten salt hydrolysis chamber, e.g., pyrohydrolysis chamber, (1320) treats the calcium-rich liquid fraction at one or more temperatures for a predetermined duration at each temperature to promote certain chemical reactions, include conversion of soluble species of iron and/or aluminum, e.g., iron chlorides and/or aluminum chlorides into insoluble species, which can include oxides, e.g., iron and/or aluminum oxides. The treated calcium-rich liquid fraction is then cooled in a quencher (1322) and mixed with water in a mixer (1323). Depending on the treatment protocol, insoluble aluminum and iron species, e.g., oxides, can be recovered after treatment (1324), e.g., in a separator, for example during the water addition in the mixer (1323). The treated calcium-rich liquid fraction is then transferred to a precipitation unit that is a base precipitation unit comprising a precipitation vessel (1325), where the treated calcium-rich liquid fraction is contacted with one or more basic chemicals, so that soluble magnesium species, e.g., magnesium chlorides, are converted into insoluble magnesium species, e.g., magnesium oxides, and precipitated. The base can be treated in a slaker (1326) prior to contacting the treated leachate. The insoluble, precipitated magnesium species, e.g., magnesium oxide species, is then separated from the treated calcium-rich liquid fraction through a separator, e.g., comprising a series of settling units (1327) and/or filters (1328), and optionally rinsed with water, or any other suitable liquid (1329). In certain embodiments (not shown), the system does not include the pyrohydrolysis chamber, and the precipitation unit that is a base precipitation unit serves to precipitate aluminum, iron, and/or magnesium species.

The treated calcium-rich liquid fraction can be transferred to the acid storage tank, e.g., acid reservoir, (1312) and/or a dehydrator (1330) where calcium-rich liquid fraction is dehydrated, leaving a solid comprising calcium chloride, generally comprising a high concentration of calcium chloride, in one or more hydration states. The solid comprising calcium chloride (which can be in one or more hydration states) is then passed to a dechlorinator (1331) mixed with one or more suitable silicate species (such as silica from the calcium-depleted solid fraction) and heated in the presence of steam to convert solid comprising calcium chloride into dechlorinated solid comprising calcium compounds, such as described elsewhere herein, while simultaneously regenerating the leaching agent, e.g., HCl, which can be directed back to the leach tank or the acid reservoir. The dechlorinated solid comprising calcium compounds can be stored for later use (1332) and/or transferred to a clinkerer (cement kiln) (1333), combined with suitable flux, for conversion into clinker. Some or all of the flux can comprise the insoluble metal species, e.g., comprising metal oxides such as iron and/or aluminum oxides, separated from treated leachate (1324). After heat treatment in the clinkerer (cement kiln) (1333), the clinker is then transferred to a cooling unit (1334), the cooled clinker can then transferred to a mill (1335) for processing into cement. A portion of the dechlorinated solid comprising calcium compounds, clinker and/or cement can be used as some or all of the base for precipitation of magnesium in the precipitation tank (1325). A portion or all of the cement can be sold. A portion or all of the cement can be used to produce concrete, optionally in combination with a portion of the calcium-depleted solid fraction (acting as SCM) and/or with aggregate formed from the starting material, e.g., in the crushing and/or milling process.

In certain embodiments, provided herein is a concrete production facility comprising a source of cement and a source of aggregates, wherein the cement and aggregates are both derived from the same material, e.g., a non-limestone material as described herein. The facility can further comprise a source of SCM, where the SCM is also derived from the same material. The facility can comprise a mixer for mixing the cement, aggregates, and, optionally, SCM, to produce a concrete. In certain embodiments, the system also comprises a source of cement that is produced by conventional methods (calcining and sintering), and in certain embodiments this conventional cement is also provided to the mixer.

EMBODIMENTS

In embodiment 1 provided is a method for producing clinker comprising: (a) contacting a non-limestone material comprising calcium with hydrochloric acid to produce a calcium-depleted solid fraction and a calcium-rich liquid fraction comprising calcium chloride; (b) treating the calcium-rich liquid fraction to produce a solid comprising calcium chloride; (c) dechlorinating the solid comprising calcium chloride to produce a dechlorinated solid comprising calcium compounds; and (d) treating the dechlorinated solid comprising calcium to produce clinker. In embodiment 2 provided is the method of embodiment 1 further comprising separating the calcium-depleted solid fraction from the calcium-rich liquid fraction. In embodiment 3 provided is the method of embodiment 1 or embodiment 2 wherein the calcium-rich liquid fraction comprises one or more non-calcium salts of magnesium, iron, and/or aluminum, and treating the calcium-rich liquid fraction comprises treating the liquid to precipitate one or more insoluble magnesium, iron, and/or aluminum compounds. In embodiment 4 provided is the method of embodiment 3 wherein treating the calcium-rich liquid fraction comprises contacting the fraction with a base. In embodiment 5 provided is the method of embodiment 4 wherein treating the calcium-rich liquid fraction comprises subjecting the fraction to pyrohydrolysis to precipitate aluminum and/or iron-containing insoluble compounds, removing the aluminum and/or iron-containing insoluble compounds, then contacting the remaining calcium-rich liquid fraction with the base. In embodiment 6 provided is the method of any preceding embodiment further comprising dehydrating the calcium-rich liquid fraction to produce the solid comprising calcium chloride. In embodiment 7 provided is the method of any preceding embodiment wherein dechlorinating the solid comprising calcium chloride comprises heating the solid in the presence of steam and silica to produce the dechlorinated solid comprising calcium. In embodiment 8 provided is the method of embodiment 7 wherein calcium and silica are present in a molar ratio of between 2.45 and 3.25 Ca:Si. In embodiment 9 provided is the method of any preceding embodiment wherein treating the dechlorinated solid comprising calcium to produce clinker comprises heating the solid with flux. In embodiment 10 provided is the method of embodiment 9 wherein the flux comprises aluminum and iron oxides. In embodiment 11 provided is the method of any preceding embodiment further comprising processing the clinker to produce cement.

In embodiment 12 provided is a method for preparing a solid material comprising one or more magnesium compounds capable of reacting with and sequestering carbon dioxide comprising: (a) contacting a non-limestone starting material with an acid to produce a calcium-rich liquid fraction comprising magnesium and a calcium-depleted solid fraction; (b) treating calcium-rich liquid fraction to precipitate the one or more magnesium compounds capable of reacting with and sequestering carbon dioxide. (c) separating the magnesium-rich precipitate from the calcium-rich liquid fraction; and (d) rinsing and drying the magnesium-rich precipitate. In embodiment 13 provided is the method of embodiment 12 further comprising separating the one or more magnesium compounds capable of reacting with and sequestering carbon dioxide from the liquid. In embodiment 14 provided is the method of embodiment 13 further comprising rinsing and drying the one or more magnesium compounds capable of reacting with and sequestering carbon dioxide. In embodiment 15 provided is the method of any one of embodiments 12 through 14 wherein the one or more magnesium compounds capable of reacting with and sequestering carbon dioxide comprise magnesium oxides, hydroxides, oxyhydroxide, silicates, silicate hydrates, complexes or a combination thereof. In embodiment 16 provided is the method of any one of embodiments 12 through 15 further comprising contacting the one or more magnesium compounds capable of reacting with and sequestering carbon dioxide with carbon dioxide to sequester the carbon dioxide as magnesium carbonate or bicarbonate. In embodiment 17 provided is the method of embodiment 16 w the contacting comprises exposing the one or more magnesium compounds capable of reacting with and sequestering carbon dioxide to a flue gas comprising carbon dioxide, such as a flue gas produced during the process to produce the one or more magnesium compounds capable of reacting with and sequestering carbon dioxide, to produce magnesium carbonate. In embodiment 18 provided is the method of embodiment 16 wherein the contacting comprises exposing the one or more magnesium compounds capable of reacting with and sequestering carbon dioxide to air comprising carbon dioxide, to produce magnesium carbonate. In embodiment 19 provided is the method of embodiment 16 wherein the contacting comprises placing the one or more magnesium compounds capable of reacting with and sequestering carbon dioxide in a body of water, such as an ocean, to react with carbon dioxide in the body of water to produce magnesium bicarbonate.

In embodiment 20 provided is a method for obtaining a carbon credit comprising: (a) calculating a value of net carbon dioxide (CO2) avoided and/or a value of a value of net CO2 sequestered by (i) performing the method of any one of embodiments 1-18, 27-72, or 139-161; (ii) tracking one or more amounts of CO2 sequestered, one or more amounts of CO2 avoided and one or more amounts of CO2 outputs; (iii) determining the amount of CO2 avoided and/or the amount of CO2 sequestered from the one or more amounts of CO2 sequestered, one or more amounts of CO2 avoided, and CO2 outputs; and (b) obtaining a carbon credit based on the value of CO2 avoided and/or sequestered in (a)(iii). In embodiment 21 provided is the method of embodiment 20 wherein a value of CO2 avoided is determined by producing the same amount of cement by a process comprising calcining limestone and comparing to the amount of CO2 produced by a process of any one of embodiments 1-18, 27-72, or 139-161. In embodiment 22 provided is the method of embodiment 20 or 21, wherein the value of CO2 sequestered is determined by sequestering CO2 with Mg compounds and quantifying the amount of CO2 sequestered by a given amount of Mg compounds. In embodiment 23 provided is the method of embodiment 22, wherein at least a portion of the CO2 sequestered is atmospheric CO2.

In embodiment 24 provided is a composition comprising at least 50, 60, 70, 80, 90, or 95% w/w calcium chloride, such as at least 90%, in preferred embodiments at least 95% calcium chloride; and at least 50, 60, 65, 70, 75, 80, 85, 90, or 95% silica, such as at least 60%, preferably at least 75%, more preferably at least 80% w/w. In embodiment 25 provided is the composition of embodiment 24 comprising less than 10, 8, 7, 6, 5, 4, 3, 2, 1, 0.5, or 0.1% Cl w/w, in preferred embodiments less than 5%, in more preferred embodiment less than 1%. In embodiment 26 provided is the composition of embodiment 24 or 25 comprising less than 20, 15, 10, 8, 7, 6, 5, 4, 3, 2, 1, 0.5, or 0.1% CaO w/w, in preferred embodiments less than 5%, in more preferred embodiments less than 0.5%.

In embodiment 27 provided is a method for dechlorinating a solid comprising calcium chloride, comprising: (i) combining the solid comprising calcium chloride with a solid comprising silica; and (ii) heating the combined calcium chloride and silica in the presence of steam to a temperature of 750-1250° C. to produce HCl gas and a dechlorinated calcium product. In embodiment 28 provided is the method of embodiment 27 wherein the temperature is 900-1250° C. In embodiment 29 provided is the method of embodiment 27 wherein the temperature is 1000-1250° C. In embodiment 30 provided is the method of embodiment 27 wherein the temperature is 1100-1250° C. In embodiment 31 provided is the method of any of embodiments 27 through 30 wherein, when the temperature reaches 700-750° C., heating proceeds at a rate of not more than 60, 50, 40, 30, 10, or 5° C. per minute until a temperature of 800-850° C. is reached. In embodiment 32 provided is the method of any of embodiments 27 through 31 wherein the solid comprising calcium chloride and the solid comprising silica are combined so that a Ca—Si molar ratio of between 2.5 to 3.5 is achieved. In embodiment 33 provided is the method of any of embodiments 27 through 31 wherein the solid comprising calcium chloride is present at 50-90 wt % and silica is present at 10-40 wt %. In embodiment 34 provided is the method of any of embodiments 27 through 33 wherein the solid comprising calcium chloride comprises at least 80, 90, 92, 93, 94, 95, 96, 97, 98, or 99% calcium chloride, preferably at least 90%, more preferably at least 95%. In embodiment 35 provided is the method of any of embodiments 27 through 34 wherein the solid comprising silica comprises at least 50, 60, 65, 70, 75, 80, 85, 90, or 95% silica, preferably at least 60%, more preferably at least 75%, even more preferably at least 80%. In embodiment 36 provided is the method of embodiment 35 wherein the solid comprising calcium chloride comprises at least 90% calcium chloride and the solid comprising silica comprises at least 80% silica. In embodiment 37 provided is the method of any of embodiments 27 through 36 wherein the steam is present at 5-100 vol %. In embodiment 38 provided is the method of any of embodiments 27 through 37 wherein chloride content is reduced at least 60, 70, 80, 90, 95, 96, 97, 98, or 99%, preferably at least 90%, more preferably at least 95%, even more preferably at least 99%. In embodiment 39 provided is the method of any of embodiments 27 through 38 wherein the dechlorinated calcium product comprises at least 5, 10, 15, 20, 25, 30, 35, 40, 45, 50, 55, 60, 65, 70, 75, or 80 wt % dicalcium silicate, preferably at least 15%, more preferably at least 25%, of dicalcium silicate and less than 30, 20, 15, 12, 10, 9, 8, 7, 6, 5, 4, 3, 2, or 1 wt % CaO, preferably less than 10%, more preferably less than 5% CaO. In embodiment 40 provided is the method of embodiment 40 wherein the dechlorinated calcium product comprises at least 15% dicalcium silicate and less than 10% CaO.

In embodiment 41 provided is a method for producing a clinker from a solid comprising calcium chloride comprising: (a) dechlorinating the solid comprising calcium chloride to produce a dechlorinated composition comprising Ca and having less than 10% w/w Cl; and (b) heating the dechlorinated composition in the presence of a flux to produce a clinker. In embodiment 42 provided is the method of embodiment 41 wherein the clinker comprises dicalcium silicate and tricalcium silicate. In embodiment 43 provided is the method of embodiment 41 or 42 wherein the clinker comprises Portland cement clinker. In embodiment 44 provided is the method of any one of embodiments 41 through 43 wherein the composition comprising calcium chloride also comprises silica. In embodiment 45 provided is the method of embodiment 44 wherein the molar ratio of Ca:Si in the composition comprising calcium chloride and silica is 1.0 to 5.0, preferably 2.0 to 4.0, more preferably 2.5 to 3.25. In embodiment 46 provided is the method of any one of embodiments 41 through 45 wherein the composition comprising calcium chloride comprises at least 80, 90, 92, 95, 96, 97, 98, or 99% calcium chloride, preferably at least 80%, more preferably at least 90%, even more preferably at least 95%. In embodiment 47 provided is the method of any one of embodiments 41 through 46 wherein the dechlorinated composition comprises less than 30, 20, 10, 8, 5, 4, 3, 2, or 1% CaO, preferably less than 10%, more preferably less than 5%. In embodiment 48 provided is the composition of any one of embodiments 41 through 47 wherein the dechlorinated composition comprises no more than 10, 8, 6, 5, 4, 3, 2, or 1% Cl by weight, preferably no more than 10%, more preferably no more than 5%, even more preferably no more than 1%. In embodiment 49 provided is the method of any one of embodiments 41 through 48 wherein the dechlorinated composition comprises at least 2, 5, 10, 15, 20, 25, 30, 35, or 40% dicalcium silicate, preferably at least 15%, more preferably at least 25%. In embodiment 50 provided is the method of any one of embodiments 41 through 49 wherein dechlorinating the composition comprising calcium chloride comprises heating the composition. In embodiment 51 provided is the method of embodiment 50 further comprising introducing steam when the composition comprising calcium chloride reaches a temperature of 300° C. or above. In embodiment 52 provided is the method of embodiment 51 wherein heating the composition comprising calcium chloride in the presence of steam comprises heating to a temperature of at least 750° C. and/or not more than 1250° C. In embodiment 53 provided is the method of embodiment 52 wherein the heating is at a rate of not more than 100, 80, 50, 40, 30, 25, 20, 15, 10, 5, or 1°/min or slower between 700-750° C. and 800-1000°. In embodiment 54 provided is the method of any one of embodiments 41 through 53 wherein HCl is produced during the dechlorination. In embodiment 55 provided is the method of any one of embodiments 41 through 54 wherein the flux comprises iron and/or aluminum compounds. In embodiment 56 provided is the method of embodiment 55 wherein the aluminum compounds comprise Al2O3 and/or the iron compounds comprise Fe2O3. In embodiment 57 provided is the method of embodiment 55 or embodiment 56 wherein the iron compounds and/or the aluminum compounds and the composition comprising calcium chloride are produced from the same starting materials. In embodiment 58 provided is the method of embodiment 57 wherein the starting material comprises calcium-bearing rocks and/or minerals. In embodiment 59 provided is the method of any one of embodiments 44 through 58 wherein the silica is produced from the same starting materials as those for the composition comprising calcium chloride. In embodiment 60 provided is the method of any one of embodiments 41 through 59 wherein the heating of the dechlorinated composition in the presence of flux comprises heating the composition to 1200-1600, preferably 1400-1600° C. In embodiment 61 provided is the method of embodiment 60 comprising heating the composition to 1500-1600° C. In embodiment 62 provided is the method of embodiment 60 comprising heating the composition to 1450-1500° C. In embodiment 63 provided is the method of any one of embodiments 41 through 62 wherein the dichlorination and/or the heating of the dechlorinated composition is performed in a kiln. In embodiment 64 provided is the method of embodiment 63 wherein the kiln comprises a rotary kiln.

In embodiment 65 provided is a method for producing clinker comprising heating a composition comprising dicalcium silicate and not more than 20, 15, 10, 5, 2, or 1% CaO, such as not more than 10% CaO, in the presence of flux to produce clinker. In embodiment 66 provided is the method of embodiment 65 wherein the composition contains less than 5, 4, 3, 2, 1, 0.5, or 0.1% tricalcium silicate, preferably less than 1%, more preferably less than 0.1% and the clinker comprises at least 5, 10, 15, 20, 25, 30, 35, 40, 45, 50, 55, or 60% tricalcium silicate, preferably at least 20%, more preferably at least 50%. In embodiment 67 provided is the method of embodiment 65 or 66 wherein the flux comprises aluminum and/or iron oxides.

In embodiment 68 provided is a method to produce both clinker and supplementary cementitious material (SCM) from a starting material comprising a non-limestone material that comprises calcium and silicon comprising: (i) dissolving the non-limestone material in HCl to produce a calcium-rich liquid fraction comprising calcium chloride and a calcium-depleted solid fraction comprising silica; (ii) producing the SCM from the calcium-depleted solid fraction comprising silica; and (iii) producing clinker from the calcium-rich liquid fraction comprising calcium chloride. In embodiment 69 provided is the method of embodiment 68 further comprising producing aggregate from the non-limestone material. In embodiment 70 provided is the method of embodiment 68 or embodiment 69 further comprising producing cement from the clinker. In embodiment 71 provided is the method of embodiment 70 further comprising combining the cement, the aggregates, and water to produce concrete. In embodiment 72 provided is the method of embodiment 71 further comprising combining the SCM with the cement, aggregates, and water to produce concrete.

In embodiment 73 provided is an apparatus for producing clinker from non-limestone materials comprising (i) a first processor configured to treat the non-limestone starting materials to produce a solid composition comprising calcium chloride, operably connected to (ii) a second processor configured to form a clinker from the solid composition comprising calcium chloride. In embodiment 74 provided is the apparatus of embodiment 73 wherein the first processor comprises (a) a leacher configured to contact the non-limestone material with an acid to produce a first calcium-rich liquid fraction and a calcium-depleted solid fraction, operably connected to (b) a precipitator configured to remove one or more non-calcium salts from the calcium-rich fraction through conversion of the one or more non-calcium salts to solid form that are removed from the calcium-rich fraction; and (c) a dehydrator configured to remove water from the calcium-rich liquid fraction from the precipitator, to produce the solid comprising calcium chloride. In embodiment 75 provided is the apparatus of embodiment 73 or embodiment 74 wherein the first processor further comprises a material processor configured to process non-limestone starting material, operably connected to the leacher. In embodiment 76 provided is the apparatus of embodiment 75 wherein the material processor is configured to reduce size of the non-limestone material and/or sort the material into one or more size ranges. In embodiment 77 provided is the apparatus of any one of embodiments 74 through 76 wherein the first processor further comprises an acid storage tank operably connected to the leacher. In embodiment 78 provided is the apparatus of any one of embodiments 74 through 77 wherein the leacher comprises a heating element. In embodiment 79 provided is the apparatus of any one of embodiments 74 through 78 wherein the leacher comprises an agitator. In embodiment 80 provided is the apparatus of any one of embodiments 74 through 79 wherein the leacher further comprises a first separator, operably connected to the leacher and to the precipitator, configured to separate the calcium-rich liquid fraction and the calcium-depleted solid fraction, and direct the calcium-rich liquid fraction to the precipitator. In embodiment 81 provided is the apparatus of any one of embodiments 74 through 80 wherein the precipitator is operably connected to a second separator for separating the solid from the calcium-rich liquid fraction. In embodiment 82 provided is the apparatus of any one of embodiments 74 through 81 wherein the precipitator comprises a first precipitation unit that is a base precipitation unit configured to precipitate a first set of non-calcium compounds. In embodiment 83 provided is the apparatus of embodiment 82 further comprising one or more sources of base operably connected to the first precipitation unit. In embodiment 84 provided is the apparatus of embodiment 83 wherein the one or more sources of base comprise a source of calcium base. In embodiment 85 provided is the apparatus of any one of embodiments 82 through 85 wherein the precipitator comprises a second precipitation unit that is a pyrohydrolysis precipitation unit configured to precipitate a second set of non-calcium compounds from the calcium-rich liquid fraction. In embodiment 86 provided is the apparatus of embodiment 85 wherein the second precipitation unit is operably connected to a third separator for separating the second set of precipitated non-calcium compounds from the calcium-rich liquid fraction. In embodiment 87 provided is the apparatus of embodiment 85 or embodiment 86 wherein the precipitator comprises a third precipitation unit that is a pyrohydrolysis unit for precipitating a third set of non-calcium compounds from the calcium-rich liquid fraction. In embodiment 88 provided is the apparatus of embodiment 87 wherein the third precipitation unit is operably connected to a fourth separator for separating the third set of precipitated non-calcium compounds from the calcium-rich liquid fraction. In embodiment 89 provided is the apparatus of embodiment 87 or embodiment 88 wherein the second and third precipitation units are the same and the second and third sets of precipitated non-calcium compounds are the same. In embodiment 90 provided is the apparatus of embodiment 87 or embodiment 88 wherein the second and third precipitation units are different, and the second precipitation unit is configured to precipitate aluminum compounds by heating the calcium-rich liquid to a first temperature or range of temperatures and the third precipitation unit is configured to precipitate iron compounds by heating the calcium-rich liquid to a second temperature or range of temperatures, higher than the first. In embodiment 91 provided is the apparatus of any one of embodiments 74 through 90 wherein the dehydrator comprises a heating element. In embodiment 92 provided is the apparatus of any one of embodiments 73 through 91 wherein the second processor comprises (a) a dechlorinator configured to dechlorinate the solid comprising $CaCl2$ to produce a dechlorinated solid comprising calcium compounds, operably connected to (b) a clinkerer configured to heat the dechlorinated solid in the presence of flux to produce a clinker. In embodiment 93 provided is the apparatus of embodiment 92 wherein the dechlorinator is configured to produce a dechlorinated solid comprising calcium compounds and less than 20, 15, 10, 8, 7, 6, 5, 4, 3, 2, or 1 wt % Cl. In embodiment 94 provided is the apparatus of embodiment 92 or embodiment 93 wherein the source of base comprises dechlorinated solid from the dechlorinator and/or cement clinker from the cement kiln. In embodiment 95 provided is the apparatus of any one of embodiments 92 through 94 wherein the dechlorinator is operably connected to (1) One or more sources of steam; and (2) One or more sources of silica. In embodiment 96 provided is the apparatus of embodiment 95 wherein the one or more sources of steam comprises the dehydrator of the first processor. In embodiment 97 provided is the apparatus of embodiment 95 or embodiment 96 wherein the one or more sources of silica comprise the first processor or a portion thereof. In embodiment 98 provided is the apparatus of embodiment 97 wherein the first processor or portion thereof comprises the first separator. In embodiment 99 provided is the apparatus of any one of embodiments 92 through 98 wherein the clinkerer is operably connected to one or more sources of flux; In embodiment 100 provided is the apparatus of embodiment 99 wherein the one or more sources of flux comprises the first processor or portion thereof. In embodiment 101 provided is the apparatus of embodiment 100 wherein the first processor or portion thereof comprises the precipitator. In embodiment 102 provided is the apparatus of any one of embodiments 92 through 101 wherein the dechlorinator and/or the clinkerer comprises a rotary kiln. In embodiment 103 provided is the apparatus of any one of embodiments 92 through 102 further comprising a clinker processor for processing clinker from the clinkerer. In embodiment 104 provided is the apparatus of any one of embodiments 73 through 102 further comprising a control system, wherein the control system comprises (i) one or more sources of input from the first processor and/or the second processor; (ii) a processor for processing input from the one or more sources of input and providing an output; and (iii) one or more actuators to receive the output and modulate one or more operations of the first processor and/or the second processor. In embodiment 105 provided is the apparatus of embodiment 104 wherein the one or more sources of input comprises one or more sensors, such as one or more temperature sensors to detect a temperature of the leacher, the dehydrator, the dechlorinator, and/or the clinkerer, or a portion thereof. In embodiment 106 provided is the apparatus of embodiment 104 or embodiment 105 wherein the actuators comprise one or more actuators that modulate operation of a heating element for the leacher, the dehydrator, the dechlorinator, and/or the clinkerer.

In embodiment 107 provided is a network comprising a plurality of apparatus of any one of embodiments 73 through 106 wherein the apparatus are spatially separate and wherein the apparatus each send information to a common controller and/or controllers.

In embodiment 108 provided is an apparatus for producing a solid comprising calcium chloride from non-limestone materials comprising calcium, wherein the apparatus comprises a processor configured to treat the non-limestone starting materials to produce the solid comprising calcium chloride. In embodiment 109 provided is the apparatus of embodiment 108 wherein the processor comprises (a) a leacher configured to contact the non-limestone materials with an acid to produce a first calcium-rich liquid fraction and a calcium-depleted solid fraction, operably connected to (b) a precipitator configured to remove one or more non-calcium salts from the calcium-rich fraction through conversion of the one or more non-calcium salts to solid form that are removed from the calcium-rich fraction; and (c) a dehydrator configured to remove water from the calcium-rich liquid fraction from the precipitator, to produce a solid comprising calcium chloride. In embodiment 110 provided is the apparatus of embodiment 108 or embodiment 109 wherein the processor further comprises a material processor configured to process non-limestone starting material, operably connected to the leacher. In embodiment 111 provided is the apparatus of embodiment 110 wherein the material processor is configured to reduce size of the non-limestone material and/or sort the material into one or more size ranges. In embodiment 112 provided is the apparatus of any one of embodiments 109 through 111 wherein the processor further comprises an acid storage tank operably connected to the leacher. In embodiment 113 provided is the apparatus of any one of embodiments 109 through 112 wherein the leacher comprises a heating element. In embodiment 114 provided is the apparatus of any one of embodiments 109 through 113 wherein the leacher comprises an agitator. In embodiment 115 provided is the apparatus of any one of embodiments 109 through 114 wherein the leacher further comprises a first separator, operably connected to the leacher and to the precipitator, configured to separate the calcium-rich liquid fraction and the calcium-depleted solid fraction, and direct the calcium-rich liquid fraction to the precipitator. In embodiment 116 provided is the apparatus of any one of embodiments 109 through 115 wherein the precipitator is operably connected to a second separator for separating the solid from the calcium-rich liquid fraction. In embodiment 117 provided is the apparatus of any one of embodiments 109 through 116 wherein the precipitator comprises a first precipitation unit that is a base precipitation unit configured to precipitate a first set of non-calcium compounds. In embodiment 118 provided is the apparatus of embodiment 117 further comprising one or more sources of base operably connected to the first precipitation unit. In embodiment 119 provided is the apparatus of embodiment 118 wherein the one or more sources of base comprise a source of calcium base. In embodiment 120 provided is the apparatus of any one of embodiments 109 through 120 wherein the precipitator comprises a second precipitation unit that is a pyrohydrolysis precipitation unit configured to precipitate a second set of non-calcium compounds from the calcium-rich liquid fraction. In embodiment 121 provided is the apparatus of embodiment 121 wherein the second precipitation unit is operably connected to a third separator for separating the second set of precipitated non-calcium compounds from the calcium-rich liquid fraction. In embodiment 122 provided is the apparatus of embodiment 120 or embodiment 121 wherein the precipitator comprises a third precipitation unit that is a pyrohydrolysis unit for precipitating a third set of non-calcium compounds from the calcium-rich liquid fraction. In embodiment 123 provided is the apparatus of embodiment 122 wherein the third precipitation unit is operably connected to a fourth separator for separating the third set of precipitated non-calcium compounds from the calcium-rich liquid fraction. In embodiment 124 provided is the apparatus of embodiment 122 or embodiment 123 wherein the second and third precipitation units are the same and the second and third sets of precipitated non-calcium compounds are the same. In embodiment 125 provided is the apparatus of embodiment 122 or embodiment 123 wherein the second and third precipitation units are different, and the second precipitation unit is configured to precipitate aluminum compounds by heating the calcium-rich liquid to a first temperature or range of temperatures and the third precipitation unit is configured to precipitate iron compounds by heating the calcium-rich liquid to a second temperature or range of temperatures, higher than the first. In embodiment 126 provided is the apparatus of any one of embodiments 109 through 125 wherein the dehydrator comprises a heating element.

In embodiment 127 provided is an apparatus to produce clinker from a solid comprising calcium chloride, wherein the apparatus comprises (a) a dechlorinator configured to dechlorinate the solid comprising calcium chloride to produce a dechlorinated solid comprising calcium compounds, operably connected to (b) a clinkerer configured to heat the dechlorinated solid in the presence of flux to produce a clinker. In embodiment 128 provided is the apparatus of embodiment 127 wherein the dechlorinator is configured to produce a dechlorinated solid comprising calcium compounds and less than 20, 15, 10, 8, 7, 6, 5, 4, 3, 2, or 1 wt % Cl. In embodiment 129 provided is the apparatus embodiment 127 or embodiment 128 wherein the dechlorinator is operably connected to (1) One or more sources of steam; and (2) One or more sources of silica. In embodiment 130 provided is the apparatus of any one of embodiments 127 through 129 wherein the clinkerer is operably connected to one or more sources of flux; In embodiment 131 provided is the apparatus of any one of embodiments 127 through 130 wherein the dechlorinator and/or the clinkerer comprises a rotary kiln. In embodiment 132 provided is the apparatus of any one of embodiments 127 through 131 further comprising a clinker processor for processing clinker from the cement kiln. In embodiment 133 provided is the apparatus of any one of embodiments 127 through 132 further comprising a control system, wherein the control system comprises (i) one or more sources of input from the dechlorinator and/or the clinkerer; (ii) a processor for processing input from the one or more sources of input and providing an output; and (iii) one or more actuators to receive the output and modulate one or more operations of the dechlorinator and/or the clinkerer. In embodiment 134 provided is the apparatus of embodiment 133 wherein the one or more sources of input comprises one or more sensors, such as one or more temperature sensors to detect a temperature of the dechlorinator, and/or the clinkerer, or a portion thereof. In embodiment 135 provided is the apparatus of embodiment 133 or embodiment 134 wherein the actuators comprise one or more actuators that modulate operation of a heating element for the dechlorinator, and/or the clinkerer.

In embodiment 136 provided is a system comprising: (a) a first processor configured to produce cement from a non-limestone material; (b) a second processor configured to produce SCM from the non-limestone material. In embodiment 137 provided is the system of embodiment 136 further comprising (c) a third processor to produce aggregates from the non-limestone material. In embodiment 138 provided is the system of embodiment 136 and embodiment 137 wherein the first and second processors are the same.

In embodiment 139 provided is a method for producing clinker comprising (a) dissolving a non-limestone material comprising calcium in acid to produce a calcium-rich liquid fraction comprising calcium chloride and a calcium-depleted solid fraction; (b) separating the calcium-depleted solid fraction from the calcium-rich liquid fraction; (c) producing a solid comprising calcium chloride from the calcium-rich liquid; and (d) treating the solid comprising calcium chloride to form clinker. In embodiment 140 provided is the method of embodiment 139 wherein the non-limestone material also comprises silicon. In embodiment 141 provided is the method of embodiment 139 or embodiment 140 wherein the non-limestone material comprises rocks and/or minerals. In embodiment 142 provided is the method of embodiment 141, wherein the non-limestone material comprising rocks and/or minerals comprises anorthosite, skarn, gabbro, pyroxenite, mafurite, basalt, copper skarn, tungsten skarn, quarry rock, mafic rock, ultramafic rock, or a combination thereof. In embodiment 143 provided is the method of any one of embodiment 139 through 142, wherein no more than 40, 30, 20, 15, 10, 5, 4, 3, 2, or 1% of the calcium in the starting material is present as calcium carbonate, preferably no more than 10%, more preferably no more than 5%. In embodiment 144 provided is the method of any one of embodiment 139 through 143, wherein the starting material further comprises aluminum, iron, and/or magnesium. In embodiment 145 provided is the method of any one of embodiment 139 through 144, wherein the method produces less than 90, 80, 70, 60, 50, 40, 30, 20, 10, or 5% emitted $CO_2$ as compared to production of the same quantity of hydraulic cement from limestone by a process that comprises calcining the limestone. In embodiment 146 provided is the method of embodiment 145, wherein the method produces less than 80% emitted $CO_2$. In embodiment 147 provided is the method of embodiment 145, wherein the method produces less than 60% emitted $CO_2$. In embodiment 148 provided is the method of embodiment 145, wherein the method produces less than 40% emitted $CO_2$. In embodiment 149 provided is the method of any one of embodiment 139 through 148, wherein the method further produces a supplementary Cementous material (SCM), a Mg derivative, and/or an aggregate. In embodiment 150 provided is the method of embodiment 149, wherein the SCM, Mg derivative, and/or aggregate are produced from the same starting material as used for producing the cement. In embodiment 151 provided is the method of any one of embodiment 139 through 151 wherein the acid comprises HCl, HBr, HI, $HNO_3$, or a combination thereof. In embodiment 152 provided is the method of embodiment 151, wherein the acid comprises at least 80, 90, 95, 99, or 100% HCl. In embodiment 153 provided is the method of any one of embodiment 139 through 152, wherein the acid is at a concentration of 10-37%. In embodiment 154 provided is the method of embodiment 153, wherein the concentration of the acid is 15-25%. In embodiment 155 provided is the method of embodiment 153, wherein the concentration of the acid is 20%. In embodiment 156 provided is the method of any one of embodiment 139 through 155 wherein producing a solid comprising a calcium compound comprising calcium chloride from the calcium-rich liquid comprises precipitating one or more compounds comprising aluminum, iron, and/or magnesium from the calcium-rich liquid. In embodiment 157 provided is the method of any one of embodiment 139 through 156 wherein producing a solid comprising calcium compounds comprising calcium chloride from the calcium-rich liquid comprises dehydrating the liquid to produce the solid comprising calcium chloride. In embodiment 158 provided is the method of any one of embodiment 139 through 157 wherein treating the solid comprising calcium chloride to form clinker comprises dechlorinating the solid comprising calcium chloride to produce a dechlorinated solid comprising calcium compounds. In embodiment 159 provided is the method of embodiment 158 wherein dechlorinating comprises heating the solid comprising calcium chloride in the presence of steam and silica. In embodiment 160 provided is the method of embodiment 158 or embodiment 159 further comprising treating the dechlorinated solid comprising calcium compounds to produce a clinker In embodiment 161 provided is the method of embodiment 160 wherein treating comprises heating the dechlorinated solid comprising calcium compounds in the presence of flux.

Throughout the description, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a method described herein can be combined in a variety of ways without departing from the spirit and scope of the present invention, whether explicit or implicit herein. For example, where reference is made to a particular compound, that compound can be used in various embodiments of compositions of the present invention and/or in methods of the present invention, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

The terms "a" and "an" and "the" and similar references in the context of describing the invention (especially in the context of the following claims) are to be construed to cover both the singular and the plural, unless otherwise indicated herein or clearly contradicted by context. For example, the term "a cell" includes a plurality of cells, including mixtures thereof. Where the plural form is used for compounds, salts, and the like, this is taken to mean also a single compound, salt, or the like.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

Where the use of the term "about" "approximately," or the like is before a quantitative value, the present invention also includes the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present invention remain operable. Moreover, two or more steps or actions may be conducted simultaneously.

The use of any and all examples, or exemplary language herein, for example, "such as" or "including," is intended merely to illustrate better the present invention and does not pose a limitation on the scope of the invention unless claimed. No language in the specification should be construed as indicating any non-claimed element as essential to the practice of the present invention.

EXAMPLES

Example 1

In this Example, highly efficient leaching of calcium from non-limestone rock was demonstrated.

The following leaching parameters were used on Ca-containing rocks which yielded >90% Ca extraction as measured by Induction Coupled Plasma Optical Emission Spectroscopy (ICP-OES). The calcium mass balance was closed via X-ray fluorescence (XRF) measurement on the initial rock and the leach residue.

| Rock | Particle Size (um) | [HCl] (wt %) | Pulp density wt % (s) (g/mL) | Temperature (C.) | Time (hrs) | Stirring (RPM) | Ca Yield (%) |
|---|---|---|---|---|---|---|---|
| Anorthosite | 63 | 20 | 29 | 100 | 9 | 250 | 99.05 |
| Gabbro | 63 | 30 | 10 | 100 | 24 | 250 | 92.13 |
| Skarn | N/A | 20 | 21 | 100 | 24 | 250 | 97.34 |

In all cases the calcium yield from the rock was greater than 90%, and greater than 95% and 99% for skarn and anorthosite, respectively. Thus, HCl treatment can be used to extract a high percentage of calcium from a variety of non-limestone rocks.

Example 2

In this Example, preferential precipitation of non-calcium components from a calcium-containing solution was demonstrated.

A test solution of the following composition was prepared by addition of $CaCl_2$ to a leachate produced as in Example 1. It composition was:

| Compound | CaCl2 | FeCl3 | MgCl2 | AlCl3 | H2O to Add |
|---|---|---|---|---|---|
| Actual Weight (g) | 150.06 | 15 | 100.45 | 15.01 | 235.71 |

By heating up the above solution (trace elements not listed) to 150° C. for two hours a solid was precipitated which was highly depleted in Ca and enriched in Iron and Aluminum. These data indicates that non-Mg, non-Ca components can be substantially removed via hydrolysis. Precipitant composition as measured by XRF were:

| | |
|---|---|
| $Al_2O_3$ | 41.4 |
| $Fe_2O_3$ | 20.5 |
| CaO | 2.98 |
| MgO | 1.01 |
| $SiO_2$ | 0.756 |
| Cl | 0.620 |
| $SO_3$ | 0.166 |
| $TiO_2$ | 0.143 |
| MnO | 0.0582 |
| $P_2O_5$ | 0.0431 |
| $K_2O$ | 0.0320 |
| $Cr_2O_3$ | 0.0231 |
| Loss on Ignition (%): | 32.23 |

It can be seen that the composition of the precipitant is highly enriched in iron and aluminum components, with very low amounts of calcium and magnesium components, thus demonstrating selective removal of iron and aluminum by heating the solution.

Example 3

In this Example, production of dicalcium and tricalcium silicate from a composition derived from a non-limestone rock was demonstrated, as well as extremely high depletion of chloride.

$CaCl_2$ was mixed with $SiO_2$ (produced from leaching an anorthosite rock) at a 3:1 $CaCl_2:SiO_2$ molar ratio. The material was placed in a crucible and heated to sequentially 850° C., 1000° C., 1200° C., and 1500° C. for one hour using a steam atmosphere at all temperatures except 1500° C. Both dicalcium silicate and tricalcium silicate were produced in significant quantities, as measured by X-ray diffraction (XRD) (below).

| | |
|---|---|
| $Ca_2SiO_4$ (Larnite) | 36.4 |
| $Ca_2SiO_4$ (Calcio-Olivine I) ** | 7.2 |
| $Ca_2SiO_4$ (Calcio-Olivine II) ** | 11.1 |
| $Ca_3SiO_5$ (Hatrurite) | 4.9 |
| $Ca_3Al_2O_6$ (Calcium Aluminum Oxide) | — |
| $CaAl_2O_4$ (Krotite) * | — |
| Amorphous Content | 40.4 |

It was also shown that, surprisingly, $CaCl_2$ could be dechlorinated to >99.5%, as shown by XRF

| | |
|---|---|
| CaO | 66.2 |
| $SiO_2$ | 31.4 |
| $Al_2O_3$ | 1.89 |
| MgO | 0.189 |
| $Fe_2O_3$ | 0.0519 |
| Cl | 0.0348 |
| $ZrO_2$ | — |
| Loss on Ignition (%): | 0.28 |

Thus, in this Example production of solid material comprising dicalcium and tricalcium silicate was demonstrated, as well as depletion of chloride to a level well below standards for Portland cement.

Example 4

Lab Production of Portland Cement Clinkers Via Alternative Route

The starting feed material was a mixture of $CaCl_2$, $SiO_2$, $Fe_2O_3$, $Al_2O_3$ with Ca—Si molar ratio ranging from 2.5 to 3.25, and amounts of $Al_2O_3$—$Fe_2O_3$ were adjusted to meet the requirements of the particular Portland cement/clinker desired as end product. The feed material underwent a 2-step high temperature process to produce clinkered material, satisfying various Portland cement chemical composition requirements, depending on starting ratios. The first step process was dechlorination. In dechlorination, the mixture was subjected to reaction with superheated steam (5 vol. % to 100 vol. %) at temperatures ranging from 750° C. to 1250° C. Additional dichlorination may occur at higher temperatures, e.g., in the clinkering process. Note that $Al_2O_3$ and $Fe_2O_3$ are not essential components for dechlorination and can also be added afterwards. The aim of dechlorination is to decrease the Cl content below 5 wt. %, and preferably below 1 wt. %. The dechlorinated product then underwent clinkering at temperatures in the range of 1400° C.-1600° C. to produce clinker satisfying OPC standard chemical, composition, and performance requirements. Clinkering of the dechlorinated product can also be performed in the presence of water vapor, similar to the moisture content in combustion flue gas, or higher, potentially resulting in clinker containing less than 0.01 weight % residual Cl. General Laboratory procedure for dichlorination i. $CaCl_2$, $SiO_2$, $Al_2O_3$ and $Fe_2O_3$ samples of known purity were dried in muffle/box furnace at 300° C. for 2 hours to ensure that starting materials were dry.

ii. Dried samples were weighed and mixed in desired compositions so that Ca—Si molar ratio was between 2.5 to 3.25. Amount of $Al_2O_3$ and $Fe_2O_3$ was calculated taking theoretical mass loss during dechlorination into account.

iii. The sample was ball milled overnight to ensure homogeneity of chemical components. The ball milled mixture was then used as feed sample for dechlorination.

iv. A platinum crucible was weighed and feed sample, weighed in the crucible, was dried at 300° C. for 2 hours, to ensure driness. A tube furnace was pre-heated to 300° C.

v. After 2 hours, the sample+crucible was weighed and placed in the tube furnace.

vi. The tube furnace was then programmed to reach 850° C. with ramp rate about 10° C./min. This first 'soak' temperature can be in the range of 750 to 1250° C. depending upon the experiment goals. Steam flow was started at about 750° C.-800° C. Steam flow can be started earlier without ill-effect, as long as T is >300° C.

The ramp rate can vary from 5 to 20 C, but is often limited by the laboratory furnaces, not always process requirement. Samples can be rapidly heated to ~700-700 C without ill-effect. Heating from ~700 to ~1000° C. generally can be done more slowly to give the CaCl2/SiO2 mixture time to form a solid solution and react with $H_2O$ to dechlorinate and produce HCl(g). Heating at a 10° C./min ramp rate satisfies the slow melting requirement without prematurely melting the CaCl2 fraction before it can react with the H2O(g) and SiO2(s).

vii. Water flowrate to steam generator was maintained using a peristaltic pump so that the amount of water added over the course of the experiment is in stoichiometric excess.

viii. The heat-treatment program typically consisted of 60 minutes soak at 850° C., 60 minutes at 1000° C. and 120 minutes at 1100° C. However, the heat-treatment cycle conditions are often varied. For example, the dichlorination reaction conditions have been varied between 750 and 1250° C. with various intermediate ramp and soak temperatures.

ix. After the reaction time at the peak temperature, water flowrate was stopped, and crucible was allowed to cool down inside the furnace at 10° C./min. The crucible was removed at around 600° C. This step was for safety and laboratory expediency. The sample itself can be removed from the furnace at the end of the peak temperature without ill effect.

x. The crucible with sample was weighed before the sample is transferred to an air-tight scintillation vial.

General Laboratory Procedure for Clinkering i. A platinum crucible was weighed and dechlorinated sample, weighed in the crucible, was dried at 300° C. for 2 hours to ensure sample was dry. A tube furnace was pre-heated to 300° C.

ii. After 2 hours, the sample+crucible was weighed and placed in the tube furnace.

iii. The tube furnace was then programmed to reach 1500° C.-1600° C. with ramp rate about 10° C./min. Ranges of clinkering temperatures can be 1400-1600° C. For gray OPC, 1450-1500° is typical. For white OPC, 1500-1600° C. is typical. The ramp rate is based on laboratory equipment limits. Clinkering can be accomplished by placing sample directly in preheated furnace at clinkering temperatures, and/or the ramp rate can be higher or initial furnace temperature can be higher.

iv. Steam/$O_2$ flow was started at about 350° C. Steam concentration in feed gas can vary from 0.5% to 10%. Also, combustion flue gas can be used as source of steam and $O_2$, instead of steam/$O_2$ mixture.

v. The heat treatment cycle typically consisted of 5 hours soak at 1500° C. Time of clinkering can be varied, potentially down to 15 minutes, depending on conditions.

vi. After reaction time, the crucible was pulled out of the tube furnace and onto a firebrick and the temperature was quenched in air.

vii. The crucible with clinker sample was weighed before being transferred to air-tight scintillation vial.

Materials were tested by XRF and Bogue calculations were performed. Table 1 presents results for various starting materials and end products.

TABLE 1

Chemical analyses and Bogue calculations of feed, dechlorinated samples and clinkers.

| | | Chemical Analyses (wt. %) | | | | | | Bogue Calculation (wt. %) | | | |
|---|---|---|---|---|---|---|---|---|---|---|---|
| | | $CaCl_2$ | CaO | $SiO_2$ | $Al_2O_3$ | $Fe_2O_3$ | Cl | C3S | C2S | C3A | C4AF |
| Test 1 | Feed | 79.3 | — | 15.6 | 0.9 | 0.5 | — | — | — | — | — |
| | Dechlor. | — | 67.4 | 26.2 | 1.4 | 1.0 | 2.4 | — | — | — | — |
| | Clinker | — | 68.6 | 27.8 | 1.6 | 1.1 | 0.08 | 55.0 | 38.3 | 2.4 | 3.4 |
| Test 2 | Feed | 79.3 | — | 15.6 | 0.9 | 0.5 | — | — | — | — | — |
| | Dechlor. | — | 68.1 | 26.0 | 1.4 | 1.1 | 2.9 | — | — | — | — |
| | Clinker | — | 70.3 | 26.5 | 1.5 | 1.1 | 0.01 | 72.9 | 21.1 | 2.0 | 3.5 |
| Test 3 | Feed | 79.3 | — | 15.6 | 0.9 | 0.5 | — | — | — | — | — |
| | Dechlor. | — | 67.6 | 25.8 | 1.5 | 1.0 | 3.2 | — | — | — | — |
| | Clinker | — | 69.5 | 27.0 | 1.6 | 1.0 | 0.01 | 64.7 | 28.8 | 2.6 | 3.1 |
| Test 4 | Feed | 79.3 | — | 15.6 | 0.9 | 0.5 | — | — | — | — | — |
| | Dechlor. | — | 67.3 | 25.3 | 1.5 | 1.0 | 4.1 | — | — | — | — |
| | Clinker | — | 69.8 | 27.2 | 1.4 | 1.0 | 0.01 | 66.4 | 28.0 | 2.0 | 3.0 |
| Test 5 | Feed | 79.3 | — | 15.6 | 0.9 | 0.5 | — | — | — | — | — |
| | Dechlor. | — | 68.8 | 25.6 | 1.5 | 1.1 | 1.9 | — | — | — | — |
| | Clinker | — | 69.6 | 27.1 | 1.6 | 0.9 | 0.002 | 65.4 | 28.4 | 2.7 | 2.7 |

Figure 14:
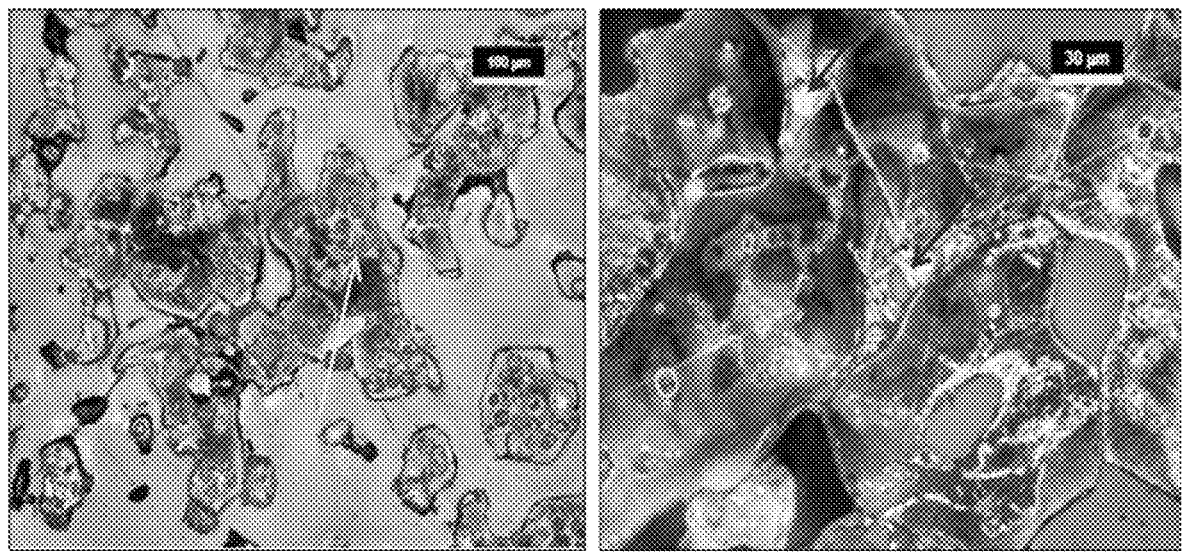
FIG. 14 shows an optical micrograph of clinker sample obtained in a procedure of Example 4

FIG. 14 shows exemplary Optical photomicrographs of the clinker sample obtained in Test 1. The alite (C3S) in both micrographs show up as dark regions. The arrows in the right-hand micrograph point to ferrite and aluminate phases. The arrow on the left micrograph points to one of many small, brown belite (C2S) inclusions.

This Example demonstrates that clinker having C3S, C2S, C3A, and C4AF of varying proportions, which satisfy, e.g., ASTM standards for different types of cement, may be produced from calcium chloride, silica, aluminum oxide and iron oxide starting materials.

Example 5

In this Example, supplementary cementitious material (SCM) was produced from rocks; in one experiment, SCM meeting ASTM requirements for fly ash was produced; in another experiment, SCM meeting ASTM requirements for silica fume was produced.

Figure 15:
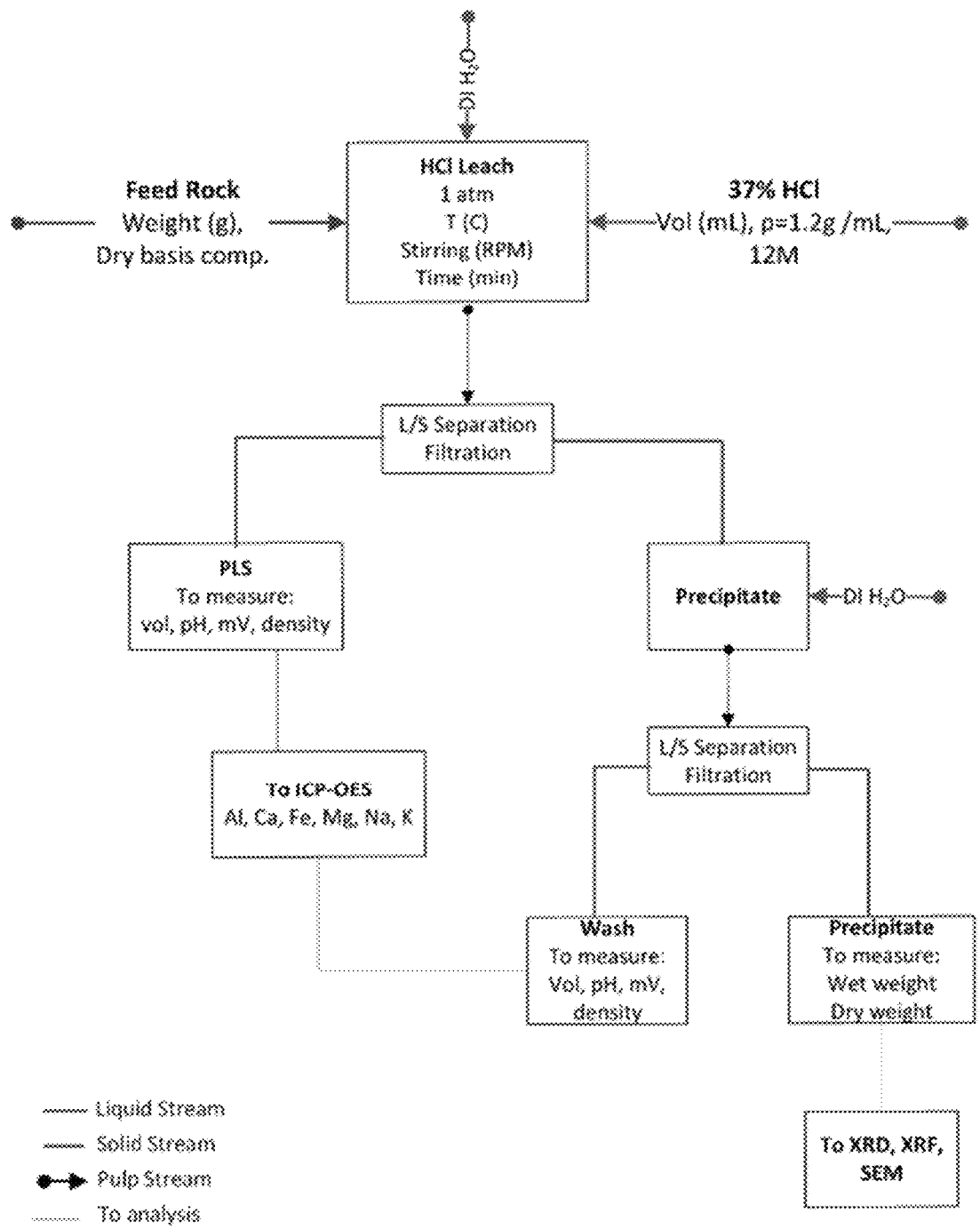
FIG. 15 shows procedure of Example 5.

FIG. 15 describes the simplified process flow diagram for the leaching of Ca-bearing materials. The process involved material reception, crushing and grinding, leaching, liquid/solid separation, drying, and solid processing to meet ASTM standards. Each step is described in sub-sections.

Feed Material Preparation

Feed materials (anorthosite from Greenland, Canada, comprising 77.6% anorthite ($CaAl_2Si_2O_8$), 3.4% quartz ($SiO_2$), 1.2% muscovite or related mica $KAl_2(AlSi_3O_{10})(OH)_2$, 0.4% kaolinite $Al_2Si_2O_5(OH)_4$, and 17.4% amorphous material) were received in sizes ranging from 5 inches to hundreds of microns. The as-received material was examined for visible moisture content; if it was moist or wet, it was dried in a drying oven at 110° C. Material larger than 1000 microns was crushed to a P80 in the 1200 to 1000-micron range. The feed rock was then ground to a P80 in the 45 to 90 microns range. The ready rock was then analyzed for initial composition via X-ray Fluorescence (XRF).

Leaching

Reagent grade hydrochloric acid (HCl) was used as the leaching reagent. Due to its corrosiveness, all material of construction for the reactor vessel consisted of borosilicate glass and Teflon. A reflux condenser was connected to a recirculating water chiller set between 15-20° C. for water and acid recovery. The heating mantle was connected to a temperature controller and temperature was measured in the reactor with a type J thermocouple. Leaching of the Ca-bearing feed rock was carried out as follows:

1. Target leaching conditions were 15-30% wt./wt. HCl, 10-30% wt./vol. pulp density (weight of solids to volume of leaching solution), 6 to 24 hours, 50 to 70% vol. filling of reactor vessel. Leaching conditions used to produce fly ash and silica fume were 20% HCl wt/wt, pulp density of 27% (27 gm feed rock for every 100 mL leaching solution)

2. Once the leaching parameters were defined, the required amount of feed rock was calculated and accurately measured to 0.1 to 1 mg. The required volumes pf stock acid and water were also determined 3. The leaching reagent was added to the reactor vessel, with a slow stirring of 100 to 150 rpm. While stirring, the feed rock was slowly added to the reactor through the solid feed port.

4. The vessel was closed, the stirring was increased to 200 to 300 rpm for the reaction. Heating was initiated to a 100 to 120° C. temperature target range. Once the reaction mixture reached the target temperature, the reaction was allowed to continue for the predetermined duration. For fly ash, the duration was 24 hours, after which materials were separated. For silica fume, leaching was performed for 24 hours in a first step, residues were obtained, then leached anew at the same acid concentration and pulp density for an additional 4 hours. At the end of the reaction the heating is stopped, and the reaction mixture AKA pulp which is comprised of the pregnant leach solution (PLS) and the solids (residues) is allowed to cool down until 60 to 70 degrees.

Solid/Liquid Separation

Solid/liquid separation of the product is illustrated in FIG. 15 and proceeded as follows:
1. A corrosive resistant tube connected to an adapter was placed at the reaction vessel draining port on one end, and inside a corrosive resistant collection container. The reaction mixture was allowed to flow inside the collection bottle which was taken to filtration or centrifugation
2. Centrifugation:
   a. The PLS pulp was equally distributed in centrifuge bottles and inserted in the centrifuge rotor.
   b. The centrifuge was run for 5 to 10 minutes
   c. The supernatant was collected and processed for physical properties data collection (density, pH, vol, RmV), then aliquots were sent to chemical analysis).
3. Filtration
   a. The filtration assembly consisted of a filtration flask, a Buchner funnel, filter paper of various grades (3, 4, 5, 50), and a vacuum pump.
   b. The filter paper was placed inside the Buchner funnel, wetted, and the pump was turned on to confirm a good seal.
   c. The pulp was added to the funnel, and the separation took place. The filtered pregnant leach solution was collected, processed for physical property data collection (density, pH, vol, RmV), then aliquots were sent to chemical analysis)
4. The filter cake/centrifuge pellet was repulped by addition of water to approximately 25 to 50% vol. solids then another filtration or centrifugation step was carried out. The pH of the filter cake was monitored such that the end of the filtration/centrifugation was marked by a cake pH around 6-7
5. The filter cake/solid pellet was collected into a drying dish and the wet weight is recorded Drying The residue material collected from the S/L separation step was placed in a drying oven at 110° C. for 24 to 48 hours prior to dry solid processing. At the end of the drying process, the dry weight of the cake was recorded, and the retained moisture content was calculated. The solids were deagglomerated using a mortar and pestle Analytical Methods Sample Preparation Liquid Fractions As shown in FIG. 15, three streams were collected from the leaching: the PLS, the wash, and the residue. Aliquots of the PLS and the wash fractions were analyzed via Inductively Coupled Plasma-Optical Emission Spectroscopy (ICP-OES).

Solid Fractions

After collection, the residue was subjected to a loss on ignition (LOI) analysis according to ASTM D7348. A fraction of the oxidized residue sample was subjected to a lithium borate fusion whereby a glass bead was produced and analyzed using X-ray fluorescence (XRF).

SCM Production

Specification for silica fume and fly ash were provided by table 1 and 2 of ASTM C1240 and C618 respectively. The following procedure was caned out to reach specification of SCM:
1. A 325 mesh ASTM sieve was calibrated according to ASTM C430 using NIST 46 h OPC fineness standard
2. Triplicates were run of fineness test with the residue sample.
3. Based on the fineness results, the required grinding media and duration were determined to reach the required particle size.
4. A grinding jar was obtained and loaded with grinding media until 40-50% of the volume was filled. The solids were added until approximately ½ inches above the media surface.
5. The solids+ media containing jar was placed on a ball mill and ground.
6. Steps 2 and check were repeated for the size test.
7. If needed, steps 2 to 6 were repeated as needed.

Testing of Supplementary Cementitious Material (SCM) per ASTM C618 "Standard Specification for Coal Fly Ash and Raw or Calcined Natural Pozzolan for Use in Concrete".

Sample of "Fly Ash" was evaluated for compliance with standard physical and composition requirements of ASTM C618.

Mix Proportions and Results

Results of analysis of the sample for chemical composition are provided in Table 2 (ASTM\C618). Proportions and flow of test mortar sample are provided in Table 3. Content of SCM was 20% by the weight of its mixture with Portland cement (Reference: ASTM C618 and ASTM C311). Results of testing of "Fly Ash" for standard physical requirements are presented in Table 4 (ASTM C618).

TABLE 2

Results of Composition Analysis of SCM Sample (ASTM C618)

| Chemical Composition | Requirements per ASTM C618, Class F | Sample Fly Ash |
|---|---|---|
| SiO2 (%) | | 85.12 |
| Al2O3 (%) | | 6.75 |
| Fe2O3 (%) | | 0.41 |
| SiO2 + Al2O3 + Fe2O3 (%) | 50.0 min | 92.3 |
| CaO (%). | 18.0 max | 2.6 |
| MgO (%) | — | 0.00 |
| Na2O (%) | — | 0.81 |
| K2O (%) | — | 0.30 |
| Na2Oeq (Na2O + 0.658K2O) (%) | | 1.00 |
| SO3 (%) | 5.0 max | 0.0 |
| Moisture content (%) | 3.0 max | 1.5 |
| Loss on Ignition (%) | 6.0 max. | 3.8 |

TABLE 3

Mix Proportions of Mortar Specimens Fabricated for Determining Water Requirement and Strength Activity Index (ASTM C618)

| Materials | Control Sample | Test Sample |
|---|---|---|
| Portland cement (g) | 500 | 400 |
| SCM (g) | — | 100 |
| Graded standard sand (g) | 1375 | 1375 |
| Amount of water (ml) | 242 | 234 |
| Flow (%), ASTM C1437 | 102 | 105 |

TABLE 4

Results of Testing for Physical Properties (ASTM C618)

| Physical Properties | Requirements per ASTM C618, Class F | Sample Fly Ash |
|---|---|---|
| Fineness (Amount Retained when wet sieved on 45 μm [#325] sieve) (%), ASTM C430 | 34 max. | 27 |
| Strength Activity Index, with Portland cement, at 7 days (% of Control), ASTM C311 | 75 min. at 7 days or 28 days | 82 |
| Strength Activity Index, with Portland cement, at 28 days (% of Control), ASTM C311 | 75 min. at 7 days or 28 days | 92 |
| Water Requirement (% of Control), ASTM C311 | 105 max. | 97 |
| Soundness, Autoclave expansion or contraction (%) ASTM C311, C151 | 0.8 max. | 0.1 |
| Density (g per cubic cm), ASTM C188 | — | 2.32 |

Flow (%), ASTM C1437 102 105SCM sample of "Fly Ash" complies with standard physical and composition requirements for "Class F" fly ash as specified by ASTM C618

Testing of Silica Fume per ASTM C1240 "Standard Specification for Silica Fume Used in Cementitious Mixtures".

Samples of "Silica Fume" were evaluated for their compliance with standard physical and composition requirements of ASTM C1240.

Results of analysis of the sample for chemical composition are provided in Table 5 (ASTM C1240). Proportions and flow of test mortar samples are provided in Table 6 (ASTM C1240 and ASTM C311). Results of testing of "Silica Fume" for standard physical requirements are presented in Table 7 (ASTM C1240).

TABLE 5

Results of Composition Analysis of Silica Fume Sample (ASTM C1240)

| Chemical Composition | Requirements per ASTM C1240 | Sample Silica Fume |
|---|---|---|
| SiO2 (%) | 85.0 min | 88.9 |
| Al2O3 (%) | — | 4.17 |
| Fe2O3 (%) | — | 0.22 |
| SiO2 + Al2O3 + Fe2O3 (%) | — | 93.3 |
| CaO (%). | — | 1.37 |
| MgO (%) | — | 0.04 |
| Na2O (%) | — | 0.66 |
| K2O (%) | — | 0.30 |
| Na2Oeq (Na2O + 0.658K2O) (%) | — | 0.86 |
| SO3 (%) | — | 0.0 |
| Moisture content (%) | 3.0 max | 1.4 |
| Loss on Ignition (%) | 6.0 max. | 4.3 |

TABLE 6

Mix Proportions of Mortar Specimens Fabricated for Determining Accelerated Pozzolanic Strength Activity Index (ASTM C1240)

| Materials | Control Sample | Test Sample (CH21-269) |
|---|---|---|
| Portland cement (g) | 500 | 450 |
| Silica fume (g) | — | 50 |
| Graded standard sand (g) | 1375 | 1375 |
| Amount of water (ml) | 242 | 242 |
| Flow (%), ASTM C1437 | 108 | 102 |
| HRWR (g) | — | 0.26 |

TABLE 7

Results of Testing for Physical Properties (ASTM C1240)

| Physical Properties | Requirements per ASTM C1240 | Sample Silica Fume |
|---|---|---|
| Oversize (Percent retained when wet sievedon 45 μm [#325] sieve), (%),ASTM C1240 & ASTM C430 | 10 max. | 2 |
| Accelerated pozzolanic strength activity index, with portland cement, at 7 days (% of control), ASTM C1240 & ASTM C311 | 105 min. | 114 |
| Specific surface (m2/g), ASTM C1240 & ASTM C1069 | 15 min | 72 |

The silica fume sample "Silica Fume" complies with the standard physical and chemical requirements specified by ASTM C1240.

This example demonstrates that SCM of different types, meeting industry standards, can be produced from non-limestone starting materials, in this case rocks and/or minerals, where the SCM meets industry standards for composition and function.

As a person skilled in the art will recognize from the previous detailed description and from the figures and claims, modifications and changes can be made to the embodiments of the invention without departing from the scope of this invention as defined in the following claims.

We claim:

1. A method for producing a clinker from a solid comprising calcium chloride comprising:
   (a) combining the solid comprising calcium chloride with a solid comprising silica to produce a solid composition comprising calcium chloride and silica, wherein the molar ratio of Ca: Si in the solid composition comprising calcium chloride and silica is 2.5 to 3.5;
   (b) dechlorinating the solid composition comprising calcium chloride and silica to produce a dechlorinated composition comprising Ca and having less than 10% w/w Cl; and
   (c) heating the dechlorinated composition in the presence of a flux to produce a clinker.

2. The method of claim 1 wherein the clinker comprises dicalcium silicate and tricalcium silicate.

3. The method of claim 1 wherein the clinker comprises Portland cement clinker.

4. The method of claim 1 wherein the dechlorinated composition comprises no more than 5% Cl by weight.

5. The method of claim 1 wherein the dechlorinated composition comprises at least 2% dicalcium silicate.

6. The method of claim 1 wherein dechlorinating the composition comprising calcium chloride and silica comprises 1. heating the composition comprising calcium chloride and silica;
2. introducing steam when the composition comprising calcium chloride and silica reaches a temperature of 300° C. or above; and
3. heating the composition comprising calcium chloride and silica in the presence of steam at a temperature of 750° C. to 1250° C.

7. The method of claim 1 wherein HCl is produced during the dechlorination.

8. The method of claim 1 wherein the heating of the dechlorinated composition in the presence of flux comprises heating the composition to 1200-1600° C.

9. The method of claim 1 wherein the dechlorinated composition comprises no more than 2% Cl by weight.

10. The method of claim 1 wherein the dechlorinated composition comprises no more than 1% Cl by weight.

11. The method of claim 1 wherein the solid comprising calcium chloride is produced by removing water from an aqueous calcium-rich fraction comprising calcium chloride.

12. The method of claim 11 wherein the aqueous calcium-rich fraction comprising calcium chloride is produced by treating starting material comprising less than 10% calcium carbonate to produce an aqueous calcium-rich fraction comprising calcium chloride, and a solid calcium-depleted fraction.

13. The method of claim 11 wherein treating starting material comprising less than 10% calcium carbonate to produce an aqueous calcium-rich fraction comprising calcium chloride, and a solid calcium-depleted fraction comprises contacting the starting material with an acid.

14. The method of claim 13 wherein the acid comprises hydrochloric acid.

15. The method of claim 12 wherein the starting material comprising less than 10% calcium carbonate comprises rocks and/or minerals.

16. The method of claim 15 wherein the rocks and/or minerals comprise basalt, igneous appetites, wollastonite, anorthosite, montmorillonite, bentonite, calcium-containing feldspar, anorthite, diopside, pyroxene, pyroxenite, mafurite, kamafurite, clinopyroxene, colemonite, grossular, augite, pigeonite, margarite, calcium serpentine, garnet, scheilite, skarn, limestone, natural gypsum, appetite, fluorapatite, or any combination of these.

17. The method of claim 12 wherein the solid calcium-depleted fraction comprises amorphous silica.

18. The method of claim 17 further comprising separating the solid calcium-depleted fraction comprising amorphous silica from the aqueous solution and further treating it, if necessary, so that it is suitable for use as a supplementary cementitious material (SCM).

19. The method of claim 18 wherein the solid comprising silica of step (a) comprises at least part of the solid calcium-depleted fraction comprising amorphous silica.

20. The method of claim 12 wherein the aqueous calcium-rich fraction comprising calcium chloride further comprises non-calcium salts in solution and the method further comprises forming a solid or solids from the one or more non-calcium salts and removing the solid or solids from the aqueous calcium-rich fraction.

21. The method of claim 20 wherein the non-calcium salts comprise salts of Fe, Al, Mg, or a combination thereof in solution.

22. The method of claim 21 wherein the non-calcium salts comprise salts of Fe and/or Al, and the solid or solids formed from the non-calcium salts comprising salts of Fe and/or Al are used as flux in step (c).

23. The method of claim 21 wherein the non-calcium salts comprise one or more salts of Mg, and the solid or solids formed from the one or more salts of Mg is used to sequester carbon dioxide from a gas comprising carbon dioxide.

24. The method of claim 23 wherein the gas comprising carbon dioxide is atmospheric air.

25. The method of claim 20 wherein the solid or solids are formed in a process comprising heating the aqueous calcium-rich fraction comprising calcium chloride, adding base to the aqueous calcium-rich fraction comprising calcium chloride, or a combination thereof.

26. The method of claim 25 wherein the solid or solids are formed by adding base to the aqueous solution.

27. The method of claim 1 wherein the molar ratio of Ca:Si in the composition comprising calcium chloride and silica is 2.5 to 3.25.

* * * * *